(12) United States Patent
Yeo et al.

(10) Patent No.: US 11,885,130 B2
(45) Date of Patent: *Jan. 30, 2024

(54) CEILING GRID LIGHTING ASSEMBLY WITH CONFIGURED ALIGNMENT

(71) Applicant: Fusion Optix, Inc., Woburn, MA (US)

(72) Inventors: Terence Yeo, Boston, MA (US); Michael Demas, Charlestown, MA (US); Joshua C Webb, Sheffield, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,654

(22) Filed: Apr. 5, 2022

(65) Prior Publication Data

US 2022/0228366 A1 Jul. 21, 2022

Related U.S. Application Data

(63) Continuation of application No. 16/877,482, filed on May 18, 2020, now Pat. No. 11,396,751, which is a
(Continued)

(51) Int. Cl.
*F21V 15/00* (2015.01)
*F21S 8/02* (2006.01)
(Continued)

(52) U.S. Cl.
CPC ............... *E04B 9/18* (2013.01); *E04B 9/006* (2013.01); *E04B 9/247* (2013.01); *F21V 5/04* (2013.01);
(Continued)

(58) Field of Classification Search
CPC . E04B 9/04; E04B 9/006; E04B 9/067; E04B 9/18; E04B 9/247; F21S 8/026
(Continued)

(56) References Cited

U.S. PATENT DOCUMENTS

| 3,329,387 A | * | 7/1967 | Fischer | ...................... E04B 9/16 248/342 |
| 3,343,310 A | * | 9/1967 | Netz | ....................... F21V 21/04 52/28 |

(Continued)

*Primary Examiner* — Brian E Glessner
*Assistant Examiner* — James J Buckle, Jr.

(57) ABSTRACT

A ceiling grid lighting assembly for use in suspended ceiling systems is provided with multiple linear lighting modules in parallel arrangement. End plates are used to connect, support, and enclose longitudinal ends of the elongate body of each linear lighting modules while simultaneously functioning as reflective faces for optical cavities. A configured gap spacing between individual linear lighting modules can be used to house and support components such as additional light sources, acoustic or decorative panels, HVAC components, or power systems, controls or sensors. The end plate can also be configured to allow a T-bar to be placed in the configured gap spacing thereby enabling the mounting of the assembly in-line upon the longitudinal axis of a ceiling grid T-bar. Embodiments of linear lighting modules are presented comprising LED light sources, light guides and diffusers housed within the elongate body. The light guides may be edgelit from one or two sides and aligned horizontally or tilted relative to the ceiling grid plane.

43 Claims, 42 Drawing Sheets

Related U.S. Application Data continuation-in-part of application No. 16/239,804, filed on Jan. 4, 2019, now abandoned.

(51) Int. Cl.
| | |
|---|---|
| *E04B 9/18* | (2006.01) |
| *F21V 21/03* | (2006.01) |
| *F21V 5/04* | (2006.01) |
| *F21V 7/04* | (2006.01) |
| *E04B 9/00* | (2006.01) |
| *E04B 9/24* | (2006.01) |
| *G02B 5/02* | (2006.01) |

(52) U.S. Cl.
CPC ............... *F21V 7/04* (2013.01); *F21V 21/03* (2013.01); *G02B 5/0205* (2013.01)

(58) Field of Classification Search
USPC .......................................... 52/506.06, 506.07
See application file for complete search history.

(56) References Cited

U.S. PATENT DOCUMENTS

| | | | | | |
|---|---|---|---|---|---|
| 3,426,188 | A | * | 2/1969 | Baranowski | E04B 9/16 52/28 |
| 3,512,313 | A | * | 5/1970 | Harz | E04B 9/12 52/28 |
| 4,027,454 | A | * | 6/1977 | Schuplin | E04B 9/242 52/506.07 |
| 4,047,336 | A | * | 9/1977 | Stahlhut | F21S 8/02 52/28 |
| 4,363,082 | A | * | 12/1982 | Roland | F21V 21/04 362/225 |
| 4,479,341 | A | * | 10/1984 | Schuplin | E04B 9/127 52/712 |
| 5,161,878 | A | * | 11/1992 | Degelmann | F21V 19/02 362/366 |
| 5,428,930 | A | * | 7/1995 | Bagley | E04B 9/003 52/489.1 |
| 5,777,857 | A | * | 7/1998 | Degelmann | F21S 2/00 362/225 |
| 5,941,029 | A | * | 8/1999 | MacLeod | E04B 9/006 24/336 |
| 6,029,414 | A | * | 2/2000 | MacLeod | E04B 9/006 52/39 |
| 6,079,851 | A | * | 6/2000 | Altman | F21V 23/026 362/217.05 |
| 6,341,466 | B1 | * | 1/2002 | Kehoe | F16B 2/241 52/39 |
| 7,770,349 | B2 | * | 8/2010 | Tedesco | E04B 9/122 52/506.07 |
| 8,453,407 | B2 | * | 6/2013 | Tedesco | E04B 9/127 52/506.07 |
| 8,596,009 | B2 | * | 12/2013 | Baxter | E04B 7/14 52/489.1 |
| 8,615,948 | B2 | * | 12/2013 | Underkofler | E04B 9/067 52/506.07 |
| 8,667,756 | B1 | * | 3/2014 | Sareyka | E04B 9/18 52/506.07 |
| 9,453,339 | B2 | * | 9/2016 | Baxter | E04B 9/067 |
| 2012/0047836 | A1 | * | 3/2012 | Sareyka | F16M 13/027 52/506.06 |
| 2012/0102865 | A1 | * | 5/2012 | Baxter | E04B 9/30 52/745.05 |
| 2013/0318905 | A1 | * | 12/2013 | Underkofler | E04B 9/122 52/506.06 |
| 2015/0040494 | A1 | * | 2/2015 | Lehane, Jr. | E04B 9/122 52/506.07 |
| 2017/0082252 | A1 | * | 3/2017 | Casement | G02B 6/0051 |
| 2021/0048169 | A1 | * | 2/2021 | Dahlen | F21V 7/0033 |

* cited by examiner

CEILING GRID LIGHTING ASSEMBLY WITH CONFIGURED ALIGNMENT

RELATED APPLICATIONS

This application is a continuation of and claims the benefit of U.S. non-provisional application Ser. No. 16/877,482 filed May 18, 2020 and titled "MODULAR CEILING SYSTEM WITH SUPPORT ELEMENTS FOR MOUNTING OF FUNCTIONAL MODULES" which is itself a continuation in part of non-provisional U.S. application Ser. No. 16/239,804 titled "SUPPORT ELEMENT FOR GRID CEILING SYSTEMS" filed Jan. 4, 2019. Furthermore through application 16/877,482, benefit of provisional patent applications Ser. No. 62/849,199 titled "MODULAR CEILING SYSTEM AND METHOD" filed May 17, 2019, Ser. No. 63/000,649 titled "MODULAR FUNCTIONAL FIXTURE FOR USE WITH SUSPENDED CEILING GRID ARRANGEMENT AND METHOD FOR INSTALLATION" filed Mar. 27, 2020, and Ser. No. 63/000,718 "LIGHTING ARRANGEMENT FOR USE WITH SUSPENDED CEILING" filed Mar. 27, 2020 are claimed.

BACKGROUND

Technical Field

The present disclosure relates generally to modular ceiling systems, for example for suspended ceiling arrangements, wherein the modular ceiling systems utilize modular elements that are suitable to being coupled together conveniently in various configurations, thereby making ceiling arrangements easier to install, to reconfigure, and also to maintain. Moreover, the present disclosure relates to methods of installing and reconfiguring aforesaid modular ceiling systems. Furthermore, the present disclosure relates to various types of modular elements that are suitable to being employed in aforesaid modular ceiling systems. The aforementioned suspended ceiling arrangements are conventionally implemented to utilize "T"-bars, with ceiling panels supported by the "T"-bars, wherein the "T"-bars are hung from corresponding structural ceilings. Moreover, the present disclosure also relates to methods for mounting aforesaid modular elements onto the "T"-bars to support ceiling panels and electronic devices provided therein.

Background

Contemporary buildings, for example houses or offices, are implemented to have a structural ceiling from which is supported a suspended ceiling arrangement. Typically, the suspended ceiling arrangement includes a plurality of ceiling tiles or panels hanging at a distance of approximately 30 to 50 centimeters below the structural ceiling. The suspended ceiling arrangement further includes a plurality of T-bars that are configured to support the plurality of ceiling tiles or panels in position; the plurality of T-bars are suspended from the structural ceiling, for example via an arrangement of wires. Specifically, such an arrangement of the plurality of T-bars provides cells to accommodate the plurality of ceiling tiles or panels therein. Additionally, a flush-finish of lower surfaces of the plurality of T-bars, and the plurality of ceiling tiles or panels are such that they appear as a continuous mono-planar lower ceiling surface. Conventionally, suspended ceiling arrangements are found to be practical because wiring looms required for lighting devices, optionally other devices such as fans, loudspeakers and such like, can be aesthetically hidden from view above the ceiling tiles or panels. However, depending upon a configuration of suspended ceiling arrangement employed, the aforementioned wiring loom can become very scattered and chaotic, especially when it is modified after installation by various people to retrofit additional functional devices at a height of the suspended ceilings.

A further issue that is encountered with contemporary suspending ceiling arrangements is that replacing the suspended ceiling arrangements, for example when generally refurbishing a given building in which a suspended ceiling arrangement is installed, generates a lot of waste material that is potentially not straightforward to recycle or reuse; the waste material can be environmentally disadvantageous. Moreover, hazards of harmful dust falling over time from a structural ceiling onto an upper surface of the suspended ceiling arrangement, the structural ceiling often having a rough bare concrete surface, can make replacing ceiling arrangements hazardous to health for personnel handling aged suspended ceiling arrangement elements. Concrete used in older buildings can potentially sometimes include trace asbestos, radioactive hot particles (for example in regions near nuclear power plants), as well as other types of irritant materials.

Lego® bricks are known to be a highly flexible and versatile children's toy that allows for a high degree of reconfigurability when the Lego® bricks are reassembled together in a potentially a large number of alternative configurations; Lega® bricks were first disclosed in a granted US patent U.S. Pat. No. 3,005,282B ("*Toy Building Brick*"; inventor: Godtfred Kirk Christiansen) and their degree of reconfigurability was revolutionary for toys in the 1960's. By allegorical analogy with Lego® bricks, it is desirable to design a suspended ceiling arrangement that is modular and suitable to being reconfigured and repurposed, without generating dangerous or problematic waste.

SUMMARY

The present disclosure seeks to provide improved modular ceiling systems that allow for the configuration of novel configurations with improved appearance and performance as well as systems that easier initially to install, easier to reconfigure after initial installation (for example to achieve a modified functionality), and easier to recycle or reuse when a building incorporating the modular ceiling system is being dismantled or generally refurbished.

Furthermore, the present disclosure seeks to provide improved modular elements that are couplable together and to "T"-bars of suspended ceilings for implementing advanced implementations of suspended ceiling arrangements.

According to a first aspect, the present disclosure provides a modular ceiling system for use with a suspended ceiling arrangement, wherein the suspended ceiling arrangement includes a grid arrangement of "T"-bars suspended from a structural ceiling, wherein the "T"-bars define a general ceiling plane of the suspended ceiling arrangement having a plurality of ceiling panels, Novel supporting elements are used as separate or integrated components to enable multiple alternative configurations of modular ceiling systems comprising functional modules, ceiling elements such as ceiling tiles, and T-Bar grids. Embodiments provide for configurations with multiple height levels and orientations, particularly with light fixtures as functional modules. Alternative embodiment integrate power systems and other useful elements such as acoustic or decorative panels, HVAC components or power systems, controls or sensors. Additionally, different versions of the invention are disclosed for mounting lighting assemblies in an interconnected line, array or pattern either on opposing sides of one or more T-bar elements or at or close to the intersection of T-bar main beam and cross beams. The novel lighting assemblies disclosed provide a variety of direct and indirect lighting functions and are typically based on LED light sources.

Additional aspects, advantages, features and objects of the present disclosure would be made apparent from the drawings and the detailed description of the illustrative embodiments construed in conjunction with the appended claims that follow.

It will be appreciated that features of the present disclosure are suitable to being combined in various combinations without departing from the scope of the present disclosure as defined by the appended claims.

BRIEF DESCRIPTION OF FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
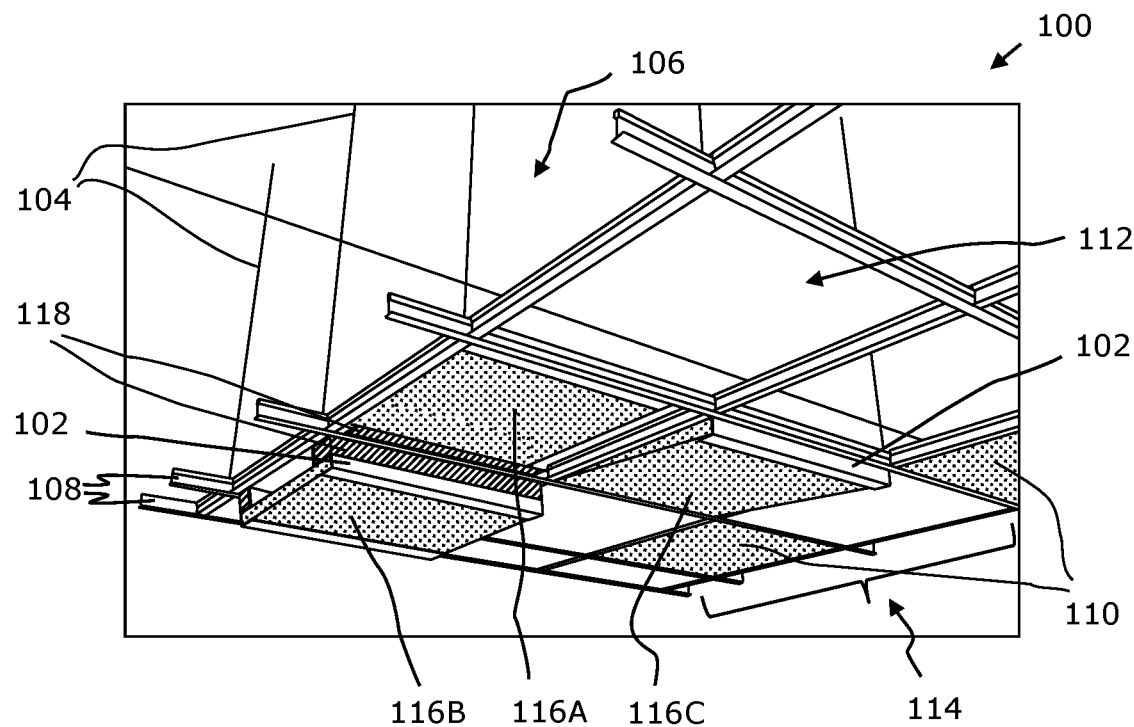
FIG. 1 is an illustration of a suspended ceiling arrangement constructed using a modular ceiling system pursuant to the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

In the following detailed description, embodiments of the present disclosure will be described with reference to accompanying illustrations, and ways in which the embodiments can be implemented. Although some modes of carrying out the present disclosure have been disclosed, those skilled in the art would recognize that other embodiments for carrying out or practicing the present disclosure are also possible.

In overview, the present disclosure is concerned with modular ceiling systems that include modular components that are employable to implement suspended ceilings, also referred to herein as "suspended ceiling arrangements". Contemporarily, suspended ceilings are popular because they avoid having to beautify aesthetics of structural ceilings of buildings, and also provides working spaces between upper surfaces of the suspended ceilings and structural ceilings in which functional items can be accommodated. The working spaces are suitable to being populated by fixtures that provide enhanced functionality to given rooms. The modular components of the modular ceiling systems of the present disclosure employ modular supporting elements. An example supporting element pursuant to the present disclosure has a "U"-shaped portion that fits over one or more "T" bars that are employed to implement a given suspended ceiling, and includes at least one supporting portion that is provided with an arrangement of one or more supporting features for supporting at least one ceiling panel and at least one functional module therewith, for example light fixtures but not limited thereto. Moreover, such supporting elements can be fabricated from materials such as extruded Aluminum, molded plastics materials, sintered pressed powdered metal and so forth. It will be appreciated that using metal for fabricating the supporting elements is advantageous for providing a high mechanical strength as well as enhancing heat conduction from the at least one functional module mounted to the supporting elements; for example, when the at least one functional module include electronics modules such as switch-mode power supplies, driver units, audio power amplifiers, computing devices and the like, heat energy dissipated therefrom is beneficially conducted via the supporting elements to associated "T"-bars for heatsinking purposes. It will be appreciated that the aforementioned at least one functional module potentially includes at least one of: wiring looms, lighting modules, electronic assemblies such as driver units, sensors, sensor amplifiers, wireless multiplexers, computing devices and such like. Optionally, the supporting elements are supported at junctions whereas a plurality of "T"-bars mutually meet, at a mid-point along a given "T"-bar, or along a width of a given suspended ceiling panel. More optionally, the supporting elements are two opposing supporting elements mounted on a given "T"-bar at two respective longitudinal ends thereof. Beneficially, the at least one functional module, for power supply purposes and signal coupling purposes, are connected in a "daisy-chain" manner across a given suspended ceiling arrangement, thereby keeping an associated wiring loom very simple with short wire links between mutually adjacent supporting elements, and avoiding long and complex cable runs; such avoidance of long cable runs potentially results in less weight needing to be supported by a given suspended ceiling, as well as potentially providing a reduced risk of electrical fires due to electrical faults, and also potentially a reduced degree of electromagnetic interference. Optionally, the at least one functional module include therewith a spatially local data communication network that is either wire-based or near-field wireless or a combination of both, thereby allowing user-adjustable items such as light switch controls, temperature controls, light intensity controls, light color controls, anti-sound dampening degree controls, ventilation effect controls to be implemented wirelessly, whereby these controls are beneficially installed at various convenient locations in a given room equipped with a module ceiling arrangement; such controls thus beneficially communicate wirelessly directly to their fixtures of the suspended ceiling, also referred as "suspended ceiling arrangement", as aforementioned.

In such a manner, the modular ceiling system can be provided with mutually different color outputs, or with color outputs that can be temporally varied, for example to provide a dynamically-changing room environment that mimics a natural outdoor environment, for example for reducing a feeling of claustrophobia or depression within the given room, for example for providing simulated white cloud effects on a light blue background, wherein the white cloud effects slowly spatially migrate over a period of minutes within the suspended ceiling arrangement.

As mentioned earlier, it is beneficial that a power supply provision from a given functional module of the suspended ceiling arrangement is beneficially coupled in a "daisy-chain" manner to other functional modules that are adjacent to the given functional module. The functional module can beneficially include a local data processing arrangement therein, so that near-field wireless communication can be employed in such a "daisy chain" manner; the modular ceiling system of the present disclosure thereby provides a spatially distributed and networked data processing arrangement, for example so that sensor signal data compression can occur locally to avoid large amounts of data, for example video surveillance data, required to be communicated via the modular ceiling system. The functional module beneficially provides various power output options (e.g. DC output, AC output, overload protection, sensor inputs, control outputs, resonant inductive power coupling connections, optical fiber data coupling connections for supporting later retrofitted new types of functional module); this flexibility allows various types of functional modules to be added later that have a wide range of power supply requirements. The spatially distributed and networked data processing arrangement can function as one or more nodes of a peer-to-peer data communication network, a local computing center, and such like. In order to make feasible aforementioned functionalities of embodiments of the present disclosure, a key modular component used is the aforesaid supporting element that functions as a "multifunctional mounting bracket", as will be elucidated in greater detail below.

The "multifunctional mounting bracket" is designed to mount onto one or more "T"-bars of a suspended ceiling arrangement in an easy and customizable manner, allowing users to mount a wide variety of functional modules onto the "multifunctional mounting bracket". The "multifunctional mounting bracket" can be accommodated in a spatial volume having a height extent of less than circa 52 mm (namely 2 inches (")) within a suspended ceiling arrangement. As will be elucidated in greater detail later, such a functional module potentially includes a driver unit that provides power to a ceiling region including a plurality of suspended ceiling panels. Beneficially, the "multifunctional mounting bracket" is designed to be easily understood, handled and installed by contractors and electricians (i.e. "trades people") of modest skill and training; for example, installing the "multifunctional mounting bracket" involves:

(a) mounting at least one supporting element onto at least one "T"-bar of a suspended ceiling arrangement;
(b) installing at least one functional module onto the at least one supporting element, wherein the at least one supporting element provides mechanical support for the at least one functional module;
(c) fitting at least one power module onto the at least one supporting element; and
(d) coupling electrically the at least one power module to the at least one functional module.

Using such a method, an arrangement is implemented that is of a relatively small height profile (for example less than circa 50 cm height), simple in form and aesthetically elegant.

In further overview, the aforementioned supporting elements of the modular ceiling system of the present disclosure can be, for example:

(i) used to install various functional modules including functional device configurations in a given suspended ceiling arrangement;
(ii) used to reconfigure a given ceiling arrangement to provide various alternative functionalities thereto;
(iii) relocated within the given suspended ceiling arrangement to provide modified functionalities thereto; and
(iv) re-used and recycled in a given suspended ceiling arrangement, there assisting to maintain to given suspended ceiling arrangement in an event of a malfunction arising therein.

The modular ceiling system thus employs an arrangement of supporting elements that can be used in a given suspended ceiling arrangement that supports a plurality of ceiling panels and/or various types of functional modules. Furthermore, the supporting elements are capable of supporting one or more of the plurality of ceiling panels, for example at least one of:

(i) lower than the general ceiling plane;
(ii) higher than the general ceiling plane;
(iii) substantially at the general ceiling plane,
(iv) at a tilted angle relative to the general ceiling plane.

The aforementioned functional modules are capable of coupling heat energy generated therein via supporting elements to associated "T"-bars arrangement, whereat the heat energy can be effectively and safely dissipated; for such purpose, the supporting elements are beneficially fabricated from a metal, for example from extruded Aluminum or from sintered metallic powder materials. Moreover, the supporting elements are optionally mounted part-way, for example mid-way, along "T"-bars, or at junctions whereat a plurality of "T"-bars mutually couple or meet, wherein the supporting elements beneficially support one or more fixtures including various functional devices such as down-lights, sensors, ventilation fans, loudspeakers, anti-sound ports, wireless repeaters or hubs for "wifi", and such like. Features and component parts of the modular ceiling system will be described in greater detail below Referring firstly to FIG. 1, there is provided an illustration of a suspended ceiling arrangement 100, implemented, at least in part, using a modular ceiling system pursuant to the present disclosure. The suspended ceiling arrangement 100 includes a plurality of hanging wires 104 coupled to a structural ceiling 106, "T"-bars 108 supported by the hanging wires 104, and a plurality of ceiling panels 110 arranged in an array of cells 112 defined by the "T"-bars 108. In operation, a weight of the ceiling panels 110 is borne by the "T"-bars 108. Furthermore, lower horizontal downward-facing portions of the "T"-bars 108 define a general ceiling plane 114 for the plurality of ceiling panels 110.

The aforesaid modular ceiling system, used to implement at least a part of the suspended ceiling arrangement 100, utilizes at least one supporting element 102 that, when in operation, supports given ceiling panels 116A to 116C of the plurality of ceiling panels 110 in at least one of:
 (i) lower than the general ceiling plane 114;
 (ii) higher than the general ceiling plane 114;
 (iii) substantially at the general ceiling plane 114, and
 (iv) at a tilted angle relative to the general ceiling plane 114.

Furthermore, the aforesaid modular ceiling system includes at least one functional module 118, for example an electrically and/or electronically operated ceiling device, that is supportable on the at least one supporting element 102. Beneficially, the at least one supporting element 102 is optionally fabricated from a material that is mechanically strong and is an effective heat-conductor, for example from sintered compressed metal powder or from an extruded metal (for example extruded Aluminum or press-formed Aluminum, Copper or steel sheet), thereby enabling the functional module 118 to dissipate its internal operating heat, if required, onto the "T"-bars 108 of the suspended ceiling arrangement 100.

Throughout the present disclosure, the term "suspended ceiling arrangement" refers to any ceiling consisting of a ceiling grid that is suspended or hung at a height below a structural ceiling of an architecture, such as a building. It will be appreciated that the structural ceiling 106 is an overhead interior surface that defines a physical upper limit of a given room. In an example, the structural ceiling 106 is at a height of 2.5 meters from a floor (not shown in FIG. 1) of the given room. In such an example, the height below the structural ceiling 106 for suspending the suspended ceiling arrangement 100 is 0.25 meters from the height of the structural ceiling 106, namely 2.25 meters from a floor of the given room. Furthermore, the hanging wires 104 can optionally be hinged, hooked, tied, coupled, plastered securely or fixed to the structural ceiling 106. In an exemplary embodiment, the suspended ceiling arrangement 100 is supported by the hanging wires 104 at the height to provide a gap between the structural ceiling 106 and the suspended ceiling arrangement 100, wherein the gap provides a space to accommodate the at least one functional module 118.

Optionally, the suspended ceiling arrangement 100 includes the "T"-bars 108 disposed in a grid formation, for example as illustrated in FIG. 1; beneficially, the "T"-bars 108 are implemented as elongate metal bars, for example implemented as mild-steel bars formed from mild-steel strip to provide, when viewed in cross-section, a lower planar portion and a central portion that is disposed centrally and orthogonally to the lower planar portion; in use, the lower planar portion is horizontally oriented, and the central portion is vertically oriented and above the lower planar portion. It will be appreciated that a weight of the one or more supporting elements 102 is supportable at various locations along the central portion of the "T"-bars 108. Ends of the "T"-bars 108 meet at intersecting junctions of the grid formation, as described in the foregoing. As aforementioned, the "T"-bars 108 are suitable to have one or more supporting elements 102 mounted thereonto at the intersecting junctions of the "T"-bars 108 that are capable of bearing considerable weight, or at positions along the "T"-bars 108 that are spatially remote from the aforesaid intersecting junctions. Furthermore, the grid formation provides a plurality of openings wherein removable panels (ceiling panels) are positioned and supported, as required, for example directly onto the lower planar portion of the "T"-bars 108 or via the one or more supporting elements 102 whose weight is supported on the central portion of the "T"-bars 108.

Examples of the at least one functional module 118 includes various electronic and/or electrical devices, for example including at least one of: power supplies, driver units, lighting arrangements, lighting fixtures, and so forth. Optionally, at least one functional module 118 includes one or more fixtures disposed in one or more ceiling panels such as alarm apparatus, down-lights, sensors, sensor amplifiers, loudspeakers, ventilation fans, heaters, humidifiers, anti-sound apparatus for sound cancellation purposes, air filters, water sprinklers, water mist humidifiers, fire detectors, wireless communication units and the like, but not limited thereto. Optionally, the suspended ceiling arrangement 100 can include a power module for supplying electric power to the various functional modules 118, for example wherein the power module is disposed in a "daisy-chain" arrangement so that connection cables employed can be relatively short to achieve a neat and orderly wiring loom in the suspended ceiling arrangement 100, and that is easier for personnel to appreciate, thereby allowing for easier maintenance by such personnel. As aforementioned, the power module includes a plurality of driver units disposed in a spatially distributed manner in the suspended ceiling arrangement 100 and supported on the one or more supporting elements 102; such a distributed configuration of the driver units spread heat dissipation and avoids any spatial "hot spots" arising. As will be described in greater detail later, the "daisy-chain" is optionally implemented using direct wire connections and/or resonant inductive couplers, whereat the driver units mutually interact with their spatially neighboring driver units. Resonant inductive coupling allows the driver units to be fully sealed and the suspended ceiling arrangement 100 is then capable of functioning even when a severe water leak occurs, for example water sprinklers being activated in a fire situation, and yet allowing the fixtures 118 to continue to be active, for example for providing fire alarms, announcements and room lighting, during an evacuation procedure being invoked in an event of a fire occurring or a terrorist incident arising.

Optionally, the "T"-bars 108 are conjoined to the hanging wires 104, either by hooking, welding, gluing, and so forth, as aforementioned. Moreover, the "T"-bars 108 include tracks or holes wherein the hanging wires 104 can be coupled to and/or can be latched onto for supporting (i.e. holding or suspending) the suspended ceiling arrangement 100 from the structural ceiling 106.

The suspended ceiling arrangement 100 includes a plurality of the ceiling panels 116A to 116C arranged in the array of cells defined by the "T"-bars 108, namely the series of openings define a grid of rows and columns as illustrated in FIG. 1. In an example, the grid may include "20" rows and "50" columns. Moreover, the central vertical portion of the "T"-bars 108 beneficially provide the boundary of the openings of the suspended ceiling arrangement 100, wherein the ceiling panels (such as the ceiling panels 116A to 116C) are accommodated. Furthermore, the ceiling panels optionally have rectangular shapes, square shapes, polygonal shapes, rhombic shapes, and are suitable to being customized, for example having cutouts formed therein, to provide space for accommodating fixtures that are to be retrofitted, and so forth.

Furthermore, the term "ceiling panels" as used herein relates to a lightweight structure, usually a shallow cuboidal structure, having a length, a breadth, and a height which are placed within the opening formed by the "T"-bars 108 for providing a planar lower surface of the suspended ceiling 106; optionally, the ceiling panels are fabricated from a porous cellular structure, having gaseous voids therein.

Optionally, the ceiling panels 116A to 116C are implemented as a plurality of substantially mutually identical panels, wherein each panel is substantially rectangular in form, for example square, when viewed from the given room. The ceiling panels 116A to 116C have edges that rest on the lower planar portions of the "T"-bars 108. Optionally, the ceiling panels 116A to 116C include at least one edge having one or more lengthwise protruding lips and/or one or more lengthwise grooves along a whole length of the edge, thereby enabling the ceiling panels 116A to 116C to be securely held (namely supported) on the lower planar portion of the "T"-bars 108.

The flat horizontal lower portions of the "T"-bars 108 define a general ceiling plane for the plurality of ceiling panels, as aforementioned. The term "general ceiling plane" used herein refers to an imaginary plane, parallel to a floor or flooring surface of the given room, along which typically conventional ceiling panels are arranged. Furthermore, in or along the general ceiling plane, the conventional ceiling panels are positioned or arranged mutually adjacently and parallel to each other.

The supporting elements 102 are each beneficially a continuous solid structure including a shape that is configured to mount securely onto the central vertical portion of the "T"-bars 108 and, when required, hold the plurality of ceiling panels 116A to 116C. Furthermore, the supporting elements 102 are fabricated in a manner for differently positioning the ceiling panels 116A to 116C with respect to the aforesaid general ceiling plane, for example at various heights above or below the general ceiling plane, or at non-parallel (i.e. inclined) angles relative to the general ceiling plane 114. Additionally, the supporting elements 102 are manufactured as a plurality of parts that are assembled together, or are manufactured as monolithic integral parts. When the supporting elements 102 are monolithic structures, namely each being a continuous integral structure, they are beneficially fashioned out of a solid block or otherwise integrally formed, for example by machining, molding (moulding) or casting. Furthermore, the block can be a block of metal, extruded metal, extruded Aluminum, plastics material, filled plastics material, metal-filled plastics material, recycled plastics material, compressed sintered metal powder, wood and the like.

The supporting elements 102 can be used to support the given ceiling panel of the plurality of ceiling panels 116A to 116C higher than the general ceiling plane 114. Specifically, the supporting elements 102 hold the edges of a given ceiling panel to raise it relative to the general ceiling plane 114. It will be appreciated that the heights of the given ceiling panel and the general ceiling plane 114 are conveniently measured from the floor of the given room. For example, the height of the given ceiling panel in such a raised position is 2.25 meters (metres) from the floor. In such an example, the supporting elements 102 hold the given ceiling panel at a height of 2.30 meters (metres) from the floor of the room.

The supporting elements 102 can be used to support the given ceiling panel of the plurality of ceiling panels 116A to 116C lower than the general ceiling plane 114. Specifically, the supporting elements 102 hold the edges of the given ceiling panel in a manner that the position of the given ceiling panel is lower than the general ceiling plane 114. Optionally, the given ceiling panel that is lower than the general ceiling plane 114 includes a height that is less than a height of the general ceiling plane 114. It will be appreciated that the heights of the given ceiling panel and the general ceiling plane 114 is conveniently measured from the floor of the room. For example, the height of the given ceiling panel may be 2.25 meters from the floor. In such an example, the supporting elements 102 hold, namely support, the given ceiling panel at a height of 2.20 meters from the floor of the room.

The supporting elements 102, when in operation, optionally support the given ceiling panel of the plurality of ceiling panels 116A to 116C at a tilted angle relative to the general ceiling plane 114. Optionally, the supporting elements 102 hold an edge of the given ceiling panel at a position that is higher than the general ceiling plane 114 and another edge of the given ceiling panel is at a position that is lower than the general ceiling plane 114. Optionally, the supporting elements 102 hold an edge of the given ceiling panel at a position that is higher than the general ceiling plane 114 and another edge of the given ceiling panel is held on the general ceiling plane 114. More optionally, the supporting elements 102 hold an edge of the given ceiling panel at a position that is lower than the general ceiling plane 114 and another edge of the given ceiling panel is held on the general ceiling plane 114. In an example, wherein the supporting elements 102 hold the given ceiling panel at a tilted angle relative to the general ceiling plane 114, a height of at least one edge of the given ceiling panel will be more than a height of the general ceiling plane 114, and a height of at least one edge will be less than a height of the general ceiling plane 114. Moreover, the edge having the greater height from the general ceiling plane 114 is opposite to the edge having the lesser height from the general ceiling plane 114. For example, the height of the given ceiling panel may be 2.25 meters from the floor. In such example, the supporting elements 102 hold the given ceiling panel in a manner that an edge of the given ceiling panel is at a height of 2.30 meters (metres), and the opposite edge is at a height of 2.20 meters (metres) from the floor of the room, respectively.

The suspended ceiling arrangement 100 can comprise at least one functional module 118 (for example a plurality of functional modules 118), as aforementioned, mounted on the supporting elements 102. The functional modules 118 potentially provide one or more services or functionalities; examples of the electrically and/or electronically operated ceiling devices optionally include (but not limited to) light sources, sensor arrangements, actuator arrangements, air conditioners, air purifiers, water sprinklers, image projectors, anti-noise cancellation apparatus and the like. Beneficially, the electrically and/or electronic ceiling devices are mounted securely on the recess structure included in the supporting elements 102. The electrical and/or electronic ceiling devices are beneficially securely held using various fastening arrangements, such as screws, nuts, bolts, adhesives, rivets, tie-wraps and the like.

Figure 2:
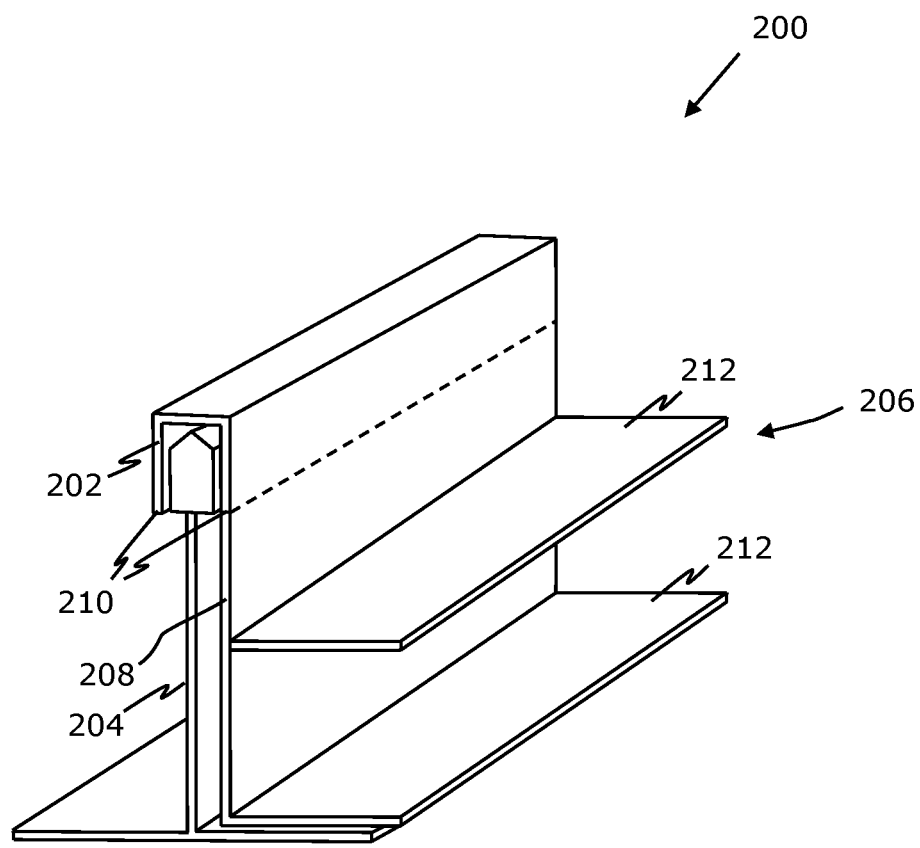
FIG. 2 is an illustration of an exemplary supporting element (namely supporting bracket) of the module ceiling system of the present disclosure, wherein the supporting element mounts, when in use, onto a "T"-bar of a suspended ceiling arrangement, in accordance with an embodiment of the present disclosure.

FIG. 2 is an illustration of an example of a supporting element 200, in accordance with an embodiment of the present disclosure. As shown, the supporting element 200 comprises a "U"-shaped portion (such as a mounting portion) indicated generally by reference numeral 202 that is detachably mountable in operation on a given "T"-bar 204, and at least one supporting feature indicated generally by 206 that is integral with the mounting portion 202. By "U"-shaped portion is meant one or more mechanical components that define, either continuously or intermittently via use of "U"-shaped members with gaps therebetween, a channel of "U"-shaped cross-section that is capable, when in use, of engaging with an upper portion of one or more "T"-bars of the suspended ceiling arrangement.

The "U"-shaped portion 202 is detachably mountable on the given "T"-bar by accommodating the "T"-bar 204 between a recess of an elongate "U"-shaped structure 202. In an example, the "U"-shaped portion 202 is secured in position on the "T"-bar 204 by using a fastening arrangement such as screws, nuts, bolts, adhesives, rivets, tie-wraps and the like. In another example, the "U"-shaped portion 202 is secured to the "T"-bar 204 using a sliding mechanism such as a slider, a roller, an adjustable clamp, a resiliently-biased clamp and the like. In such an example, the "U"-shaped portion 202 slides detachably over the vertical central portion of the "T"-bar 204. Additionally, the "U"-shaped portion 202 has a dimension of height when installed (as shown in FIG. 2) that is less than the flat vertical portion of the "T"-bar, so that the supporting element 200 is a snug fit onto the "T"-bar 204; for example, by "snug fit" is meant less than 2 mm adjustment tolerance, optionally less than 1 mm adjustment tolerance. Optionally, the material for manufacturing the "U"-shaped portion 202 includes metals, extruded metals, metal alloys, hardened polyvinyl materials, plastics materials, glass-filled plastics materials, ceramic materials and the like. The "U"-shaped portion 202, namely employing a "substantially U-shaped structure", namely to a shape resembling an alphabetical letter "U". Furthermore, the supporting element 200 comprises at least one supporting portion coupled to and extending generally laterally from at least one side of the "U"-shaped portion 202. The "U"-shaped portion has lateral members, and a curved generally orthogonal member joining the lateral members; the lateral members abut to the central vertical portion of the "T"-bar 204, and the orthogonal member abuts to an upper edge of the central vertical portion of the "T"-bar 204.

Referring next to the at least one supporting feature 206, that is integral with the "U"-shaped portion 202, there is provided features disposed linearly and laterally to form a recess structure for holding one or more objects. Optionally, the at least one supporting portion 206, when in operation, supports a weight of an edge of the given ceiling panel; the recess structure is configured in a manner that the edge of the given ceiling panel securely fits into the recess structure of supporting element 200. Optionally, the at least one supporting portion 206, when in operation, supports a weight of the functional module 118 onto the "T"-bar 204, for example an electrically and/or electronically operated ceiling device, for example as shown in FIG. 1. Moreover, the functional module 118 is supported via the at least one supporting portion 206 in a manner that the functional module 118 is capable of providing the one or more services or functionalities within a given room, for example down-lighting illumination.

Additionally, the at least one supporting feature 206 includes at least one lateral supporting feature 212 extending from at least one end 210 of the elongate "U"-shaped structure 208, and a plurality of lateral supporting features 212 extending from a lower region of the supporting element 200. Optionally, each of the plurality of lateral supporting features 212 can be formed as an integral part of the elongate U-shaped structure 208 on one side (or alternatively, on both sides) thereof. In such an arrangement, the plurality of lateral supporting features 212 act as horizontal flanges extending outwards from the elongate U-shaped structure 208. Optionally, each of the plurality of lateral supporting features 212 can be disposed on the elongate "U"-shaped structure 208 at an angle within a range of 45° to 90° with respect to a surface plane of the elongate "U"-shaped structure 208. It will be appreciated that such an arrangement of the elongate "U"-shaped structure 208 at the angle enables an arrangement of the ceiling panels inclined at various angles with respect to the general ceiling plane 114 to be achieved.

Furthermore, the plurality of lateral supporting features 212 form a gap therebetween for receiving a ceiling panel therebetween. Subsequently, upon arranging the ceiling panel between plurality of lateral supporting features 212, the ceiling panel can be fixedly coupled to the plurality of lateral supporting features 212, such as by using a fastening arrangement including, but not limited to, screws, nuts, bolts, adhesive, and so forth. It will be appreciated that arrangement of the ceiling panel between the plurality of lateral supporting features 212 enables the ceiling panel to be maintained securely in a required position (for example, for risking ceiling panels from become loose and falling in an Earthquake or similar environmental shock conditions, for example explosions).

Optionally, the supporting portion 206 includes at least one outwardly-projecting linear supporting feature extending from the elongate "U"-shaped structure. The term "linear supporting feature" relates to a planar solid structure extending from the at least one part of the elongate "U"-shaped structure, for example perpendicularly to the general ceiling plane of the suspended ceiling system. Furthermore, the at least one linear supporting feature is integral to the elongate "U"-shaped structure and supported along with the mounting portion on the "T"-bars. Optionally, the material for manufacturing the supporting portion 206 includes metal, extruded metal, extruded Aluminum, plastics material, filled-plastics material, metal-filled plastics material, recycled plastics material, compressed sintered metal powder, wood and the like.

Figure 3:
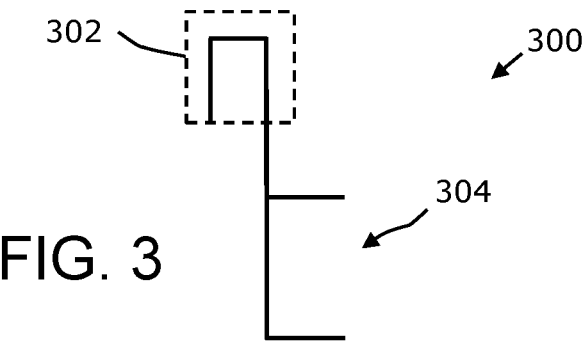
FIG. 3 is a simple cross-sectional illustration of the supporting element of FIG. 2, having two projecting supporting features on one lateral side of the supporting element, in accordance with an embodiment of the present disclosure.
Figure 4:
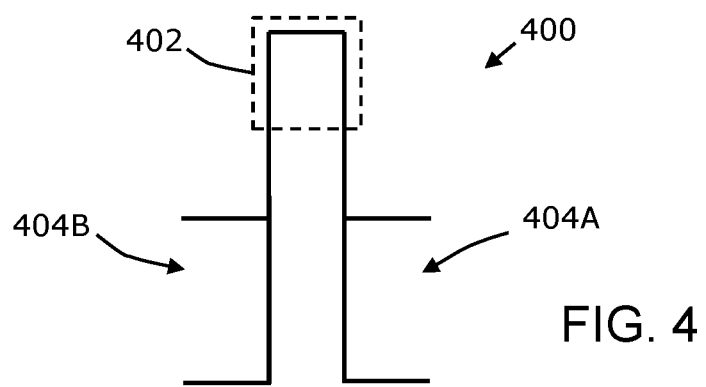
FIG. 4 is a simple cross-sectional illustration of an alternative supporting element, wherein each lateral side of the supporting element has two projecting supporting features, in accordance with an embodiment of the present disclosure.
Figure 5:
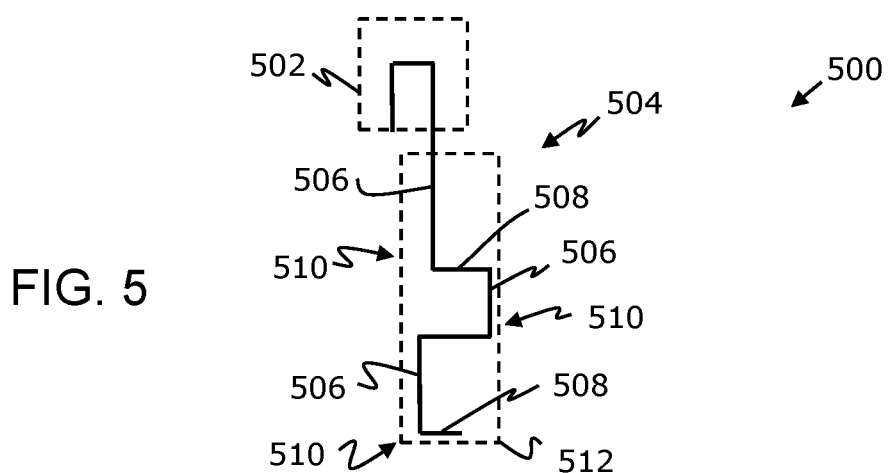
FIG. 5 is simple cross-section illustration of an alternative supporting element, wherein a lower portion of the supporting element follows a zigzag profile to define a lateral projecting supporting feature of the supporting element, in accordance with an embodiment of the present disclosure.

FIGS. 3 to 5 are illustrations of exemplary embodiments of the supporting element of the modular ceiling system, for example generally akin to the supporting element 200 as shown in FIG. 2, in accordance with various exemplary embodiments of the present disclosure.

FIG. 3 depicts a cross-section of a supporting element 300 that includes a "U"-shaped portion 302, and a supporting portion 304. As shown, the "U"-shaped portion 302 of the supporting element 300 is a substantially U-shaped structure that fits over an upper edge of a vertical central portion of a "T"-bar. It will be appreciated that the cross-section of the supporting element 300 is a portion that can be viewed when cut thoroughly along a center thereof. Furthermore, the "U"-shaped portion 302 includes three mounting features that are integral to each other for providing U-shaped structure. Thus, a structural arrangement of the three mounting features of the "U"-shaped portion 302 provides a recess to accommodate the "T"-bars 108 (with reference to FIG. 1) therein, when mounted thereto. Furthermore, the supporting portion 304 includes a linear supporting feature that is integral to the "U"-shaped portion 302, extending from one (right side as shown in FIG. 1) of the ends of the mounting features of the "U"-shaped portion 302. Additionally, the linear supporting element is generally perpendicular, when in use, to the general ceiling plane 114 (with reference to FIG. 1). Furthermore, the supporting portion 304 also includes two lateral supporting features extending outwardly from the elongate supporting element. Additionally, the two lateral supporting elements are integral and perpendicular to the linear supporting element. Furthermore, additionally, the two lateral supporting features are parallel to the general ceiling plane 114 (with reference to FIG. 1). Optionally, the supporting element 300 is manufactured as an integral component, for example by way of plastics-material injection molding (moulding) processes, metal sintering processes or metal extrusion processes.

FIG. 4 depicts a cross-section of a supporting element 400 that includes a "U"-shaped portion 402, and two supporting portions 404A and 404B. As shown, the "U"-shaped portion 402 of the supporting element 400 is a substantially U-shaped structure, for example as described with reference to FIG. 3. It will be appreciated that the cross section of the supporting element 400 is a portion that can be viewed when cut thoroughly along a center thereof. Notably, a structural arrangement of the three mounting elements of the mounting portion 402 provides a recess to accommodate the "T"-bars 108 (with reference to FIG. 1) therein, when mounted thereto. Furthermore, each supporting portion 404 includes two outwardly-projecting linear supporting elements that are integral to the mounting portion 402. Additionally, the two linear supporting elements, when in use, are perpendicular to the general ceiling plane 114 (with reference to FIG. 1). Optionally, each of the "U"-shaped portion 402 and the supporting portions 404A to 404B can be separate when apart and can be coupled together by employing a fastening arrangement such as welding, adhesives, and the like.

FIG. 5 depicts a cross-section of the supporting element 500 that includes a "U"-shaped portion 502, and a supporting portion 504. Optionally, the supporting portion 504 includes a plurality of linear supporting elements 506, and a plurality of lateral supporting elements 508, wherein a given linear supporting element 506 is integral with a given lateral supporting element 508 to form an L-shaped structure 510. The plurality of linear supporting elements 506 are integral to the "U"-shaped portion 502 and perpendicular to the general ceiling plane 114 (as shown in FIG. 1). Additionally, a plurality of lateral supporting elements 508 are perpendicular to the plurality of linear supporting elements 506. The plurality of lateral supporting elements 508 is fabricated to form an enclosure having an open front. For example, the plurality of lateral supporting elements 508 can be fabricated using a hollow cuboidal structure, wherein a front-face and each of the side-faces (such as a left-face and a right-face) of the hollow cuboidal structure is open. In such an example, the hollow cuboidal structure can be integrally fabricated as part of the plurality of linear supporting elements 506. Furthermore, a height of the hollow cuboidal structure corresponds substantially to the thickness of the ceiling panel (such that, the thickness of the ceiling panel is within a range of 90% to 99% of the height of the hollow cuboidal structure without the front-face and the side-faces). In such an example, the ceiling panel can be arranged within the hollow cuboidal structure by sliding one end of the ceiling panel through the hollow cuboidal structure, along a length of the hollow cuboidal structure. It will be appreciated that as the height of the hollow cuboidal structure substantially corresponds to the thickness of the ceiling panel, the ceiling panel is tightly held within the hollow cuboidal structure. Optionally, the hollow cuboidal structure can be arranged such that horizontal planes thereof are perpendicular to the plurality of linear supporting elements 506. Alternatively, the hollow cuboidal structure can be arranged such that the horizontal planes thereof are disposed at an angle within a range of 45° to 90° with respect to the plurality of linear supporting elements 506. Optionally, each of the plurality of linear supporting elements 506 and the plurality of lateral supporting elements 508 is separate when apart and may be coupled by a fastening arrangement such as welding, adhesives, and the like. Optionally, the supporting portion 504 includes a plurality of L-shaped structures 510, corresponding to the plurality of linear supporting elements 506 and lateral supporting elements 508, that is integral to form an orthogonal zigzag type of structure 512.

Optionally, the linear supporting elements 506 and lateral supporting elements 508 are arranged in a manner to form a plurality of L-shaped structures. Furthermore, the plurality of L-shaped structures is arranged alternatively to form the orthogonal zigzag type of structure 512. For example, a first hollow cuboidal space and a second hollow cuboidal space formed by the linear supporting elements 506 and lateral supporting elements 508 can be arranged such that the first hollow cuboidal space has the open front towards a right of the plurality of linear supporting elements 506 and the second hollow cuboidal space has the open front towards a left of the plurality of linear supporting elements 506. Furthermore, the first hollow cuboidal space is arranged above the second hollow cuboidal space, and the first and second hollow cuboidal spaces are arranged in a manner such that a cross-section thereof forms the orthogonal zigzag type of structure 512. In such an example, the edges of the ceiling panel can be arranged within the first and the second hollow cuboidal spaces allowing the ceiling panels to be supported by the supporting element 500. In such an example, the orthogonal zigzag type of structure 512 comprises a length which is approximately equal to one quarter of the total length of the supporting element 500.

Figure 6:
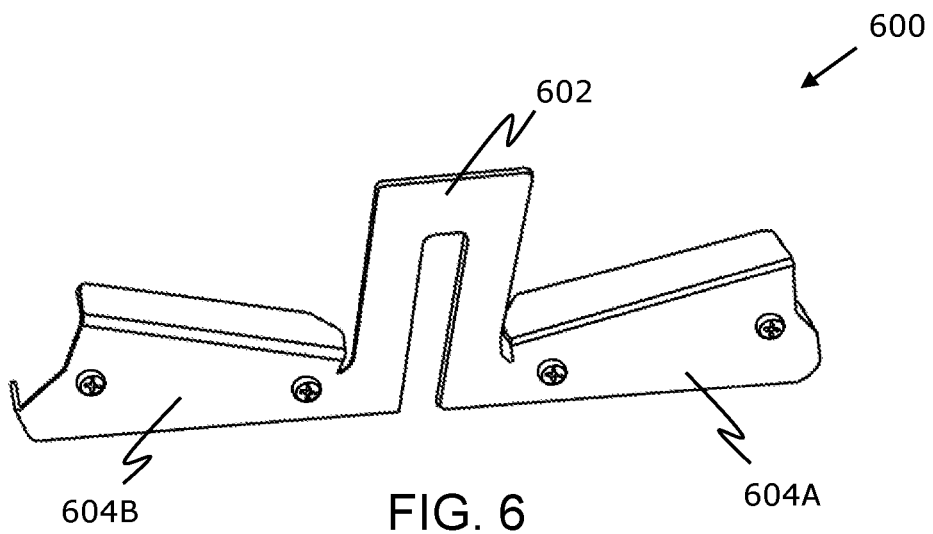
FIG. 6 is an illustration of an end plate of a supporting element for a modular ceiling system, in accordance with another embodiment of the present disclosure.

Referring to FIG. 6, there is shown an illustration of a supporting element 600 for a modular ceiling system, in accordance with another embodiment of the present disclosure; the supporting element 600 is beneficially implemented as an end plate that is supportable over a T-bar of a suspended ceiling arrangement. Moreover, the end plate is beneficially manufactured from a sheet metal, for example an Aluminium (Aluminum) metal sheet, a steel sheet, a Titanium sheet or similar, although not limited thereto. Optionally, the end plate has a thickness in a range of 2 mm to 10 mm, and more optionally has a thickness in a range of 3 mm to 6 mm. The end plate is optionally manufactured using metal-sheet stamping, metal-sheet laser cutting or metal-sheet machining. As shown, the supporting element 600 comprises a "U"-shaped portion 602 that is detachably mountable in operation on a given "T"-bar, and at least one supporting portion 604 that is integral with the "U"-shaped portion 602. Herein, the "U"-shaped portion 602 includes two supporting portions, 604A and 604B one on each side of the "U"-shaped portion 602. As shown, each of the supporting portions 604A and 604B includes a groove formed at an inner surface of the supporting portions 604A and 604B. The groove is generally "C"-shaped configured to accommodate at least one mounting member (as shown clearly in FIGS. 7A-7B) therein. Beneficially, the "U"-shaped portion 602 has a height that is less than the flat vertical portion of the "T"-bar when installed, so that the supporting element 600 is a snug fit onto the "T"-bar; "snug fit" is, for example, defined in the foregoing. Optionally, as aforementioned, the material for manufacturing the supporting element 600 includes metals, extruded metals, metal alloys, hardened polyvinyl materials, plastics materials, glass-filled plastics materials, ceramic materials and the like.

Figure 7A:
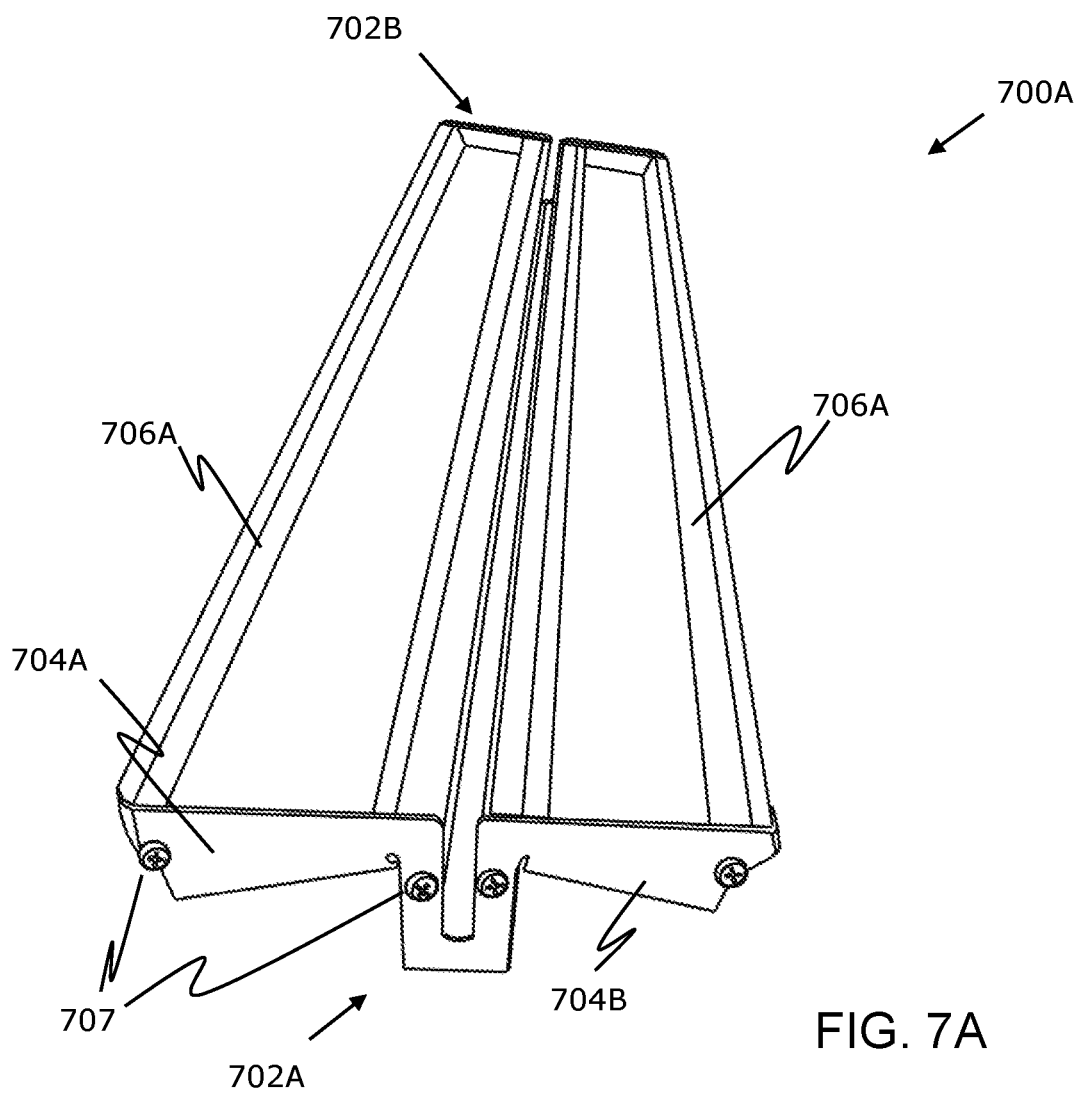
FIGS. 7A-7B are illustrations of an exemplary implementation of supporting element of FIG. 6 in a modular ceiling system to support a mounting member therewith, wherein the supporting element employs end plates for engaging over a T-bar of a suspended ceiling arrangement, in accordance with various embodiments of the present disclosure.
Figure 7B:
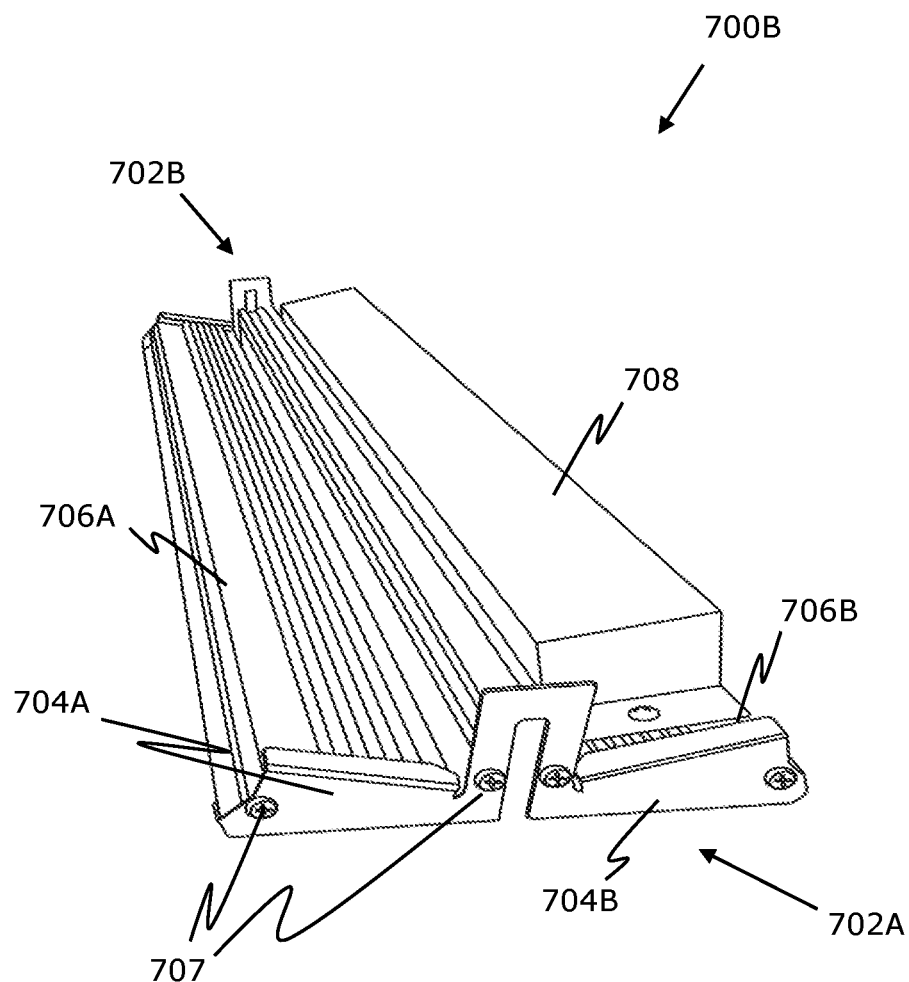

Referring to FIGS. 7A and 7B, there is shown an exemplary implementation of supporting elements 702A and 702B (such as the supporting element FIG. 6) connected to a functional modules 700A and 700B, in accordance with an embodiment of the present disclosure. When in use, two opposing supporting elements 702A and 702B are mounted on a given "T"-bar at two respective longitudinal ends thereof. Beneficially, the two supporting elements 702A and 702B are implemented as end plates that are supportable over a T-bar of a suspended ceiling arrangement. Moreover, the end plates are beneficially manufactured from sheet metal, for example an Aluminium (Aluminum) metal sheet, a steel sheet, a Titanium sheet or similar, although not limited thereto. Optionally, each end plate has a thickness in a range of 2 mm to 10 mm, and more optionally has a thickness in a range of 3 mm to 6 mm. The end plates are optionally manufactured using metal-sheet stamping, metal-sheet laser cutting or metal sheet machining. Furthermore, the supporting element 702A includes a "U"-shaped portion for engaging onto one longitudinal end of a "T"-bar, and two supporting portions 704A and 704B coupled to and extending laterally from respective sides of the "U"-shaped portion. Similarly, the supporting element 702B includes a "U"-shaped portion for engaging onto another longitudinal end of the "T"-bar, and two supporting portions (not shown) coupled to and extending laterally from respective sides of the "U"-shaped portion. Furthermore, each of the supporting portions of the supporting elements 702A and 702B, includes a groove formed at an inner surface of the supporting portions. It will be appreciated that the supporting elements 702A and 702B are mounted on the longitudinal ends of the "T"-bar such that the respective grooves of each of the supporting elements 702A and 702B face each other. As shown, the at least one mounting member, such as the mounting members 706A and 706B are each supported between the two opposing supporting elements in the grooves therein. Fastening bolts 707 are used to attach the supporting elements 704A and 704B to the mounting members 706A and 706B. Other embodiments use flat supporting elements without grooves.

Furthermore, the mounting members 706A and 706B, when supported between the two opposing supporting elements 702A and 702B, are extending and arranged parallel to the longitudinal length of the "T"-bar to which the two opposing supporting elements 702A and 702B are mounted. Notably, the mounting members 706A and 706B are secured in position using a fastening arrangement such as screws, nuts, bolts, adhesives, rivets, tie-wraps and the like. Furthermore, as shown, the mounting members 706A and 706B are longitudinal structures having a recess for holding one or more objects. Optionally, one or more functional modules, such as lighting fixtures, can be installed into the recess (formed in the front surface) of the mounting members 706A and 706B.

Optionally, the supporting portions when in operation, supports a weight of an edge of the given ceiling panel; the recess structure is configured in a manner that the edge of the given ceiling panel securely fits into the recess structure of the mounting members 706A and 706B. Furthermore, as shown in FIG. 7B, at least one of the mounting members (herein, 706B), when in operation supports a weight of other modules, such as a power module 708 on the T-bar, securely coupled to the rear surface of the mounting member 706B. Moreover, the power module 708 is supported via the at least one mounting member 706B in a manner that the power module 708 is capable of providing power to the functional modules, such as the lighting fixtures, installed in each of the mounting members 706A and 706B.

Figure 8A:
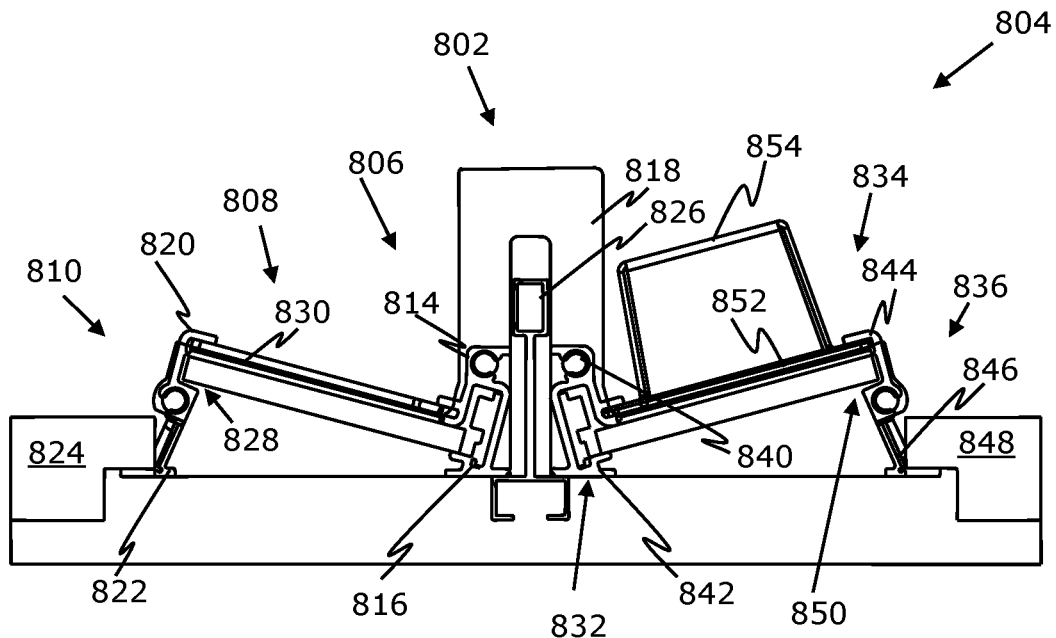
FIGS. 8A-8B are planar illustrations of exemplary embodiments of the modular ceiling system implementing a supporting element, in accordance with yet another embodiment of the present disclosure.
Figure 8B:
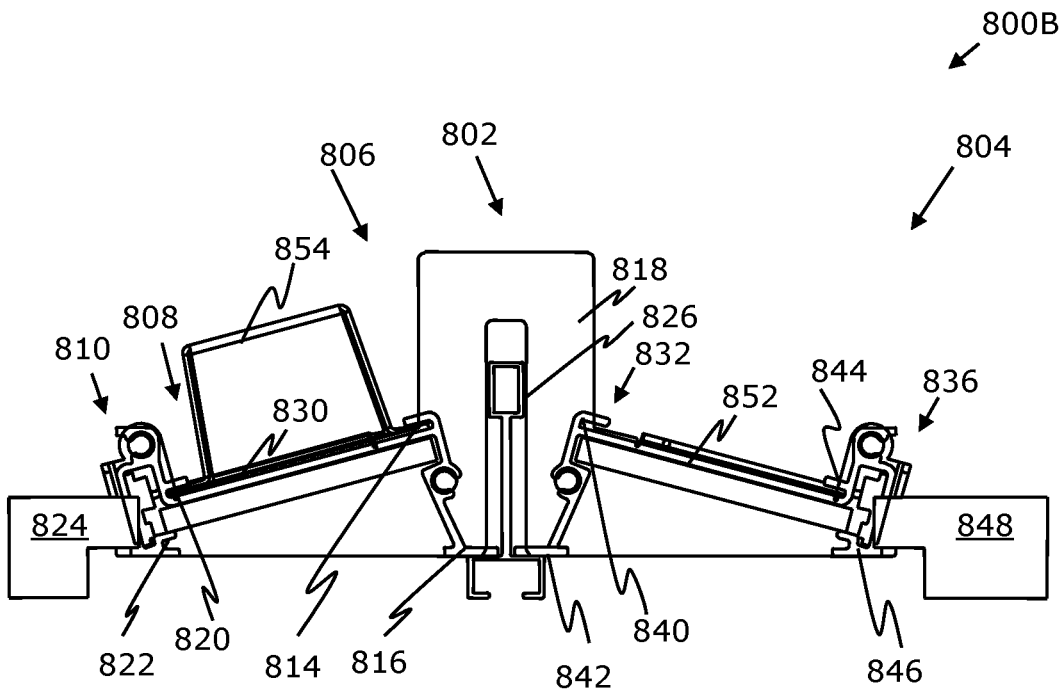

FIGS. 8A, 8B, 8C, 8D, 8E, and 8F are illustrations of exemplary embodiments of lighting fixtures deployed within a modular ceiling system as functional modules. In FIGS. 8A and 8B a U-shaped supporting element 802 in accordance with various exemplary embodiments of the present disclosure is shown at the far end of the light fixture with the near end supporting element b removed to show internal components. Referring to FIG. 8A, there is shown a supporting element having two supporting portions 802 and 804. The supporting portion 802 comprises a first arm 806, a support arm 808 and a second arm 810. The first arm 806 of the supporting portion 802 comprises a first end 814 and a second end 816, such that the first arm 806 of the supporting portion 802 is connected to the "U"-shaped portion 818 from the first end 814 thereof. The support arm 808 is connected to the second end 816 of the first arm 806. Moreover, the second arm 810 includes a first end 820 and a second end 822. The second arm 810 is connected to the support arm 808 from the first end 820 thereof. Furthermore, the second arm 810 is coupled to a ceiling panel 824 at the second end 822 thereof. The support arm 808 of the supporting element mounted on a given "T"-bar 826 includes a groove 828 formed at an inner surface thereof. The groove 828 supports a mounting member to accommodate a functional module such as a lighting assembly 830. It will be appreciated that the mounting member is extending and arranged generally parallel to a longitudinal length of the "T"-bar 826.

Furthermore, in one or more examples, the first arm 806 and the second arm 810 are pivotable structures, wherein the first arm 806 and the second arm 810 are adaptable to be disposed in one of an expanded state or a contracted state. As shown in FIG. 8A, the first arm 806 is disposed in a contracted state, whereas the second arm 810 is disposed in an expanded state. The pivotable structure of the first arm 806 and the second arm 810 allows varying of angles of the support arm 808 with respect to the "U"-shaped portion 818. Such varying of angles of the support arm 808 allows for a change in optical output of the lighting assembly 830.

Moreover, the supporting portion 804 comprises a first arm 832, a support arm 834 and a second arm 836. The first arm 838 of the supporting portion 804 comprises a first end 840 and a second end 842, such that the first arm 838 of the supporting portion 804 is connected to the "U"-shaped portion 818 from the first end 840 thereof. The support arm 834 is connected to the second end 842 of the first arm 838. Moreover, the second arm 836 includes a first end 844 and a second end 846. The second arm 836 is connected to the support arm 834 from the first end 844 thereof. Further, the second arm 836 is coupled to a ceiling panel 848 at the second end 846 thereof. The support arm 834 of the supporting element mounted on a given "T"-bar 826 includes a groove 850 formed at an inner surface thereof. The groove 850 supports a mounting member to accommodate a functional module such as a lighting assembly 852 and a power module 854 such as driver circuit. It will be appreciated that the mounting member is extending and arranged generally parallel to a longitudinal length of the "T"-bar 826. Furthermore, the first arm 832 and the second arm 836 are pivotable structures, wherein the first arm 832 and the second arm 836 are adaptable to be disposed in one of an expanded state or a contracted state. As shown in FIG. 8A, the first arm 832 is disposed in a contracted state, whereas the second arm 836 is disposed in an expanded state. The pivotable structure of the first arm 832 and the second arm 836 allows varying of angles of the support arm 834 with respect to the "U"-shaped portion 818. Such varying of angles of the support arm 834 allows for a change in optical output of the lighting assembly 852.

As can be seen form FIGS. 8A-8B, the groove 828 supports a mounting member to accommodate the functional module 830 such as a lighting assembly and the power module 854 such as the driver circuit. Moreover, the groove 850 supports a mounting member to accommodate a functional module 852 such as a lighting assembly. Furthermore, the first arm 806 is disposed in an expanded state, whereas the second arm 810 is disposed in a contracted state. The pivotable structures allow varying of angles of the support arm 808 with respect to the "U"-shaped portion 818. Such varying of angles of the support arm 808 allows for a change in optical output of the lighting assembly 830. Furthermore, the first arm 832 is disposed in an expanded state, whereas the second arm 836 is disposed in a contracted state. The pivotable structures allow varying of angles of the support arm 834 with respect to the "U"-shaped portion 818. Such varying of angles of the support arm 834 allows for a change in optical output of the lighting assembly 852.

Figure 8C:
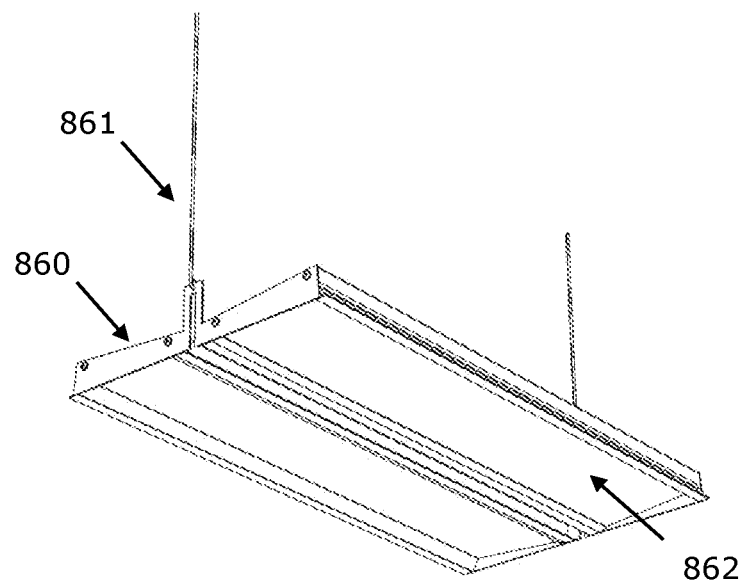
FIGS. 8C-8F are isometric illustrations of exemplary embodiments of the modular ceiling system implementing a supporting element, in accordance with the FIGS. 8A-8B.
Figure 8D:
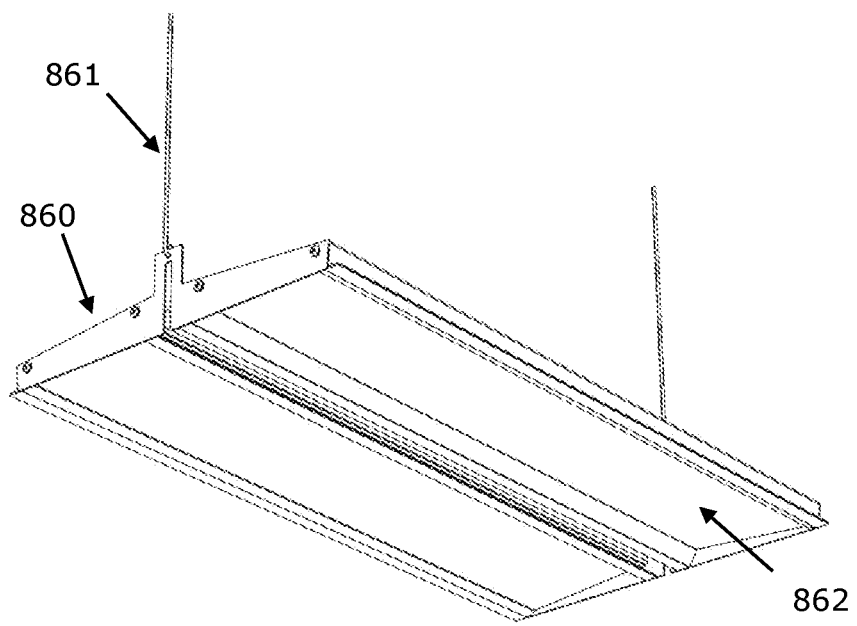
Figure 8E:
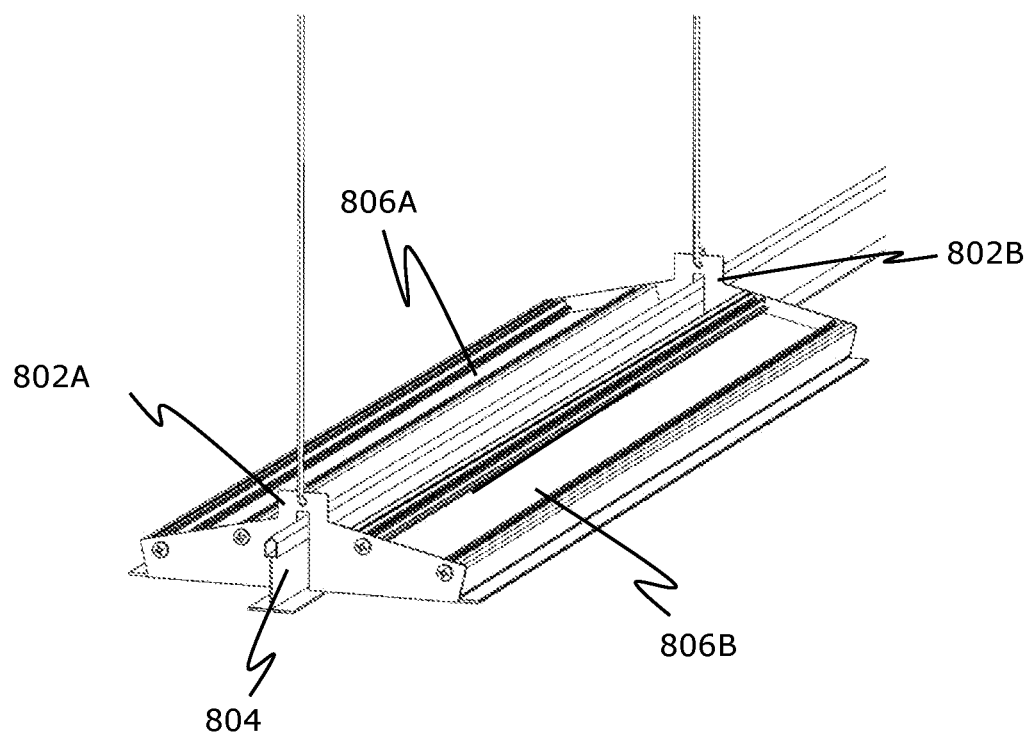
Figure 8F:
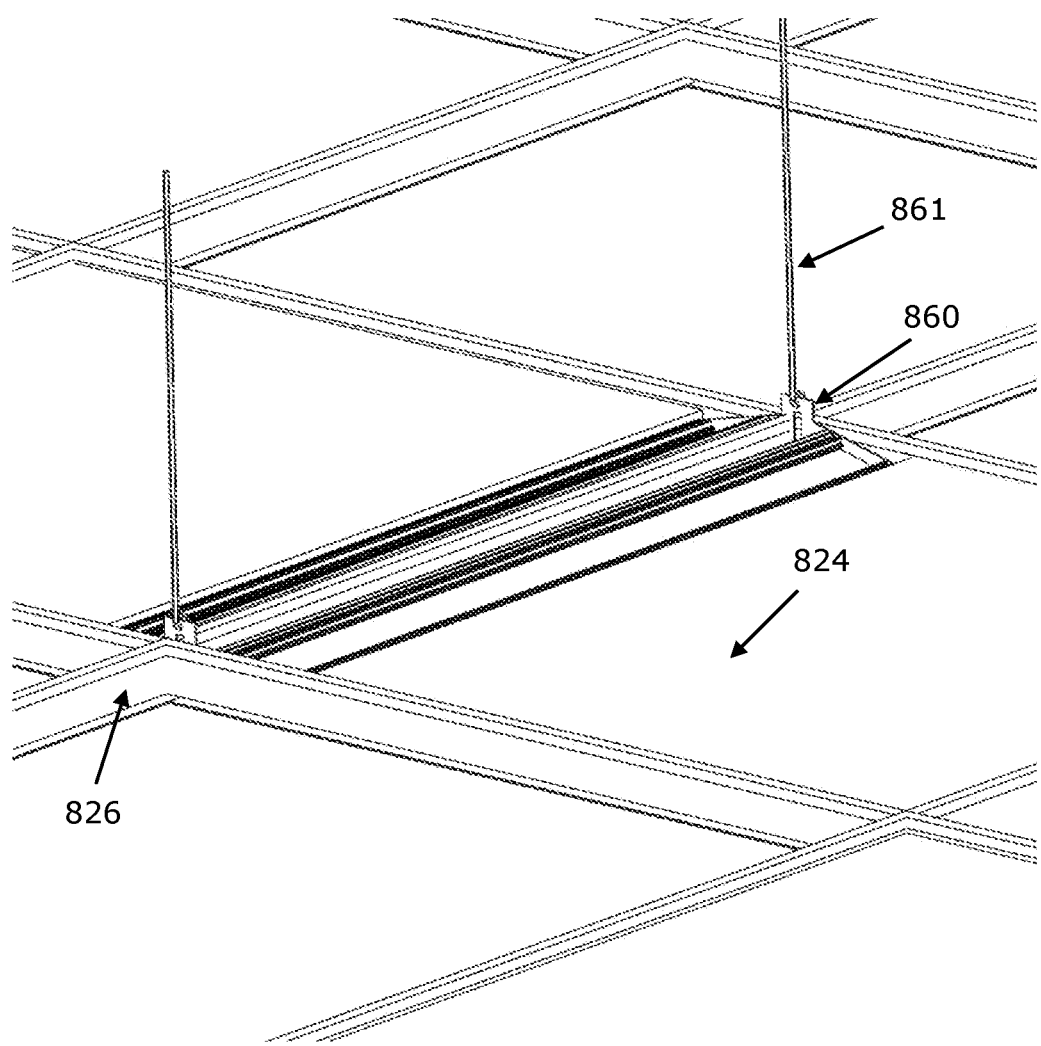

FIGS. 8C-8E are the corresponding isometric views of FIGS. 8A-8B with the further addition of suspension wire 861 to support the light fixtures by use of the end plates 860. FIG. 8C illustrates a design with light guides 862 angled downward towards the center and FIG. 8D illustrates a design with lightguides angled up towards the center. FIG. 8E further shows mounting of an embodiment light fixture mounted onto a T-bar 804. FIG. 8F illustrates a view from above the T-bar grid of an installed light fixture including T-bars 826 ceiling panels 824.

Figure 9A:
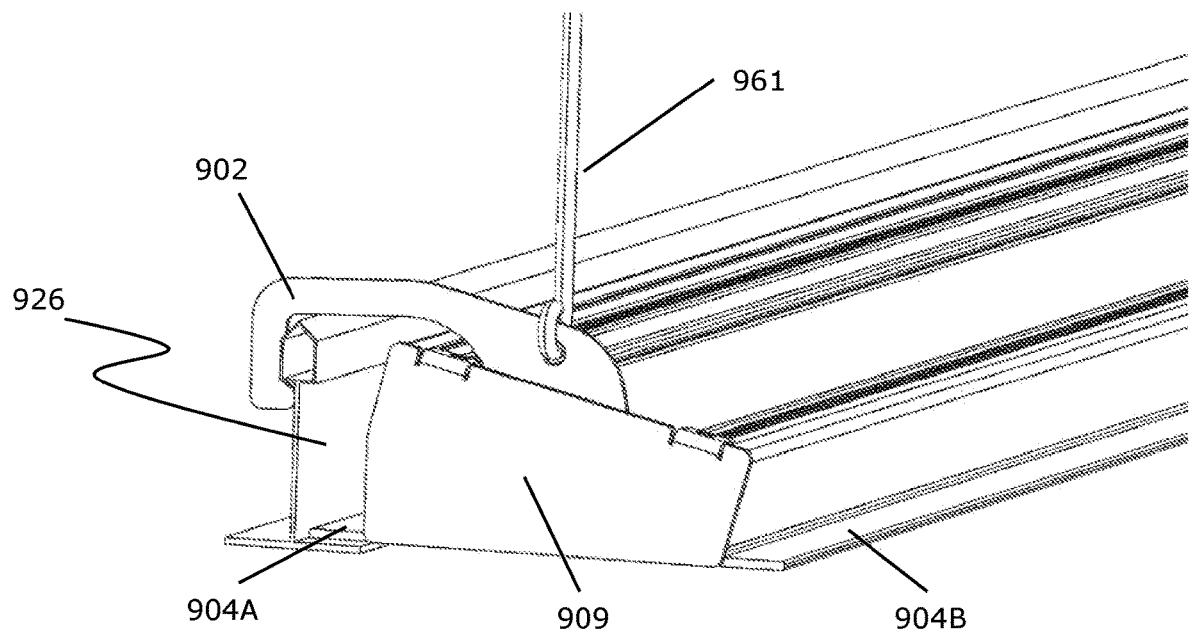
FIG. 9A is an isometric view of a support element mounted on a longitudinal end of a light fixture that latches in a perpendicular orientation to a T-bar with a modular ceiling system.

FIG. 9A illustrates an embodiment wherein a lighting fixture is mounted to a T-bar 904 with the use of a support element 902 in the form of a latching arm that extends perpendicular to the longitudinal axis of the light fixture and in combination with the support portion 904A of the light fixture holds the light fixture in a cantilevered position from the T-Bar 926. The optional suspension wire 961 further supports the light fixture. The support portion 904B of the light fixture serves as a connecting point with a ceiling tile.

Figure 9B:
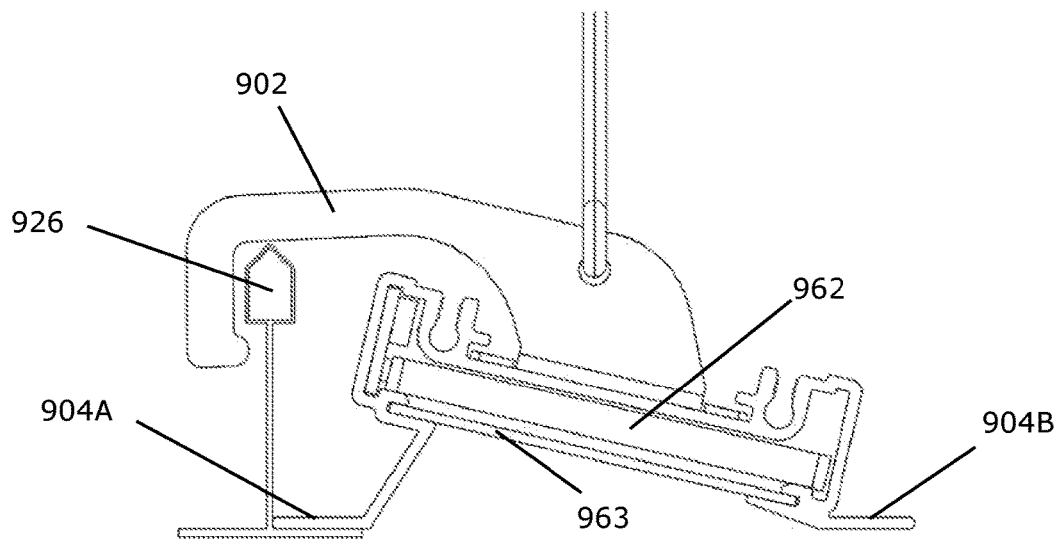
FIG. 9B is an end view of (with end cap removed) of the embodiment of FIG. 10A support element mounted on a longitudinal end of a light fixture that latches in a perpendicular orientation to a T-bar with a modular ceiling system.

FIG. 9B shows a cross-section view of the same embodiment of FIG. 9A but with the nearside endplate 909 removed to make visible internal components including a light guide 962 and diffusing lens 963. The angled orientation of the light guide provides an advantage in light distribution in some applications.

FIGS. 10A-10H illustrate an alternative embodiment wherein the supporting sections of a light fixture are in the form of a T-bar geometry and the T-bar shaped supporting sections are added to or substituted for an existing T-bar array within the ceiling system.

Figure 10A:
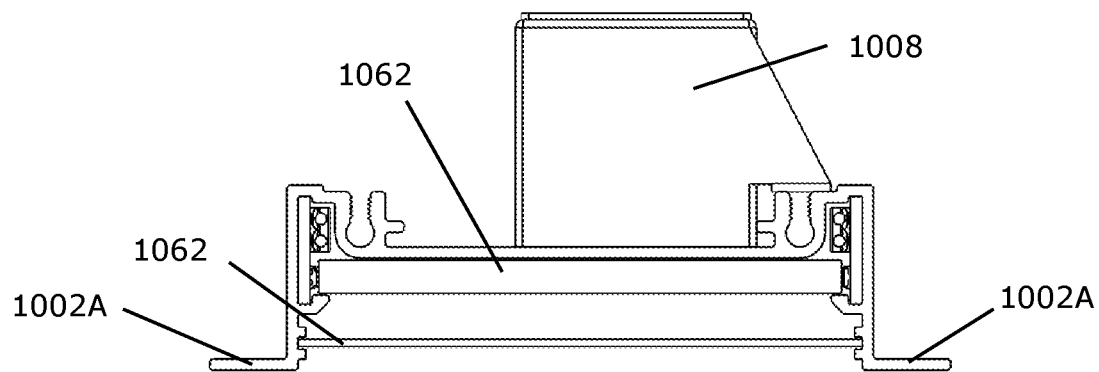
FIGS. 10A-10J illustrate an alternative embodiment wherein the supporting sections of a light fixture are in the form of a T-bar geometry and the T-bar shaped supporting sections are added to or substituted for an existing T-bar array within the ceiling system.
Figure 10B:
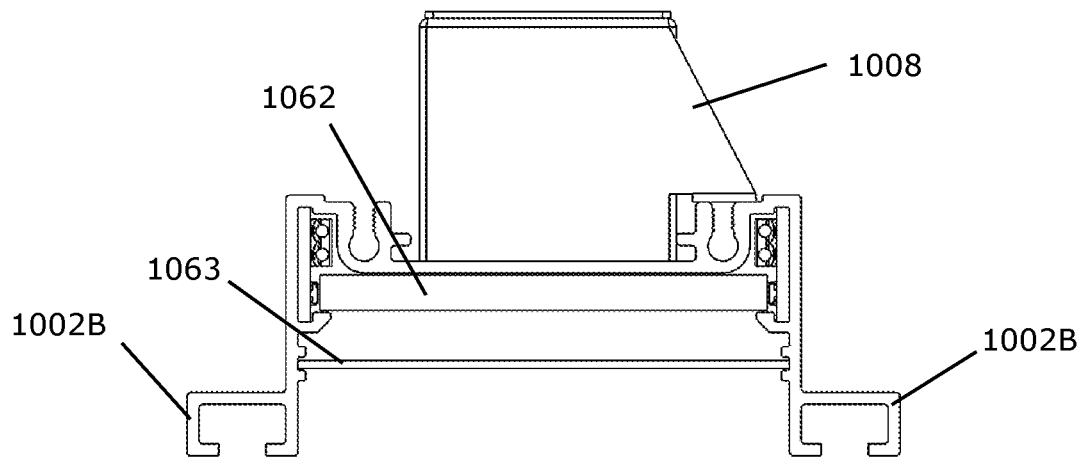

FIGS. 10A and 10B show a light fixture of single light guide construction having a light guide 1062, optional diffuser 1063, and electronic controller 1008. The supporting portions 1002A are in the shape of a standard T-bar flange and the supporting portions 1002B are in the shape of a standard slotted T-bar. A LED board 1064 is held in position by the linear elongate housing 1065 and comprises a printed circuit board (PCB) 1066 with at least one LED light source 1068. Additionally shown on the LED board is an optional electrical connector 1069.

Figure 10C:
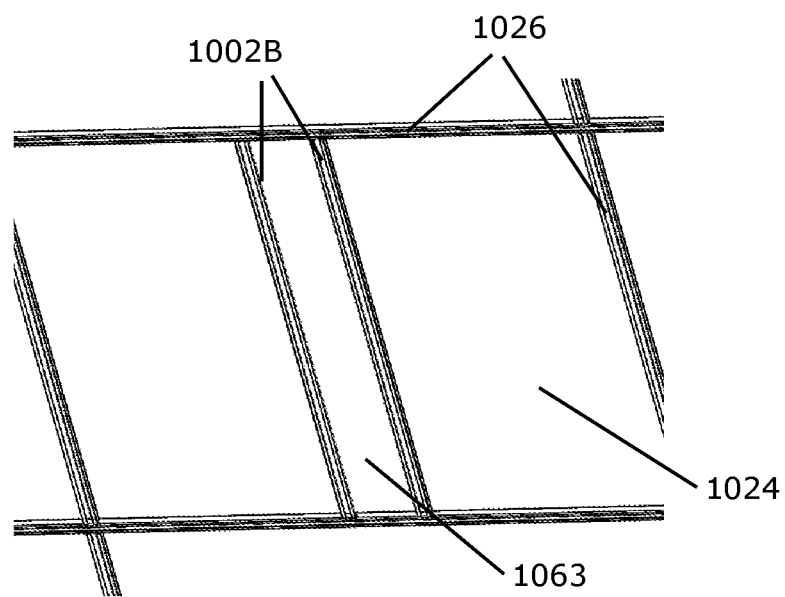
Figure 10D:
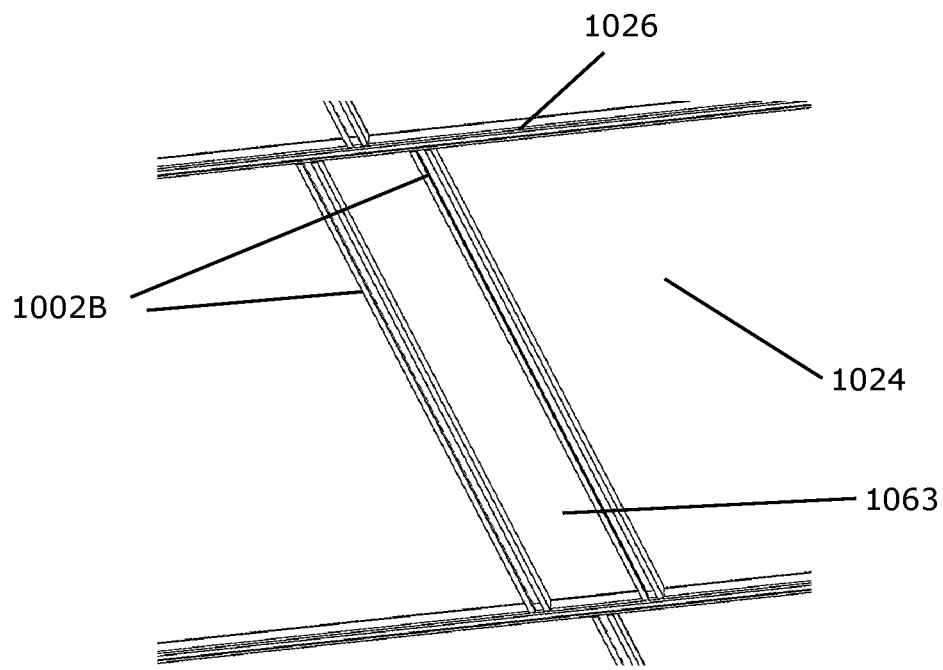

FIGS. 10C and 10D show the embodiments of FIGS. 10A and 10B mounted in ceiling arrays within the T-bar grid. The T-bar shaped supporting portions 1002B are mounted within the T-Bar 1026 grid.

Figure 10E:
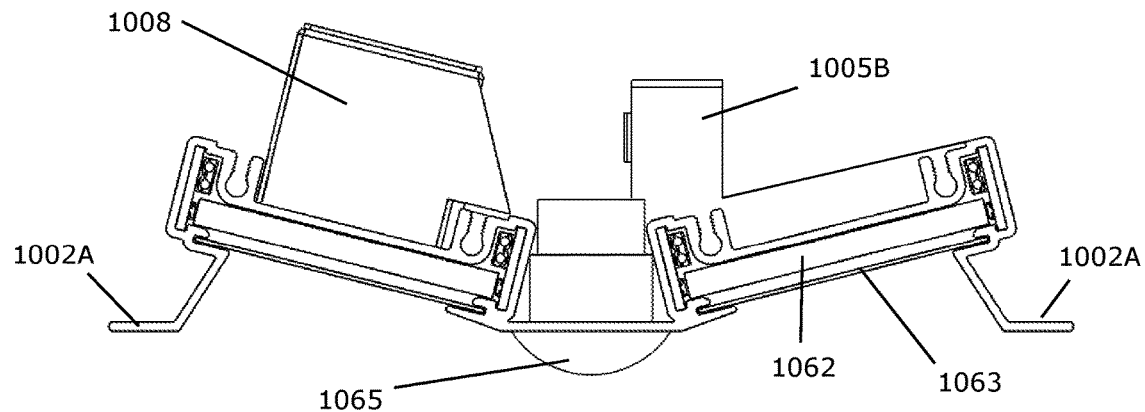
Figure 10F:
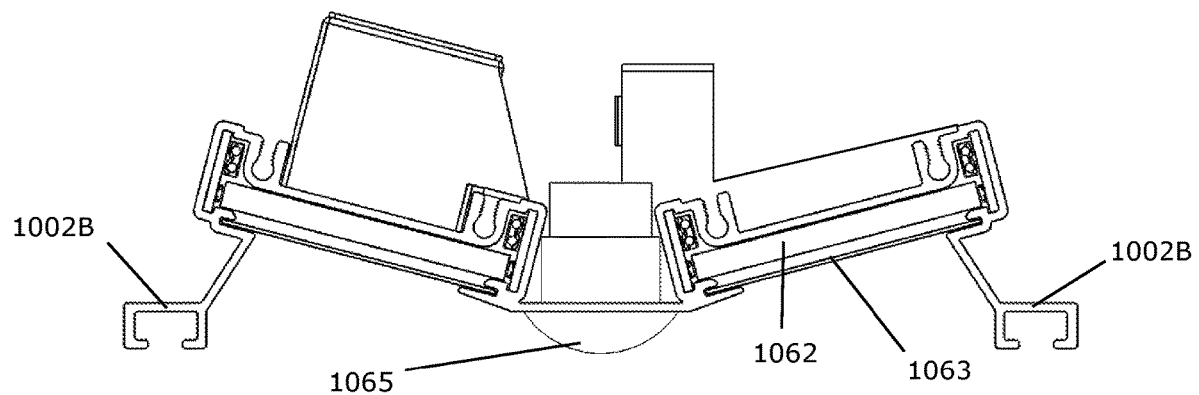

FIGS. 10E and 10F show a light fixture of double light guide construction having a light guide 1062, optional diffuser 1063, supporting element 1005B having a latching feature, sensor 1065, and electronic controller 1008. The supporting portions 1002A are in the shape of a standard T-bar flange and the supporting portions 1002B are in the shape of a standard slotted T-bar.

Figure 10G:
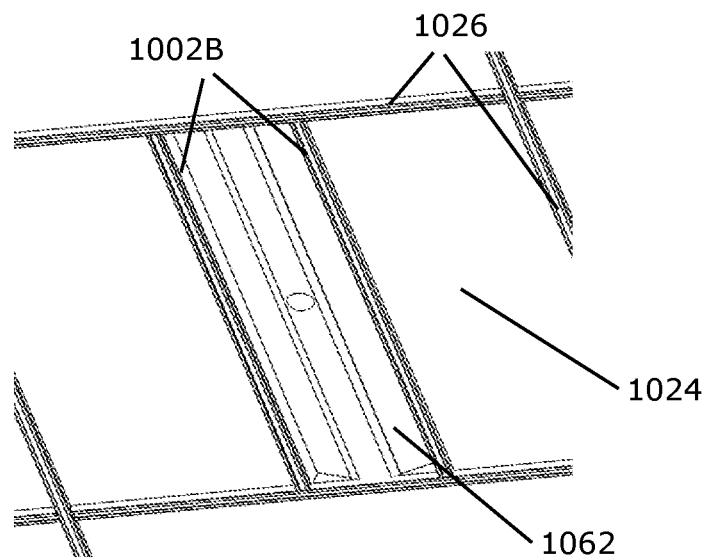
Figure 10H:
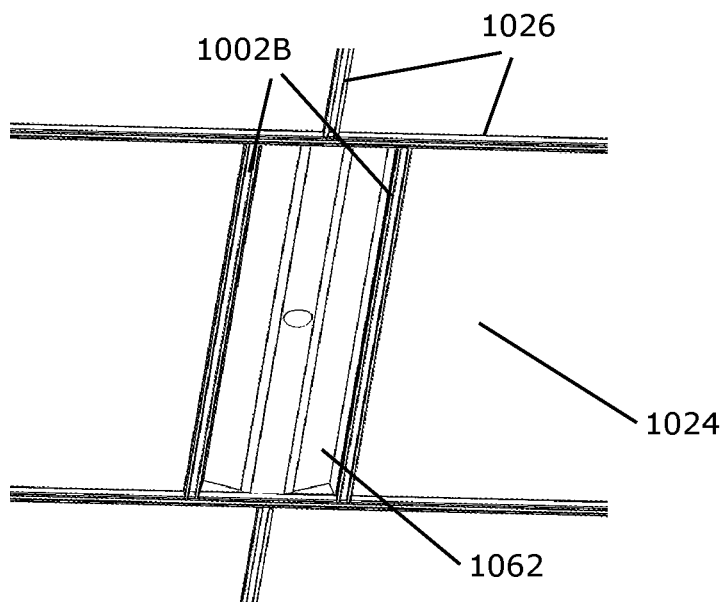

FIGS. 10G and 10H show the embodiments of FIGS. 10E and 10F mounted in ceiling arrays within the T-bar grid. The T-bar shaped supporting portions 1002B are mounted within the T-Bar 1026 grid and 1024 ceiling panels.

Figure 10I:
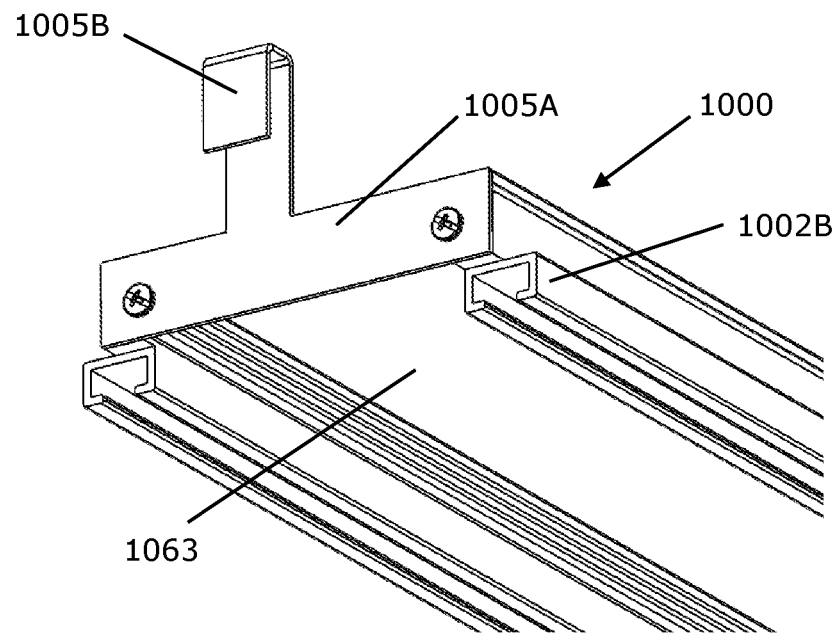
Figure 10J:
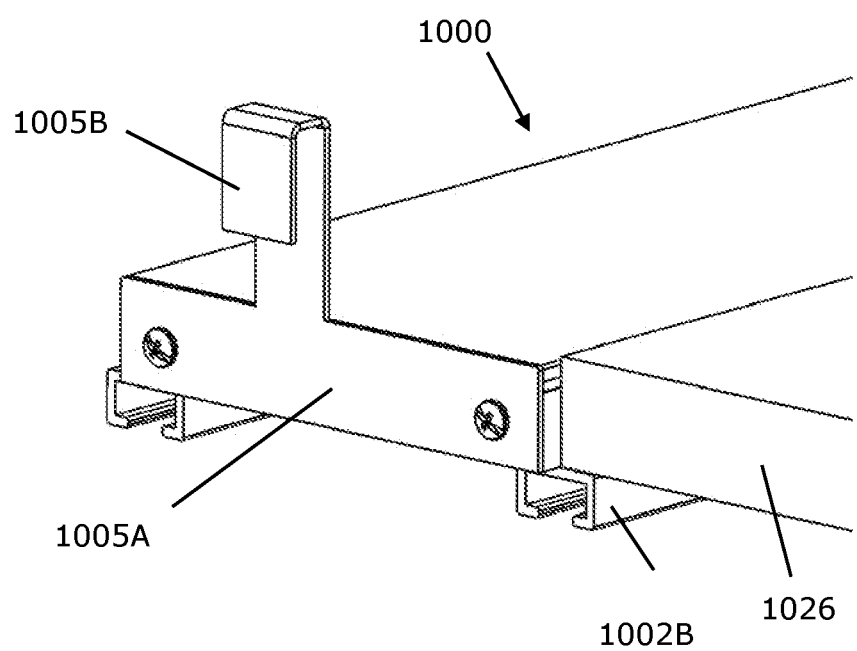

FIGS. 10I and 10J illustrate more clearly embodiments similar to those of FIGS. 10C and 10D wherein the supporting elements are comprised of both end plate 1005A and supporting latch 1005B sections.

FIGS. 11 to 15 are illustrations of exemplary implementations of the supporting element in a modular ceiling system. As shown, the FIGS. 11 to 15 depict that at least one supporting element 1102, 1202, 1302, 1402, 1502, when in operation, supports at least one edge of a given ceiling panel 1104, 1204, 1304, 1404, 1504, or a fixture 1106A to 1106B, 1206, 1306, 1406, 1506, for example at least one of: a light source, a sensor. Furthermore, optionally, the light source comprises at least one of: a LED light, an incandescent light, a monochromatic light, a laser, or a combination thereof. Optionally, the sensor comprises one or more of: a smoke-detector, a gas detector (for example a toxic gas detector), a proximity sensor, a light sensor, a motion sensor, a sound sensor and a combination thereof. In an example, by using embodiments of the present disclosure, there is provided a given house with a multilevel security arrangement including multiple combinations of sensors placed along with the light sources. In an example, smoke-detectors are beneficially used to provide an alarm when a fire or burning event happens in a given house. In another example, proximity sensors and motion sensors are used to detect strangers or movements of objects. In yet another example, light sensors are beneficially used to detect lighting conditions such as ambient light, and control the light sources accordingly.

Figure 11:
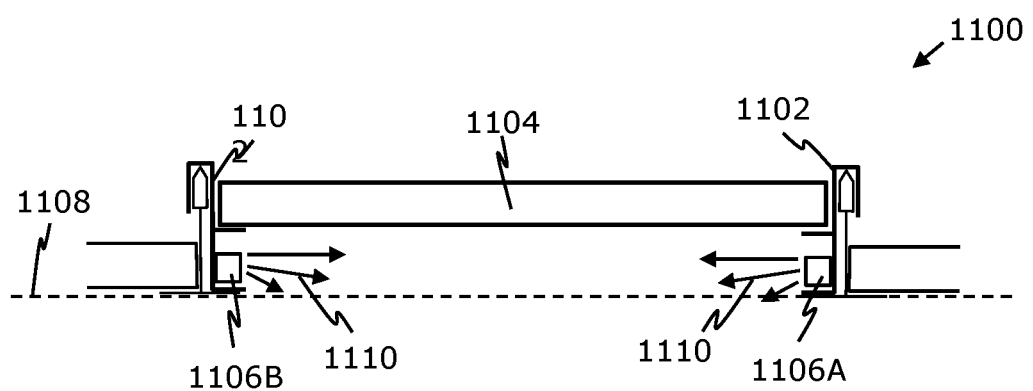
FIG. 11 is an illustration of an example use of the supporting element of FIG. 2 to support a ceiling panel of a suspended ceiling arrangement at an elevated height relative to a general ceiling plane of a suspended ceiling arrangement, wherein light fixtures are disposed on the supporting elements for illuminating a lower surface of the suspended ceiling panel, in accordance with an embodiment of the present disclosure.

As shown in FIG. 11, the supporting portion of the supporting element 1102 supports an edge of the given ceiling panel 1104 in a plane that is higher than the general ceiling plane 1108. Furthermore, the supporting portion also supports light sources 1106A and 1106B. Optionally, the light sources 1106A and 1106B, when in operation, are arranged to emit light radiation 1110 in a distance between the given ceiling panel 1104 and the general ceiling plane 1108. Furthermore, the given ceiling panel 1104 is placed such that there exists a recess between the given ceiling panel 1104 and the general ceiling plane 1108. Beneficially, the recess is illuminated using the light radiation 1110. More optionally, the light sources 1106A and 1106B are directed towards a center of their respective cell when the given ceiling panel 1104 is mounted higher than the general ceiling plane 1108. Furthermore, inward facing of light sources 1106A and 1106B direct the light radiation 1110 towards the center of their respective cell.

Figure 12:
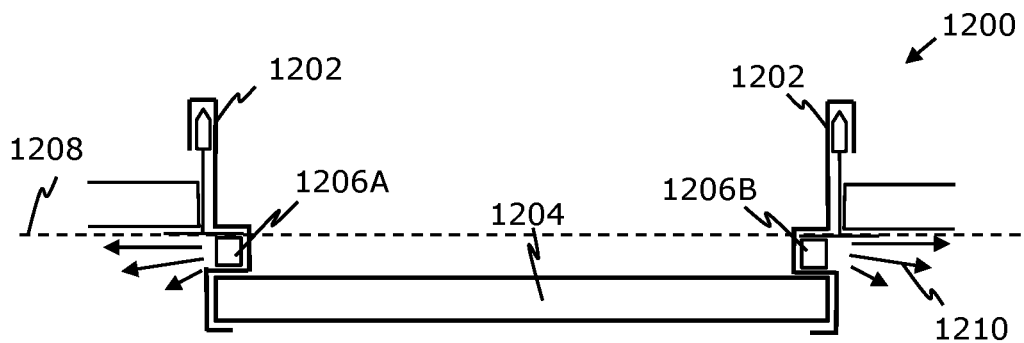
FIG. 12 is an illustration of an example use of the supporting element of FIG. 5 to support a ceiling panel of a suspended ceiling arrangement at a lower height relative to a general ceiling plane of a suspended ceiling arrangement, wherein light fixtures are outwardly disposed in a region between the ceiling panel and a general ceiling plane of the suspended ceiling arrangement, in accordance with an embodiment of the present disclosure.

As shown in FIG. 12, the supporting portion of the supporting element 1202 supports an edge of a given ceiling panel 1204 in a plane that is lower than a general ceiling plane 1208. Furthermore, the supporting portion also supports the light sources 1206A and 1206B. Optionally, the light sources 1206A and 1206B, when in operation, are arranged to emit light radiation 1210 in a distance between the given ceiling panel 1204 and the general ceiling plane 1208. More optionally, the light sources 1206A and 1206B are directed outwardly away from a center of their respective cell when the given ceiling panel is mounted lower than the general ceiling plane. Furthermore, outward facing of light sources 1206A and 1206B directs the light radiation 1210 outwardly away from the center of their respective cell.

Figure 13:
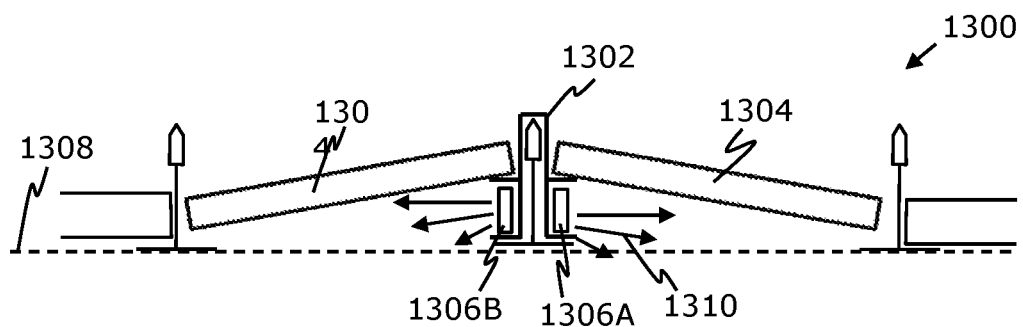
FIG. 13 is an illustration of a suspended ceiling arrangement, wherein two supporting elements of FIG. 2 of the modular ceiling system pursuant to the present disclosure are employed to cause two ceiling panels to be tilted relative to an angle of the general ceiling plane of a suspended ceiling arrangement, creating a gap in which light fixtures are located on the supporting element to provide illumination when in use, in accordance with an embodiment of the present disclosure.

As shown in FIG. 13, the supporting portion of the supporting element 1302 supports an edge of the given ceiling panel 1304 at a non-zero tilted angle relative to a general ceiling plane 1308. Optionally, the tilted angle is in a range of 3° to 15° with respect to the general ceiling plane 1308. More optionally, the tilted angle is in a range of 5° to 10° with respect to the general ceiling plane 1308. Furthermore, the supporting portion also supports light sources 1306A to 1306B. Optionally, the light sources 1306A to 1306B, when in operation, are arranged to emit light radiation 1310 in a distance between the given ceiling panel 1304 and the general ceiling plane 1308. More optionally, the light sources 1306A to 1306B are directed towards a center of their respective cell when the given ceiling panel 1304 is mounted at the tilted angle relative to the general ceiling plane.

Figure 14:
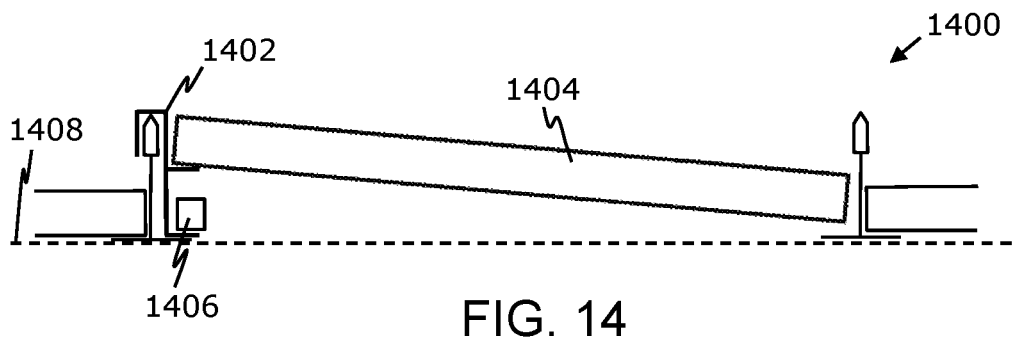
FIG. 14 is an illustration of the supporting element of FIG. 2 used to tilt an angle of a ceiling panel relative to a general ceiling plane of a suspended ceiling arrangement, so that a light fixture mounted on the support element provide illumination of the ceiling panel, when in use, in accordance with an embodiment of the present disclosure.

As shown in FIG. 14, the supporting portion of the supporting element 1402 supports an edge of the given ceiling panel 1404 at a non-zero tilted angle relative to general ceiling plane 1408. Optionally, the tilted angle is in a range of 3° to 15° with respect to the general ceiling plane 1408. More optionally, the tilted angle is in a range of 5° to 10° with respect to the general ceiling plane 1408. Furthermore, the supporting portion also supports the sensor 1406. More optionally, the sensor 1406 comprises one of a smoke-detector, a proximity sensor, a light sensor, a sound sensor, a motion sensor, and a combination thereof.

Figure 15:
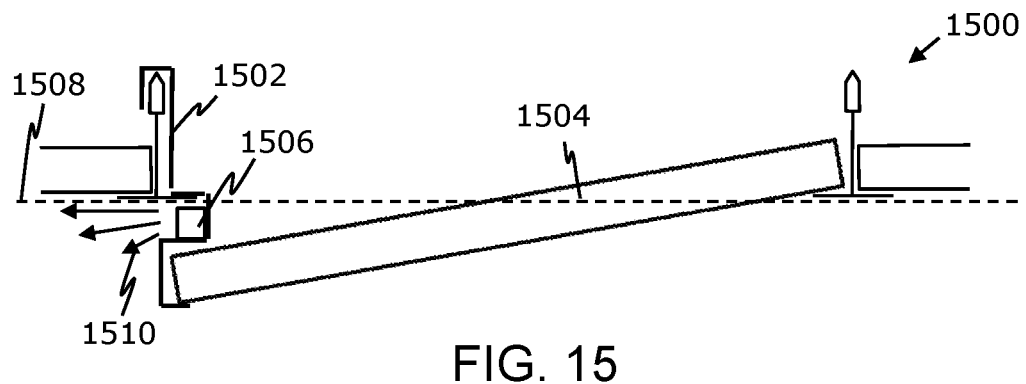
FIG. 15 is an illustration of the supporting element of FIG. 5 employed to support a ceiling panel of a suspended ceiling arrangement at a height that is lower than a general ceiling plane of the suspended ceiling arrangement, and also at a tilted angle relative to the general ceiling plane, wherein a light fixture supported on the supporting element provides illumination, when in use, in accordance with an embodiment of the present disclosure.

As shown in FIG. 15, the supporting portion of the supporting element 1502 supports an edge of the given ceiling panel 1504 at a non-zero tilted angle relative to general ceiling plane 1508. Optionally, the tilted angle is in a range of 3° to 15° with respect to the general ceiling plane 1508. More optionally, the tilted angle is in a range of 5° to 10° with respect to the general ceiling plane 1508. Furthermore, the supporting portion also supports light source 1506. Optionally, the light source 1506, when in operation, is arranged to emit light radiation 1510 in a distance between the given ceiling panel 1504 and the general ceiling plane 1508. More optionally, the light source 1506 are directed towards a center of their respective cell, when the given ceiling panel 1504 is mounted at a tilted angle relative to the general ceiling plane 1508.

FIGS. 16 to 20 are illustrations of exemplary implementations a supporting element (in accordance with various exemplary implementations of the present disclosure. As shown, the FIGS. 16 to 20 depict the at least one supporting element 1602, 1702, 1802, 1902, 2002, when in operation, that supports at least one of an edge of the given ceiling panel 1604, 1704, 1804, 1904, 2004 and fixtures 1610, 1712, 1806, 1910, 2008. The fixtures 1610, 1712, 1806, 1910, 2008 are optionally implemented as light sources.

Figure 16:
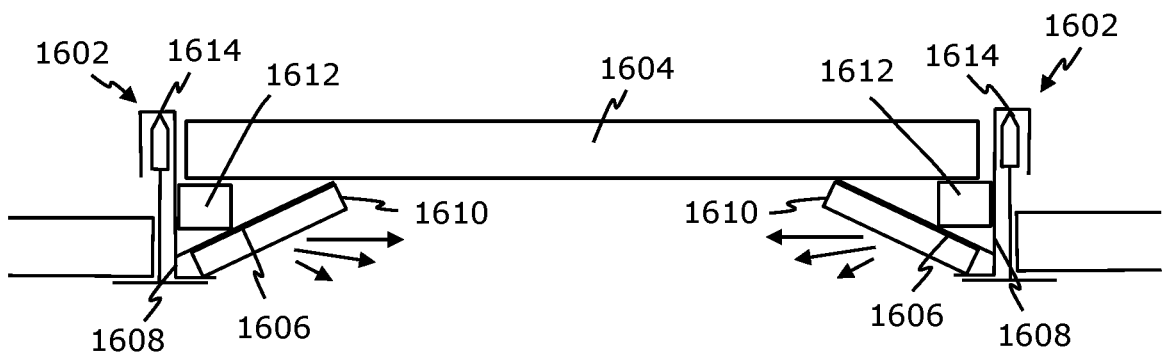
FIG. 16 is an illustration of a modified form of the supporting element of FIG. 5 employed to support a ceiling panel at a height above a general ceiling plane of a suspended ceiling arrangement, with light fixtures supported at an oblique angle relative to a plane of the ceiling panel to provide a modified illumination of the ceiling panel, in accordance with an embodiment of the present disclosure.

As shown in FIG. 16, the supporting elements 1602 support the ceiling panel 1604 therebetween. Furthermore, the supporting element 1602 comprises a supporting portion 1606 coupled to an end of the U-shaped bracket 1608 for supporting a light guide. The supporting portion 1606 includes a linear configuration and is coupled to the element-shaped bracket 1608 in an inclined manner, such as, within an angle in a range of 60° to 120° with respect to the element-shaped bracket 1608. Furthermore, the supporting portion 1606 supports one or more fixtures, for example an electrically and/or electronically operated ceiling device implemented as a light source 1610 therein. Furthermore, the supporting element 1602 comprises a power source (for example, a driver module) 1612, arranged between the ceiling panel 1604 and the supporting portion 1606, for providing electrical power to the electrically and/or electronically operated ceiling device, namely to the light source 1610.

Figure 17:
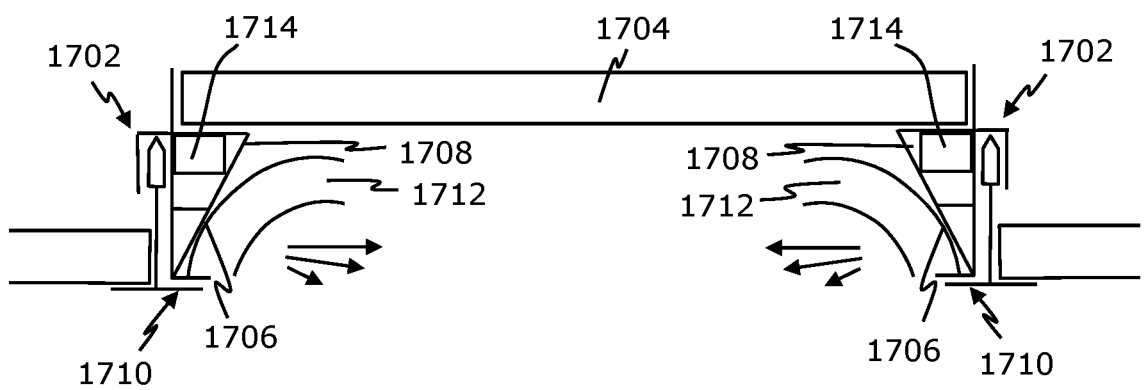
FIG. 17 is an illustration of a modified form of the supporting element of FIG. 5 employed to support a ceiling panel at a height above a general ceiling plane of a suspended ceiling arrangement, with light fixtures supported in a curved arrangement relative to a plane of the ceiling panel to provide a modified illumination of the ceiling panel, in accordance with an embodiment of the present disclosure.

As shown in FIG. 17, the supporting elements 1702 support the ceiling panel 1704 therebetween. The supporting element 1702 comprises a supporting portion 1706 for supporting a light guide, wherein the supporting portion 1706 includes an arcuate configuration. The supporting portion 1706 is supported by a linear supporting portion 1708 arranged in an inclined manner relative to an L-shaped structure 1710, such as, within an angle in a range of 60° to 120° relative to the L-shaped structure 1710. The supporting portion 1706 supports a functional module 1712 thereon, for example an electrically and/or electronically operated ceiling device implemented as a light source thereon. As shown, the functional module 1712 is arranged in an arcuate configuration corresponding to the arcuate configuration of the supporting portion 1706. Furthermore, the supporting element 1702 comprises a power source (for example, driver module) 1714 for providing electrical power to the electrically and/or electronically operated ceiling device implemented as the light source 1712; mounting the power source 1714 directly to the supporting portion 1706 provides for improved bearing of a weight of the power source 1714, as well as providing improved thermal cooling thereto, by way of heat energy dissipated in the power source 1714 being conducted via the supporting portion 1706 to adjacent "T"-bars 1710.

Figure 18:
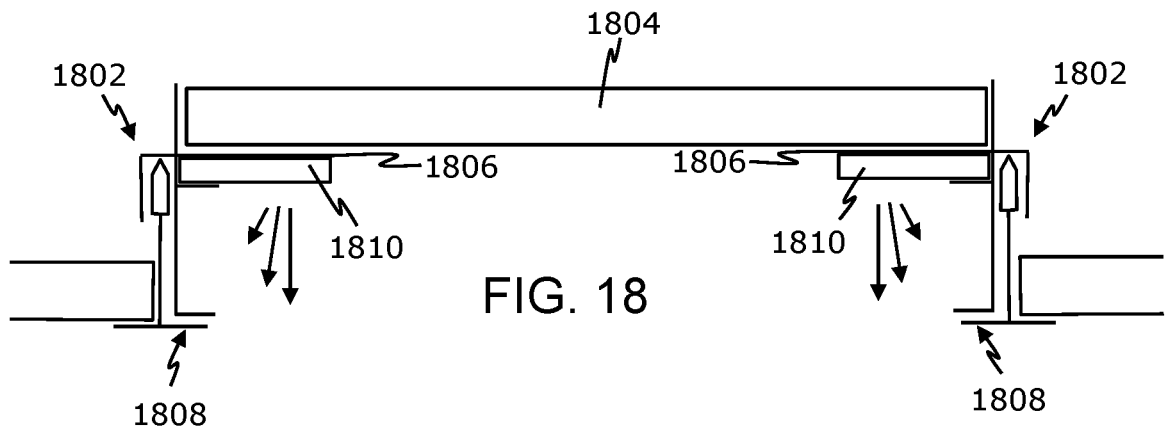
FIG. 18 is an illustration of a modified form of the supporting element of FIG. 5 employed to support a ceiling panel at a height above a general ceiling plane of a suspended ceiling arrangement, with light fixtures supported by the supporting element at a peripheral edge of the ceiling panel, in accordance with an embodiment of the present disclosure.

As shown in FIG. 18, the supporting elements 1802 support the ceiling panel 1804 therebetween. The supporting elements 1802 comprise a supporting portion 1806 having a linear configuration for supporting a light guide. Herein, the supporting portion 1806 is arranged perpendicularly to a U-shaped structure 1808 of the supporting element 1802. The supporting portion 1806 supports a functional module 1810, for example an electrically and/or electronically operated ceiling device implemented as a light source therein.

Figure 19:
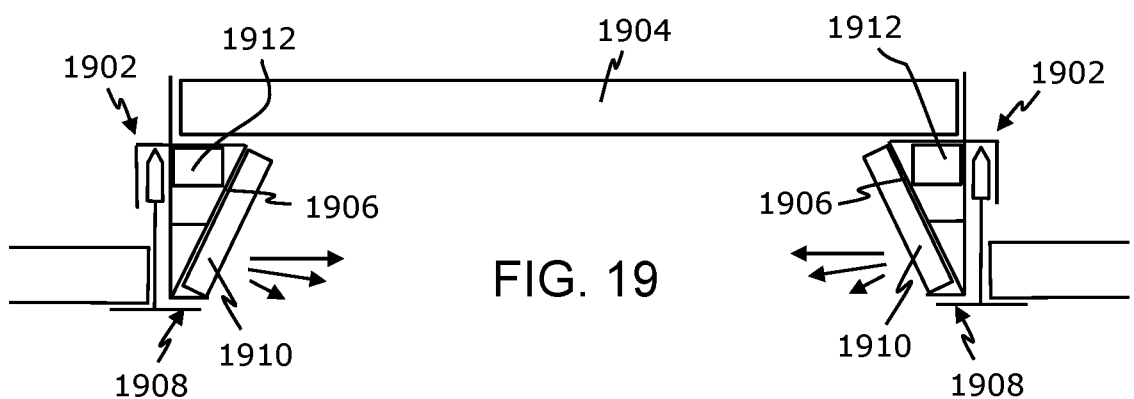
FIG. 19 is an illustration of a modified form of the supporting element of FIG. 5 employed to support a ceiling panel at a height above a general ceiling plane of a suspended ceiling arrangement, with light fixtures supported at an oblique angle relative to a plane of the ceiling panel to provide a modified illumination of the ceiling panel, and drivers supported on the supporting elements and hidden behind the supporting element, in accordance with an embodiment of the present disclosure.

As shown in FIG. 19, the supporting elements 1902 support the ceiling panel 1904 therebetween. The supporting elements 1902 comprise a supporting portion 1906 having a linear configuration for supporting a light guide. Furthermore, the supporting portion 1906 is arranged in an inclined manner relative to a U-shaped structure 1908 of the supporting element 1902, such as, within an angle in a range of 60° to 120° relative to the U-shaped structure 1908. The supporting portion 1906 supports a functional module 1910 thereon or therein, for example a ceiling device implemented as a light source that is at least one of: electrically operated, electronically operated. As shown, the functional module 1910 is arranged in an inclined manner corresponding to the arrangement of the light guide supporting element 1906 relative to the L-shaped structure 1908. Furthermore, the supporting element 1902 comprises a power source (driver module) 1912 for providing electrical power to the ceiling device implemented as the light source (functional module) 1910, the ceiling device being at least one of: electrically operated, electronically operated.

Figure 20:
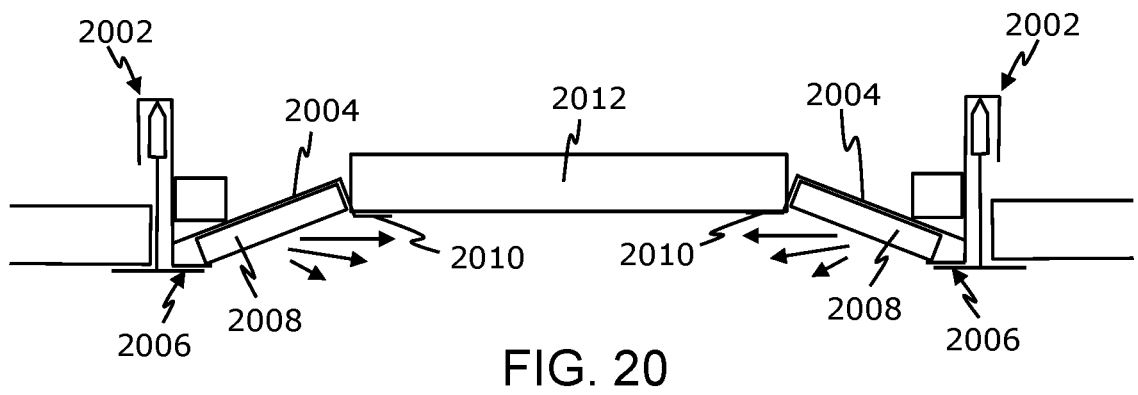
FIG. 20 is an illustration of a modified form of the supporting element of FIG. 5 employed to support a relatively smaller ceiling panel at a height above a general ceiling plane of a suspended ceiling arrangement, with light fixtures supported at an oblique angle relative to a plane of the ceiling panel, and around a periphery of the relatively smaller ceiling panel, to provide a modified illumination of the relatively smaller ceiling panel, and drivers supported on the supporting elements and hidden behind the supporting element, in accordance with an embodiment of the present disclosure.

As shown in FIG. 20, the supporting element 2002 comprises a supporting portion 2004 that is arranged in an inclined manner relative to a L-shaped structure 2006 of the supporting element 2002, for example at an angle in a range of 60° to 120° relative to the L-shaped structure 2006. The supporting portion 2004 supports, for example, a functional module such as a ceiling device implemented as a light source 2008 thereon, wherein the ceiling device is at least one of: electrically operated, electronically operated. As shown, the supporting portion 2004 includes a lateral supporting element 2010, wherein the lateral supporting element 2010 supports the ceiling panel 2012 thereon. It will be appreciated that length of the ceiling panel 2012 defines a gap between the supporting element 2002, such as, between the lateral supporting element 2010.

Figure 21:
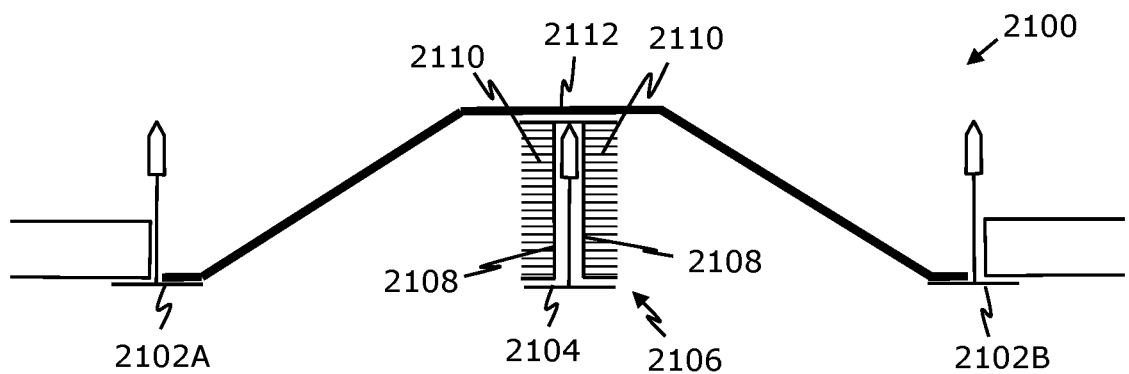
FIG. 21 is an illustration of a use of a supporting element of the module ceiling system to provide a raised profile for two adjacent ceiling panels with a "T"-bar at a central region of the two adjacent ceiling panels bearing a fixture, for example a lighting fixture, in accordance with an embodiment of the present disclosure.

FIG. 21 depicts a suspended ceiling arrangement 2100 including "T"-bars 2102A-B and 2104. Furthermore, a supporting element 2106 is supported on the "T"-bar 2104, wherein the supporting element 2106 includes supporting portions 2108 for supporting light guides. As shown, each supporting portion 2108 supports a functional module such as a ceiling device implemented, for example, as a light source 2110 thereon, wherein the ceiling device is at least one of: electrically operated, electronically operated. Moreover, the suspended ceiling system 2100 comprises a reflective housing 2112 that provides a reflective surface to the light source 2110, mounted on the supporting element 2106.

Figure 22:
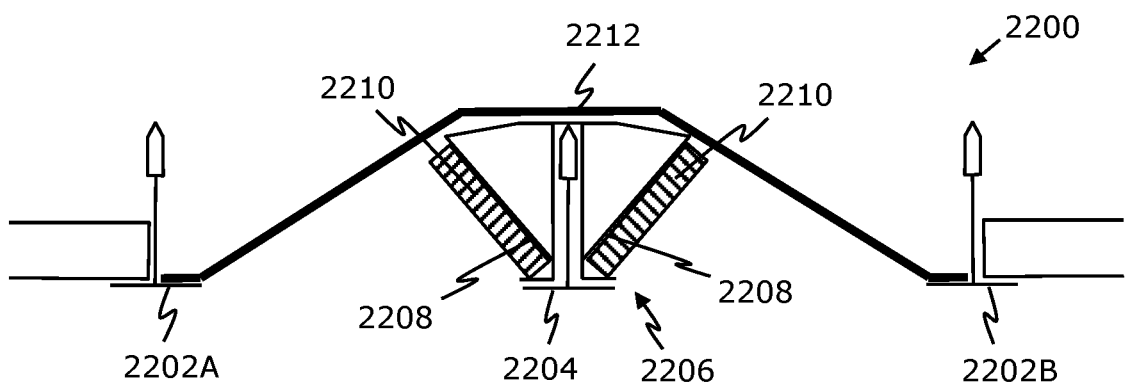
FIG. 22 is an illustration of a modified version of the supporting element of FIG. 21, but with two fixtures disposed at two respective sides of the "T"-bar at the central region of the two adjacent ceiling panels, to achieve an enhanced degree of illumination, when in operation, in accordance with an embodiment of the present disclosure.

FIG. 22 depicts a suspended ceiling arrangement 2200, for example akin to that as shown in FIG. 20. The suspended ceiling arrangement 2200 includes "T"-bars 2202A to 2202B, and 2204. Furthermore, a supporting element 2206 is supported on the "T"-bar 2204, wherein the supporting element 2206 includes supporting portions 2208 for supporting light guides. As shown, the supporting portions 2208 are arranged in an inclined manner relative to the "T"-bar 2204, such as, within an angle in a range of 30° to 60°. Furthermore, each supporting portion 2208 supports a ceiling device implemented as a light source 2210 thereon, wherein the ceiling device is at least one of: electrically operated, electronically operated. Moreover, the suspended ceiling system 2200 comprises a reflective housing 2212, to provide a reflective surface to the light source 2210, mounted on the supporting element 2206. Furthermore, a length of the supporting element 2206 can be less than or equal to a length of the "T"-bar. Consequently, a plurality of supporting elements can be arranged on a "T"-bar, wherein a length of each of the plurality of supporting elements is less than the length of the "T"-bar. Optionally, the length of a given supporting element is equal to one of: the length of a given "T"-bar, half of the length of the given "T"-bar, one-third of the length of the given "T"-bar or a quarter of the length of the given "T"-bar. However, the length of the supporting element can optionally correspond to any one of a partial length of the given "T"-bar. For example, the length of the supporting element can be two-thirds of the length of the given "T"-bar. Moreover, a supporting element can be arranged on each side of a given "T"-bar, for example on both sides thereof. Optionally, the supporting elements include at least a pair of the supporting elements, mounted on either side of the given "T"-bar, when each of the pair of the supporting elements has a length equal to one of: half of the length of the given "T"-bar, one-third of the length of the given "T"-bar or a quarter of the length of the given "T"-bar. For example, a supporting element having half a length of a given "T"-bar, is arranged on one side of the given "T"-bar and another supporting element having half the length of the given "T"-bar, is arranged on another side of the given "T"-bar. However, it will be appreciated that supporting elements having different lengths can be arranged on different sides of the given "T"-bar. For example, a supporting element having one-third length of a given "T"-bar, is arranged on one side of the given "T"-bar and another supporting element having two-thirds the length of the given "T"-bar, is arranged on another side of the given "T"-bar.

Figure 23:
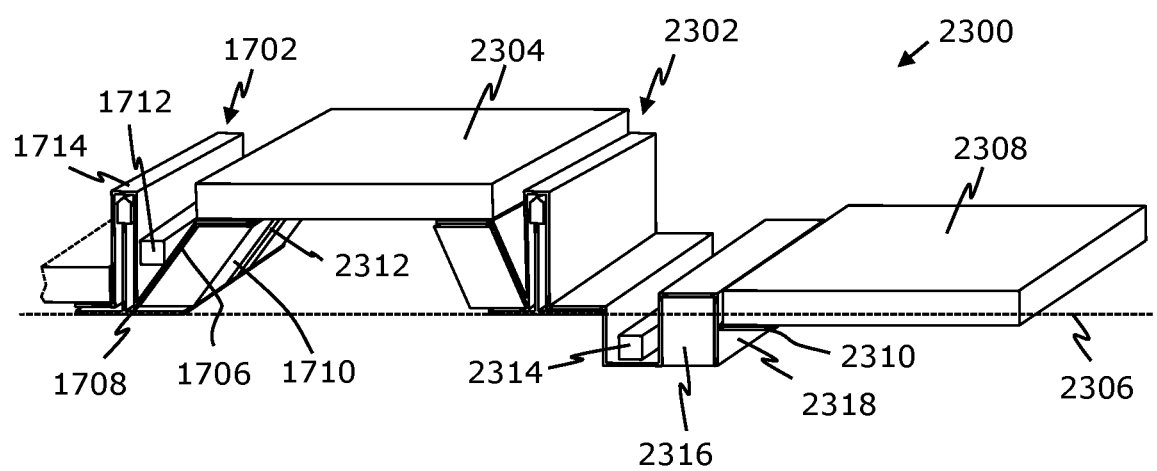
FIG. 23 is an illustration of a hybrid supporting element arrangement for supporting adjacent ceiling panels of a suspended ceiling arrangement at mutually different heights and mutually different angles relative to a general ceiling plane of a suspended ceiling arrangement, in accordance with an embodiment of the present disclosure.

FIG. 23 is a perspective view of an exemplary suspended ceiling arrangement 2300, beneficially including the supporting elements 1702 of FIG. 17 and a supporting element 2302. The supporting elements 1702 and 2302 support a ceiling panel 2304, wherein the ceiling panel 2304 is supported above a ceiling plane 2306. Furthermore, the supporting element 2302 supports a ceiling panel 2308 thereon, such as, on a lateral supporting element 2310. As shown, the ceiling panel 2308 is supported below the ceiling plane 2306. Furthermore, the supporting elements 1702 support a functional module such as ceiling device 2312, (wherein the ceiling device 2312 is at least one of: electrically operated, electronically operated) wherein the ceiling device 2312 can be implemented as a sensor. Moreover, the supporting element 2302 further comprises a power module 2314, for providing electrical power to the ceiling device 2312, for example implemented as a light source 2316.

Optionally, at least one of:
(i) an external surface of at least one linear supporting element:
(ii) at least one of the plurality of lateral supporting elements of the supporting element 1702; and
(iii) the supporting element 2302, comprises at least one of: a colored surface, a textured surface, and a reflective surface. For example, an external surface of the light guide supporting element 1706 comprises a blue-colored surface and an external surface of the linear supporting element 1708 comprises an angularly-textured surface (such as, a surface that is configured to reflect light only when the light is incident thereon at specific angles). It will be appreciated that such reflection and scattering of the incident of light in different colors and along different paths, enables to provide an aesthetically appealing ambiance within a given room in which the suspended ceiling arrangement 2300 is installed; for example, at least one of optical diffraction gratings and prismatic optical components are included in the suspended ceiling arrangement 2300 so that perceived colors of the ceiling panels to a given used change as the given user moves about within a room equipped with the suspended ceiling arrangement 2300. Furthermore, such a reflection of the incident light that is potentially emitted from natural sources, reduces a requirement for providing artificial light within the room, thereby, allowing to reduce energy consumption (and consequently, cost thereof) for lighting purposes within the room; such a manner of operation is potentially capable of reducing Carbon Dioxide emissions associated with electrical power generation, thereby assisting to reduce impacts of potential anthropogenic climate change ("Green channel"). Optionally, the textured surface comprises at least one of: a light-diffusing surface, a specular surface, an angularly-textured surface.

Optionally, at least one of a linear supporting element of the supporting element 1702 and the supporting element 2302 is fabricated using a first type of material, and at least one of the plurality of lateral supporting elements of the supporting element 1702 and the supporting element 2302 is fabricated using a second type of material, wherein the first and second materials are optionally mutually dissimilar. For example, the linear supporting element 1708 is fabricated using extruded Aluminum and the light guide supporting element 1706 is fabricated using recycled plastics material. Furthermore, for example, the linear supporting element 2318 is fabricated using stainless steel and the lateral supporting element 2310 is fabricated using Carbon fiber material, for example Carbon fiber composite. In such an example, fabricating the at least one linear supporting element and the plurality of lateral supporting elements using different elements, enables to provide different structural properties thereto, while controlling a manufacturing cost associated with fabricating the suspended ceiling arrangement 2300. For example, fabricating the lateral supporting element 2310 using Carbon fiber enables to provide increased tensile strength thereto while reducing a mass thereof, thereby, allowing lateral supporting element 2310 to support the ceiling panel 2308 thereon and reduce at least one of: an overall mass of the suspended ceiling arrangement 2300, an overall mass of the supporting element 2302.

Reducing a mass of the suspended ceiling arrangement 2300 is beneficial in Earth-quake prone regions of the World, for providing protection against Earth-quake induced ceiling collapse. Furthermore, fabricating the light guide supporting element 1706 using recycled plastics material enables to provide increased safety associated with use of an electrically insulating material for housing a device therein, wherein the device is at least one of electrically operated, electronically operated. Alternatively, the light guide supporting element 1706 is fabricated using steel, thereby allowing absorption of heat generated by the ceiling devices 1710 and 2312 therein, wherein the ceiling devices 1710 and 2312 are at least one of: electrically operated, electronically operated. Consequently, fabricating at least one of the at least one linear supporting element and the plurality of lateral supporting elements using different materials, enables to provide different physical properties (such as, electrical insulation, heat absorption, sound absorption and so forth), as well as different visual appearances thereto, thereby, further enabling to improve aesthetic appearance of the suspended ceiling arrangement 2300. More optionally, the first type of material and the second type of material comprises one of: Aluminum, extruded Aluminum, steel, metal, metal alloy, ceramic, composite, plastic. For example, the first type of material is a metal such as Copper, a metal alloy such as stainless steel or a ceramic such as polyether ether ketone (PEEK) and the second type of material is a composite such as Carbon fiber or a plastics material such as recycled polycarbonate or polyvinyl chloride (PVC). Optionally, the first type of material is same as the second type of material. For example, the first type of material and the second type of material are stainless steel.

Figure 24A:
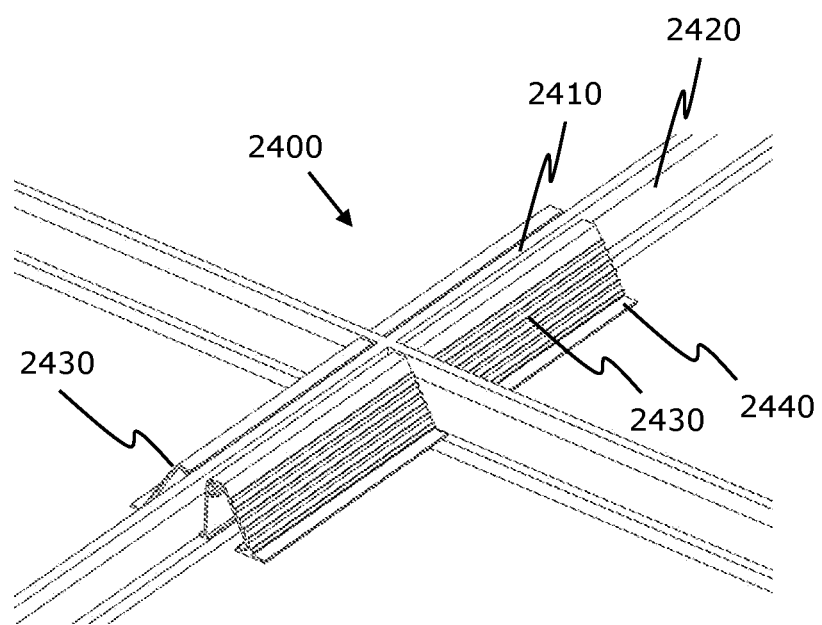
FIG. 24A is an illustration of an example supporting element of the modular ceiling system of the present disclosure, wherein the supporting element has sloping peripheral features, to accommodate a light fixture that illuminates in a direction towards a "T"-bar supporting the supporting element, in accordance with an embodiment of the present disclosure.
Figure 24B:
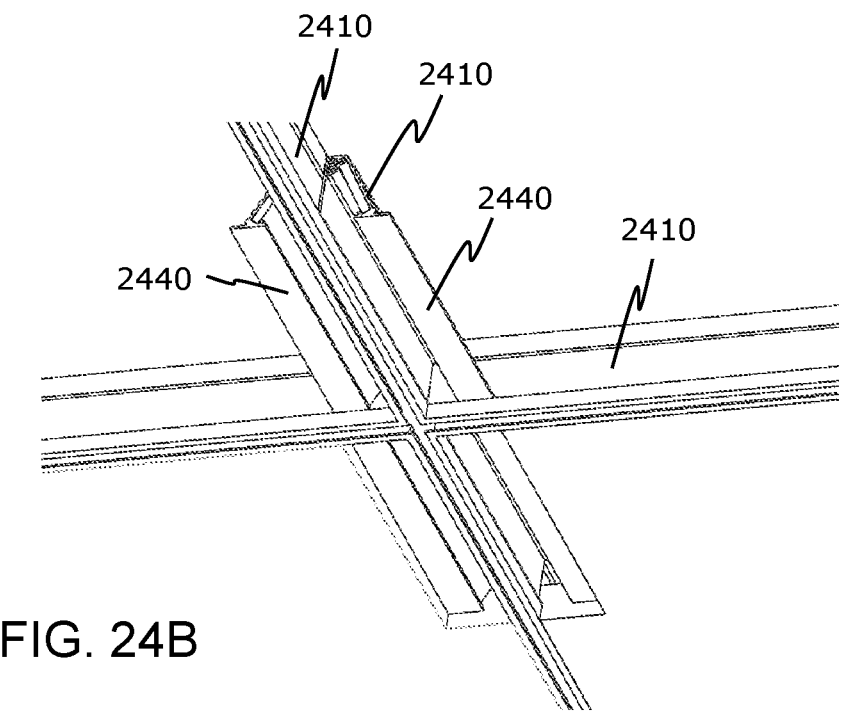
FIG. 24B is an illustration of a supporting element of FIG. 24A that is disposed at a junction whereat a plurality of "T"-bars mutually meet in accordance with an embodiment of the present disclosure.
Figure 24C:
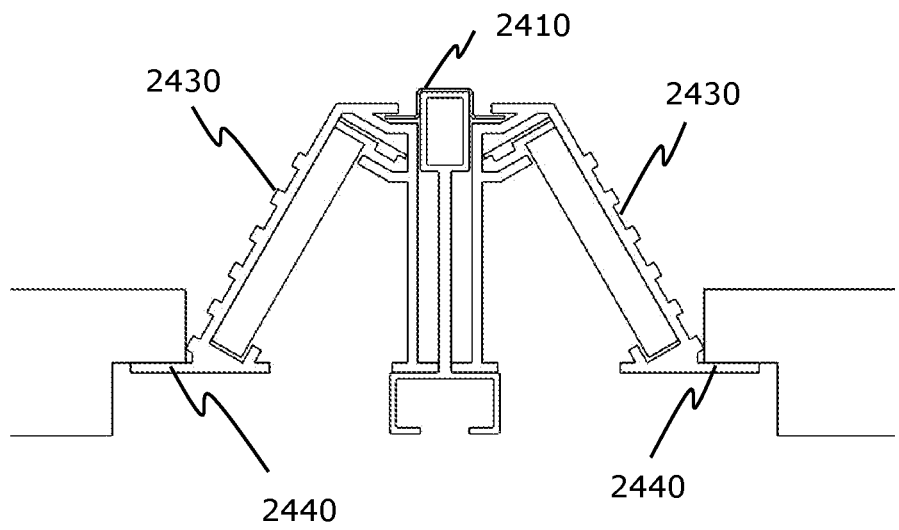
FIG. 24C is a detailed cross-sectional illustration of the supporting element of FIG. 24B wherein ridges are provided for retaining the lighting fixture (for example for slidable accommodation of the lighting fixture into the support element) as well as providing peripheral support flanges for supporting a ceiling panel, in accordance with an embodiment of the present disclosure.

Referring next to FIGS. 24A to 24C, it will be appreciated that the supporting element of the modular ceiling system can be implemented in many different manners; for example there is shown a supporting element indicated generally by 2400 that includes a U-shaped portion 2410 that mounts, when in use, over the central vertical portion of a "T"-bar 2420 as well as two supporting portions 2430 that receive fittings, terminating in elongate distal flanges 2440 that are capable, for example, of supporting ceiling panels of a suspended ceiling arrangement. Two such supporting elements, as shown in FIG. 24A, can be, for example, disposed at a junction whereat a plurality of "T"-bars mutually couple or meet. Such a junction is potentially capable of bearing a considerable weight of functional fixtures.

Figure 25A:
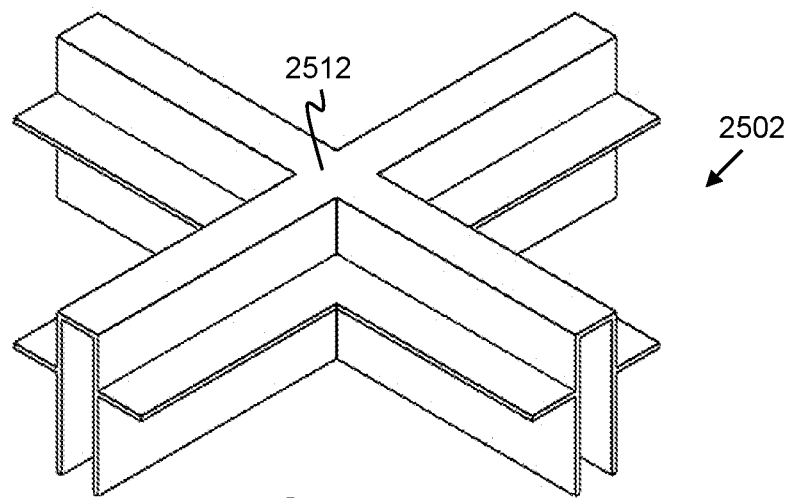
FIG. 25A is an illustration of a supporting element that is designed to be supported at a junction whereat four "T"-bars mutually meet; allowing one or more fixtures to be clustered around such a junction, in accordance with an embodiment of the present disclosure.
Figure 25B:
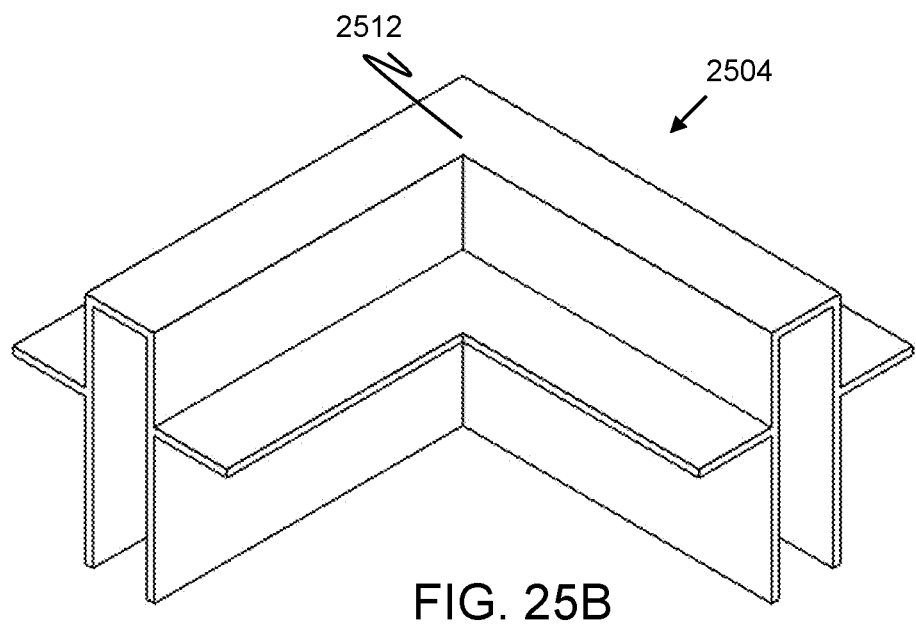
FIG. 25B is an illustration of a supporting element that is designed in "L"-form to be supported by two "T"-bars that meet mutually orthogonally at a junction in a suspended ceiling arrangement, in accordance with an embodiment of the present disclosure.
Figure 25C:
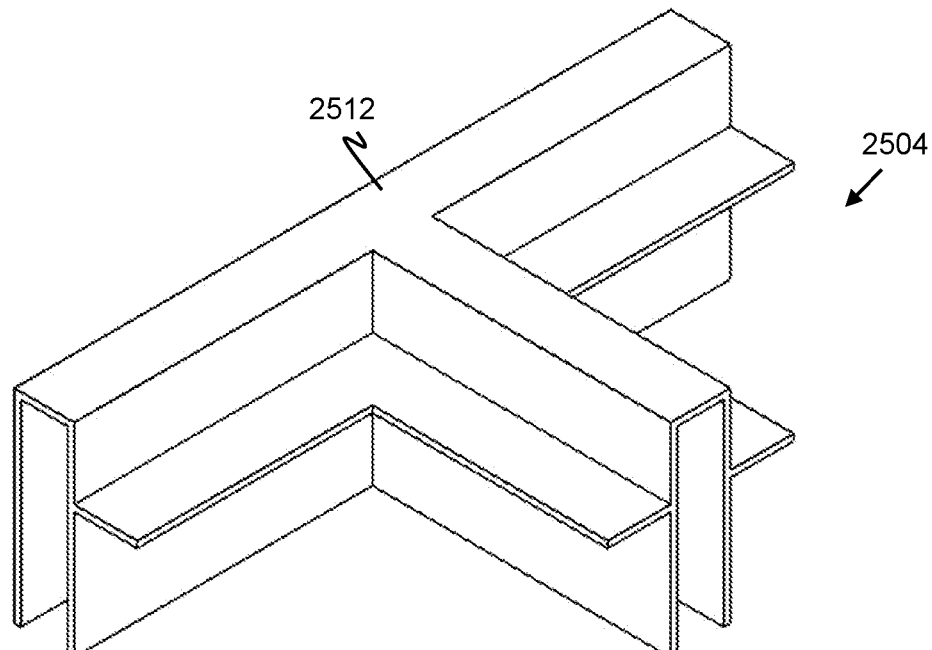
FIG. 25C is an illustration of a supporting element that is designed in "T"-form to be supported by three "T"-bars that meet mutually at a junction in a suspended ceiling arrangement, in accordance with an embodiment of the present disclosure.

FIGS. 25A to 25C provide illustrations of supporting elements 2502, 2504 and 2506 for a suspended ceiling arrangement, in accordance with an embodiment of the present disclosure. As shown, each of the supporting elements 2502, 2504, 2506 includes a mounting portion that, when in operation, is detachably mountable on a plurality of "T"-bars, namely two or more "T"-bars; the U-shaped portion fits over an upper edge of a vertical central portion of the "T"-bars. Specifically, the U-shaped portion of each of the supporting elements 2502, 2504, 2506, when in operation, encloses an intersection formed by at least two or more "T"-bars. For example, as shown in FIG. 25A, the supporting element 2502 has a mounting portion 2512 that, when in operation, encloses an intersection formed by four "T"-bars. Similarly, as shown in FIG. 25B, the supporting element 2504 has a mounting portion 2514 that, when in operation, encloses an intersection formed by two "T"-bars. Furthermore, as shown in FIG. 25C, the supporting element 2506 has a mounting portion 2516, that, when in operation, encloses an intersection formed by three "T"-bars. The supporting elements 2502, 2504 and 2506 can be used in conjunction with any one or more of the suspended ceiling arrangements of FIGS. 11 to 23, and are able to bear a significant weight of a fixture by distributing the weight of the fixture along an extensive portion of the "T"-bars. The weight can, for example, correspond to various fixtures, for example light fittings and/or other devices as illustrated in FIGS. 27A, 27D, 27E, 27F, 27G and 27H; the other devices optionally include sensors, ventilation fans, anti-sound injection ports, loudspeakers, water sprinklers (for fire safety) and such like. In such an example, ceiling panels of the suspended ceiling arrangements can be modified by cutting at least one of edge and corner openings therein to provide space for the fixtures, for example down-lights, thereby enabling, for example, the down-lights to be retrofitted together with their respective supporting elements 2502, 2504 and 2506 to a pre-existing suspended ceiling. Alternatively, such selective cutting of at least one of edge and corner openings of ceiling panels can also be done for a new suspended ceiling installation, for which the one or more the supporting elements 2502, 2504 and 2506 are to be employed. Thus, use of the supporting elements 2502, 2504 and 2506 can be invoked independently, alternatively concurrently with, selective mounting of ceiling panels above, below or at a tilted angle relative to general ceiling plane, as aforementioned.

Figure 26:
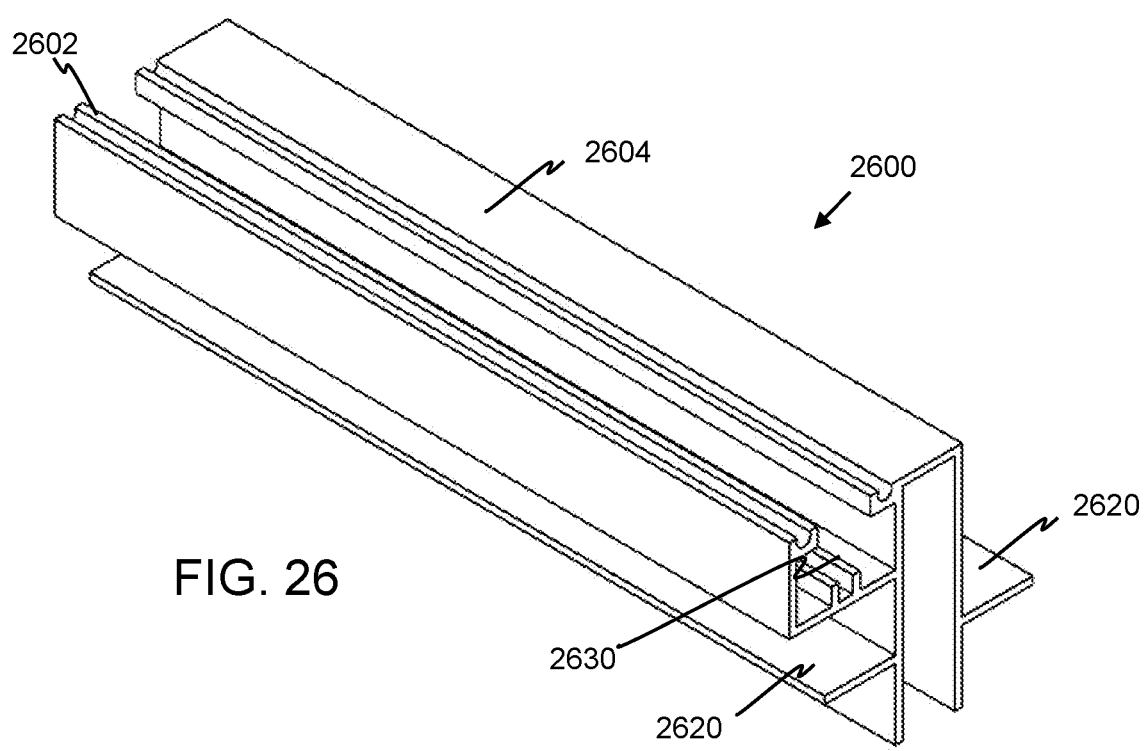
FIG. 26 is an illustration of a supporting element that is designed to mount onto a portion of a "T"-bar of a suspended ceiling arrangement that is remote from a junction of the "T"-bar, wherein the supporting element has at an upper region thereof a supporting channel for receiving a function module, for example a driver unit, in accordance with an embodiment of the present disclosure.

Referring next to FIG. 26, there is provided an illustration of a supporting element 2600 for a suspended ceiling arrangement, in accordance with an embodiment of the present disclosure. As shown, the supporting element 2600 includes a support bracket 2602 that is integral to a "U"-shaped portion 2604, that, when in use, fits over a vertical central portion of a "T"-bar. The supporting element 2600, when in operation, is capable of supporting various fixture modules, associated with a typical suspended ceiling arrangement, for example a light source, a sensor, one or more wires, a charger, a power source, such as a battery, a driver, a ventilation fan, a water sprinkler system, a loudspeaker and so forth. On account of the support bracket 2602 being disposed adjacent to the "U"-shaped portion 2604, the support bracket 2602 is able to bear a considerable weight while also proving highly effect heat-shunting to the "T"-bar on which the supporting element 2600 is mounted when in use.

The supporting element 2600 is suitable to being used in modular ceiling systems pursuant to the present disclosure. The supporting element 2600 is beneficially fabricated from extruded Aluminum, compressed sintered metal powder, plastics materials, plastics material composites, recycled plastics materials and similar. Moreover, the supporting element 2600 can either be fabricated as a unitary component, or comprises a plurality of parts that are assembled together in manufacture to produce the supporting element 2600. The supporting element 2600 includes the "U"-shaped portion 2604 that, when in use, fits over a "T"-bar for support, as aforementioned, and has one or more supporting portions 2620 that are capable of supporting ceiling tiles, various fixtures and such like. Moreover, the supporting element 2600 has a coupling channel 2630 adjacent to the "U"-shaped portion 2604 for receiving a driver module or similar. The driver module is beneficially installed by sliding into the coupling channel 2630 and being retained by way of small retaining flanges provided along the coupling channel 2630; alternatively, the driver module is retained in the coupling channel 2630 by way of a fastening arrangement such as screws, clips, adhesives, releasable retaining blocks and so forth.

Optionally, the coupling channel 2630 accommodates in use a plurality of driver modules, for example a DC driver unit, a sensor interfacing unit having one or more sensor inputs, a resonant inductive power coupling unit, a data relay unit providing the ceiling arrangement with a peer-to-peer wireless communication network, and so forth. Optionally, the plurality of driver module, or single driver module if employed, are coupled in a "daisy chain" arrangement so that long cable runs within a gap formed between a structural ceiling and an upper surface of panels of the suspended ceiling arrangement are avoided, allowing a single input power feed to the suspended ceiling arrangement to be employed. Such a "daisy chain" configuration can be achieved using short "pig-tail" wire connections for coupling a given driver module to its nearest neighboring driver module in the suspended ceiling arrangement, wherein the "pig-tail" wire connections have plugs for connecting to driver modules together; by "short" is meant having a length in a range of 20 cm to 3 meters (metres), more optionally in a range of 0.5 meters (metres) to 2.5 meters (metres). In situations where the suspended ceiling arrangement is prone to flooding or becoming water-logged, such "pig-tail" wire connections have plugs that transfer their power via resonant inductive power transfer via coupling ferromagnetic cores included at the plugs. Such resonant inductive power transfer is comprehensively described in a published PCT application WO2013/091875A2; "Inductive Power Coupling Systems for Roadways", and provides a technically enabling basis for a person of ordinary technical skill to implement embodiments of the present disclosure, implemented wirelessly. The driver modules, in such a case, employ plugs have split-C ferromagnetic cores therein, wherein the cores are provided with corresponding windings, and power is transferred when the split-C cores are abutted together to form a complete magnetic circuit implemented via the cores. Use of resonant inductive coupling avoids a risk of electrocution to personnel, and allows fixtures to be replaced "on-the-fly" without need to decouple electrical power from the suspended ceiling arrangement during maintenance.

Figure 27A:
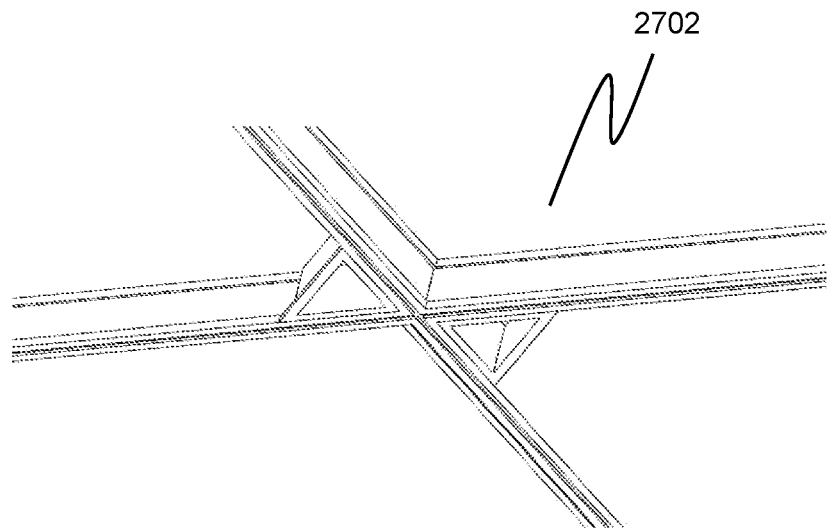
FIG. 27A is an illustration of two triangular down-light fixtures mounted onto a supporting element at a junction whereat a plurality of "T"-bars meet in accordance with an embodiment of the present disclosure.
Figure 27B:
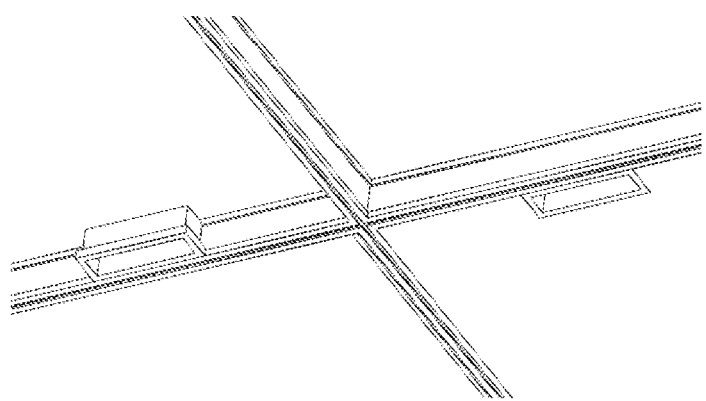
FIG. 27B is an illustration of two rectangular light fixtures mounted on respective supporting elements, for example supporting elements of a design as in FIG. 26, along mid-portions of "T"-bars, in accordance with an embodiment of the present disclosure.
Figure 27C:
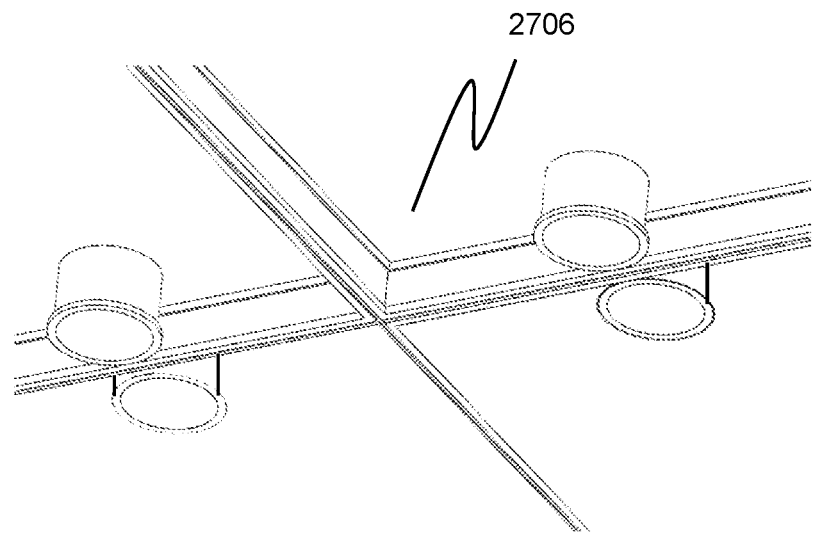
FIG. 27C is an illustration of two supporting elements mounted midway along "T"-bars, namely remote from junctions of the "T"-bars, wherein each supporting element supports two round light fixtures, for example down-lights, on lateral sides thereof, in accordance with an embodiment of the present disclosure.
Figure 27D:
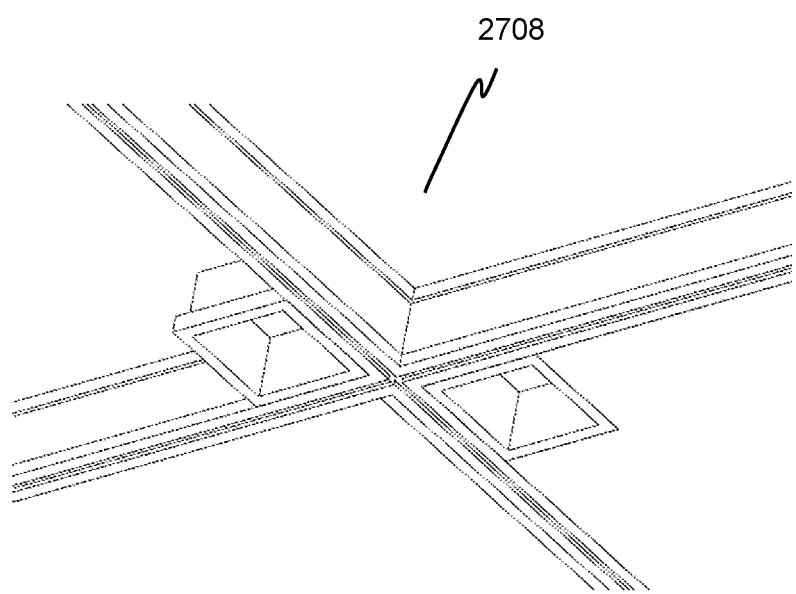
FIG. 27D is an illustration of two supporting elements mounted midway along "T"-bars, namely remote from junctions of the "T"-bars, wherein each supporting element supports two square light fixtures, for example down-lights, on lateral sides thereof, in accordance with an embodiment of the present disclosure.
Figure 27E:
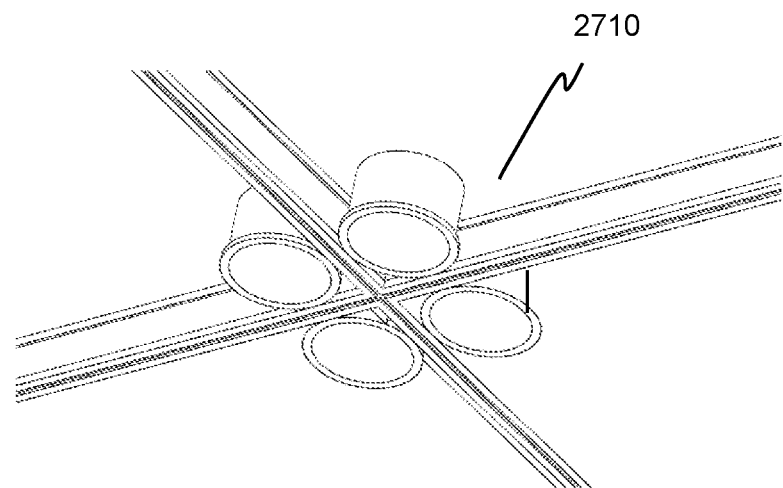
FIG. 27E is an illustration of a supporting element, for example as illustrated in FIG. 25A, mounted at a junction whereat a plurality of "T"-bars mutually meet, wherein four round light fixtures, for example down-lights, are disposed on lateral sides thereof, clustered around the junction, in accordance with an embodiment of the present disclosure.
Figure 27F:
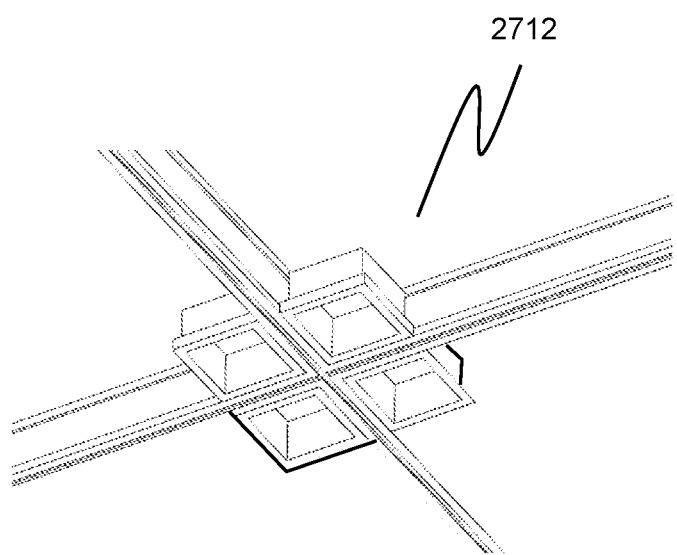
FIG. 27F is an illustration of a supporting element, for example as illustrated in FIG. 25A, mounted at a junction whereat a plurality of "T"-bars mutually meet, wherein four square light fixtures, for example down-lights, are disposed on lateral sides thereof, clustered around the junction, in accordance with an embodiment of the present disclosure.
Figure 27G:
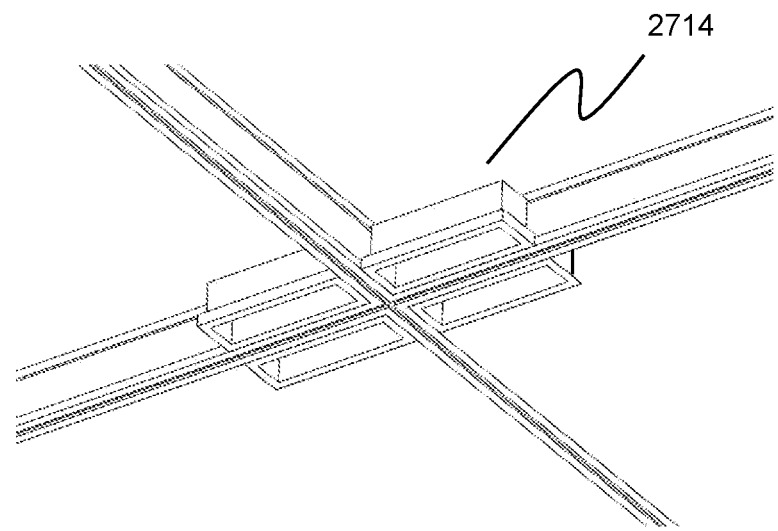
FIG. 27G is an illustration of a supporting element, for example as illustrated in FIG. 25A, mounted at a junction whereat a plurality of "T"-bars mutually meet, wherein four rectangular light fixtures, for example down-lights, are disposed on lateral sides thereof, clustered around the junction, in accordance with an embodiment of the present disclosure.
Figure 27H:
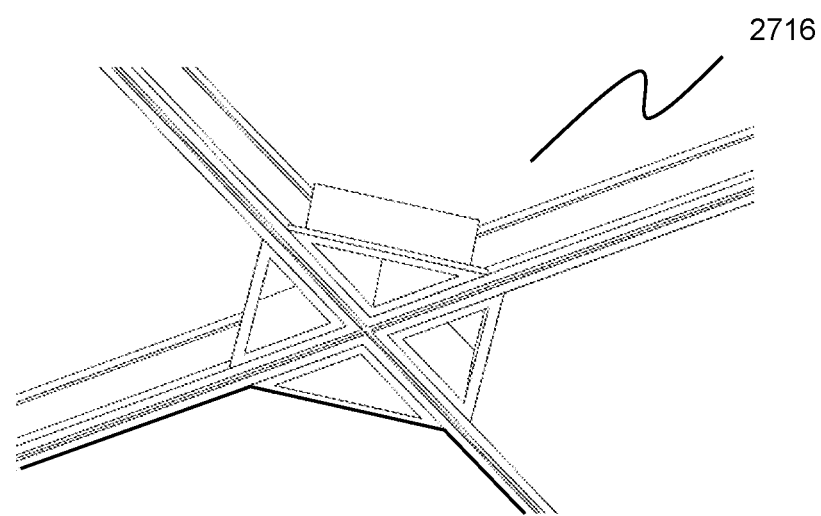
FIG. 27H of a supporting element, for example as illustrated in FIG. 25A, mounted at a junction whereat a plurality of "T"-bars mutually meet wherein four triangular light fixtures, for example down-lights, are disposed on lateral sides thereof, clustered around the junction, in accordance with an embodiment of the present disclosure.

In FIGS. 27A to 27H, there are provided illustrations of suspended ceiling arrangements 2702, 2704, 2706, 2708, 2710, 2712, 2714 and 2716, in accordance with embodiments of the present disclosure. Each of the suspended ceiling arrangements 2702, 2704, 2706, 2708, 2710, 2712, 2714 and 2716 includes at least one supporting element and at least one functional module, for example at least one ceiling device that is at least one of electrically operated and electronically operated (such as light sources or other types of devices such as sensors, ventilation fans, loudspeakers, anti-sound emission ports, water sprinklers for fire safety, and such like) mounted on at least one supporting element, for example a plurality of supporting elements, of the suspended ceiling arrangements 2702, 2704, 2706, 2708, 2710, 2712, 2714 and 2716. The at least one supporting element and the at least one fixture of the suspended ceiling arrangements 2702, 2704, 2706, 2708, 2710, 2712, 2714 and 2716 includes a slidable coupling therebetween. For example, the at least one supporting element optionally includes a U-shaped portion that is detachably mounted, when in use, onto at least one "T"-bar, and at least one supporting portion that is integral with the U-shaped portion. Furthermore, the at least one supporting portion is optionally configured to function as guiding rails for proving a slidable coupling between the at least one supporting element and the functional modules. It will be appreciated that the functional modules, implemented as ceiling devices that are at least one of electrically operated and electronically operated, optionally include one or more complementary sliding elements that allow slidable coupling therebetween. The at least one supporting element (of the suspended ceiling arrangements 2702, 2704, 2706, 2708, 2710, 2712, 2714 and 2716) is beneficially implemented to be mountable to a given "T"-bar in an easy and customizable manner that is also compact and limited in spatial extent substantially below 2" (circa 5 cm) in height. The at least one supporting element optionally houses a power supply, power driver module or power connection, and beneficially enables an easy installation to be achieved. Moreover, the at least one supporting element beneficially allows for a continuous run of light fixtures and several unique layout options in a suspended ceiling arrangement, for example such as same fixtures mounted side-by-side, or mutually different types of fixtures mounted side-by-side (for example, in a manner of functional clusters of mutually different fixtures). The fixtures can be round, rectilinear or triangular in form, as illustrated in FIGS. 27A to 27H. For given supporting elements, their plurality of fixtures are mutually same; alternatively, for a given supporting elements, their plurality of fixtures are mutually different. Optionally, the supporting elements can mount along a given "T"-bar (for example as illustrated in FIGS. 27B and 27C) or at a junction whereat a plurality of "T"-bars mutually intersect (for example as illustrated in FIGS. 27A and 27B, wherein two fixtures are supported by a given supporting element mounted at the junction of the "T"-bars, alternatively four fixtures are supported by a given supporting element in FIGS. 27E to 27H). In the FIGS. 27A to 27H, there are shown mounting of down-lights that emit, when in operation, light radiation substantially in a vertical downwards direction. At such a junction of "T"-bars, supporting elements as illustrated in FIGS. 25A to 25C are beneficially employed. When the supporting element is mounting along a given "T"-bar remote from a junction of "T"-bars, a fixture can be mounted at either, or both, lateral sides of the supporting element.

Figure 28A:
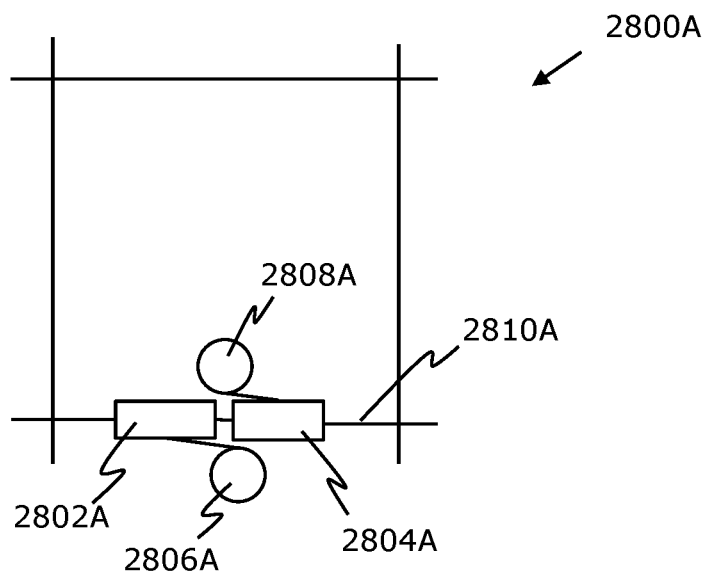
FIGS. 28A-28D are illustrations of supporting elements arranged in various configurations in a modular ceiling arrangement, in accordance with various embodiments of the present disclosure.
Figure 28B:
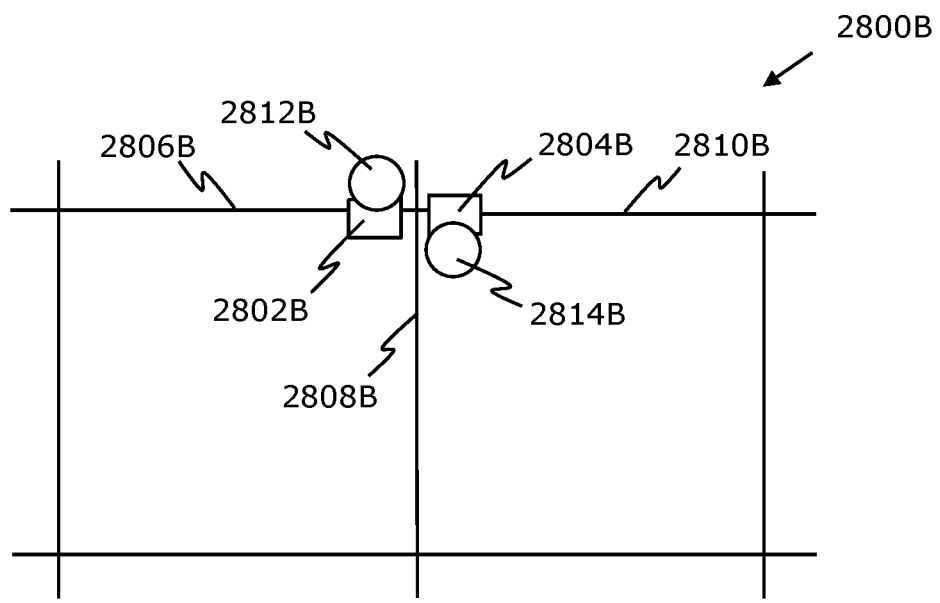
Figure 28C:
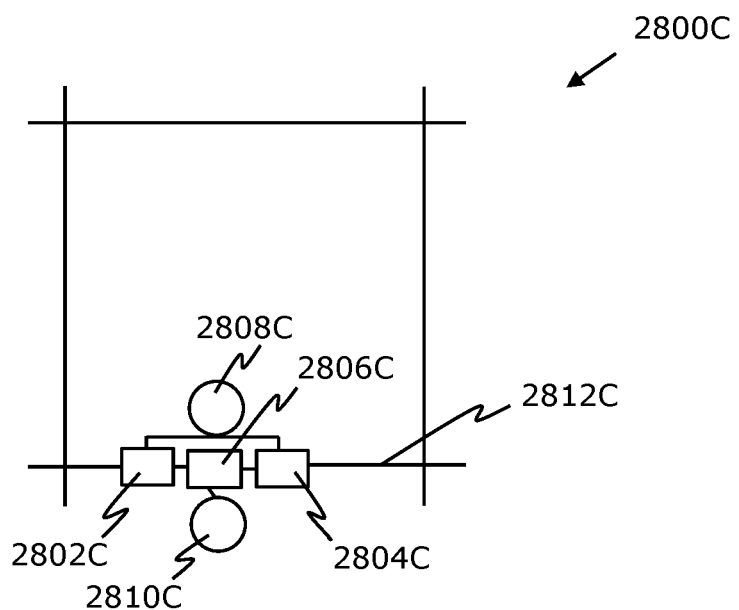
Figure 28D:
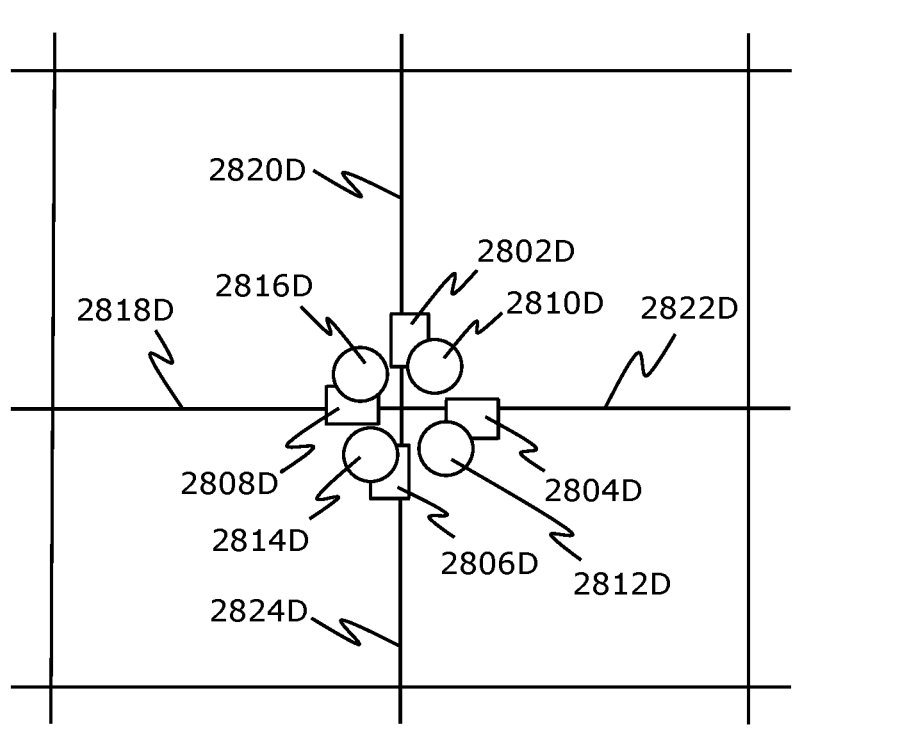

Referring to FIGS. 28A to 28D, there are shown illustrations of suspended ceiling arrangements 2800A, 2800B, 2800C and 2800D, in accordance with various embodiments of the present disclosure. Each of the suspended ceiling arrangements 2800A, 2800B, 2800C and 2800D includes at least one supporting element and at least one functional module, for example at least one ceiling device that is at least one of electrically operated and electronically operated (such as light sources or other types of devices such as sensors, ventilation fans, loudspeakers, anti-sound emission ports, water sprinklers for fire safety, and such like) mounted on at least one supporting element, for example a plurality of supporting elements, of the suspended ceiling arrangements 2800A, 2800B, 2800C and 2800D. As shown, the supporting elements can have several layouts, arranged in a manner such that a given functional module is arranged on only one side of the "T" bar. FIG. 28A depicts two supporting elements 2802A and 2804A for supporting two functional modules 2806A and 2808A arranged side-by-side on a T-bar 2810A. Herein, the functional module 2806A is arranged on one side of the "T" bar 2810A, and the functional module 2808A is arranged on an opposite side of the "T" bar 2810A. FIG. 28B depicts supporting elements 2802B and 2804B arranged proximal to a junction of three "T" bars 2806B, 2808B and 2810B, supporting two functional module 2812B and 2814B, one on each side of the junction, held in position by supporting elements 2802B and 2804B respectively. FIG. 28C depicts supporting elements 2802C, 2804C and 2806C for supporting functional modules 2808C and 2810C on the "T"-bar 2812C. FIG. 28D depicts supporting elements 2802D, 2804B, 2806D and 2808D for supporting functional modules 2810D, 2812B, 2814D and 2816D respectively. Herein, the supporting elements 2802D, 2804B, 2806D and 2808D are arranged on a junction of four "T"-bars 2818D, 2820B, 2822D and 2824D.

Embodiments of the present disclosure provide modular ceiling systems that utilizes at least one supporting element for use in implementing suspended ceiling arrangements. In another aspect, the present disclosure also provides a suspended ceiling arrangement that is implemented using the modular ceiling system including the at least one supporting element. The suspended ceiling arrangement can be formed by supporting a plurality of ceiling panels on a plurality of supporting elements, pursuant to the present disclosure. Such supporting of the ceiling panels on the supporting elements enables convenient installation, maintenance and replacement of the suspended ceiling arrangement, such as, by arranging the supporting elements on "T"-bars and arranging the ceiling panels on the supporting elements. Furthermore, when one or more supporting elements of the plurality of supporting elements are determined to have a defect therein, the defective supporting element can be easily replaced without having to replace an entirety of the suspended ceiling arrangement, thereby reducing waste. Furthermore, the supporting elements can be easily and cost-effectively fabricated to have different properties (such as, different orientations of linear and/or lateral supporting elements) relative to each other, thereby, enabling to provide different appearances and easy customizability to needs of the suspended ceiling arrangement. The supporting elements can be used to support the ceiling panels, as well as other components such as functional modules, for example ceiling devices that are at least one of electrically operated and electronically operated, including light sources, for example various types of devices as aforementioned. Such ceiling devices that are at least one of electrically operated and electronically operated can be used to provide additional functionality to the suspended ceiling arrangement (such as, using a plurality of sensors, smoke detectors and so forth for increasing a safety in a given room whereat the suspended ceiling arrangement is installed), and for improving an aesthetic appearance or experience associated with the suspended ceiling arrangement (such as, by using a plurality of light sources, sound systems, anti-sound systems and so forth). Furthermore, the present disclosure also provides a method for (of) installing a suspended ceiling arrangement. Furthermore, as aforementioned, the suspended ceiling arrangement includes supporting elements mounted on "T"-bars to support ceiling panels; such supporting elements can be mounted on existing "T"-bars associated with conventional suspended ceiling arrangements, thereby, enabling easy, time-efficient and cost-efficient replacement of a conventional suspended ceiling arrangement with a modular ceiling system of the present disclosure. Beneficially, the present disclosure provides a modular ceiling system that improves maintenance of the appearance of ceiling panels. Specifically, the supporting elements are mounted on the "T"-bars of the suspended ceiling arrangements to support the ceiling panels at different orientations such as in a plane parallel and above, below, and at a tilted angle relative to a general ceiling plane. Additionally, optionally, the ceiling panels are arranged at different orientations to provide a three-dimensional appearance to the suspended ceiling arrangement. Furthermore, orientations of supporting at least one of elements and ceiling panels can be easily changed, thereby, enabling convenient customization of the suspended ceiling arrangement.

Figure 29A:
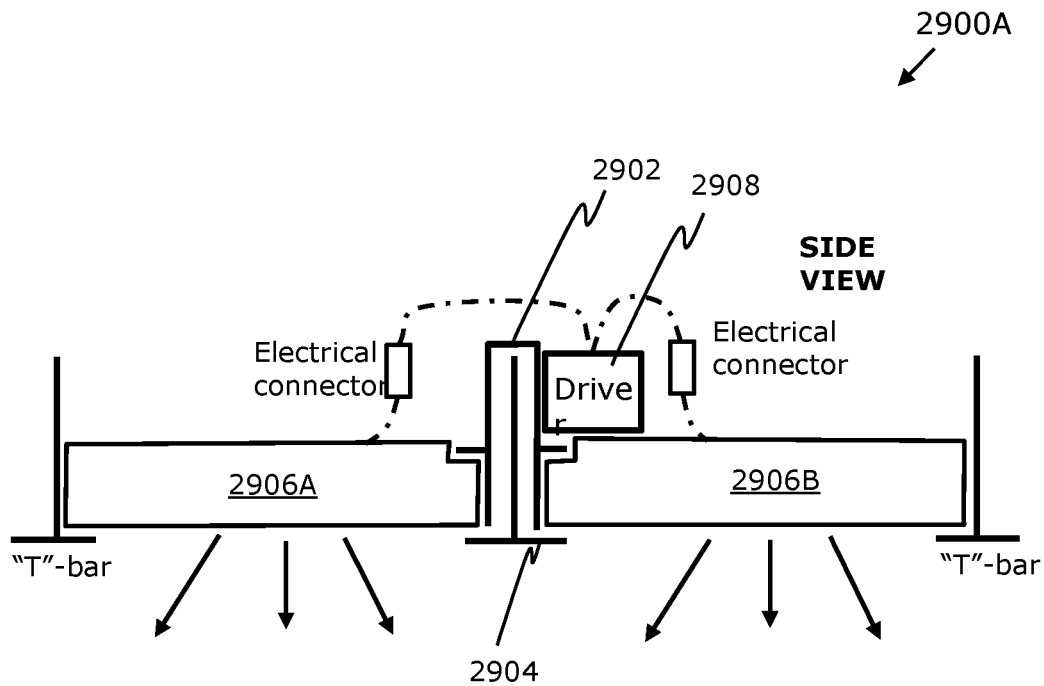
FIGS. 29A and 29B are a side-view illustration and a plan view illustration, respectively, of a suspended ceiling arrangement into which a supporting element of the modular ceiling system is mounted, wherein the supporting element accommodates a driver that, when in operation, provides power to two light fixtures disposed at lateral sides of the supporting element, and wherein the supporting element supports a driver unit that is coupled to provide electrical power to both of the two light fixtures, in accordance with an embodiment of the present disclosure.
Figure 29B:
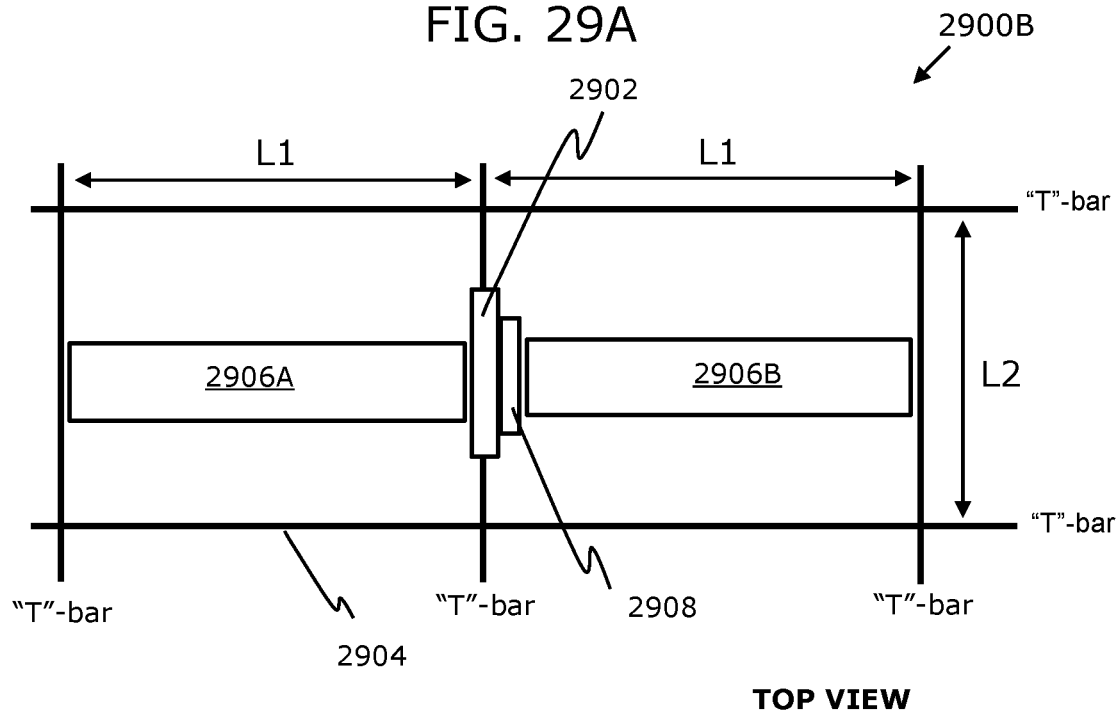

Referring next to FIGS. 29A to 29B, there are shown implementations of the modular ceiling system 2900A and 2900B respectively, pursuant to various embodiments of the present disclosure. The modular ceiling system 2900A includes a supporting element 2902, for example as implemented and as described in the foregoing, wherein the supporting element 2902 has a "U"-shaped portion that fits over a "T"-bar 2904 of a suspended ceiling arrangement, for example mid-way along the "T"-bar 2904 but not limited thereto; for example the supporting element 2902 is optionally supported near a junction wherein a plurality of "T"-bars mutually abut, namely in manner as at a corner region of a given ceiling panel. The supporting element 2902 includes a plurality of lateral projections on both lateral sides of the supporting element 2902 that, when installed, support two functional modules 2906A, 2906B at adjacent sides of the "T"-bar 2904. A driver module 2908 is mounted at an upper region to the supporting element 2902 and is thereby provided with mechanical support and also thermal contact to assist power dissipation from the driver module 2908 to the "T"-bar 2904; for example, the driver module 2908 is implemented as a voltage inverter (for example, a switch-mode device) and is potentially rated at 500 Watts or more power transmission therethrough when in operation, resulting potentially in an order of 50 Watts thermal dissipation within the voltage inverter. The functional modules 2906A, 2906B are conveniently implemented as light fittings, for example LED arrays, LED filament arrays and so forth, but not limited thereto. An advantage of the modular ceiling system 2900A is that only one driver module 2908 is required for two functional modules 2906A, 2906B, and corresponding wiring complexity within the suspended ceiling arrangement is correspondingly simplified, thereby increasing reliability and reducing a weight of the suspended ceiling arrangement. In FIG. 29B, to provide an idea of physical size, a length L1 is 4 feet (circa 1.2 meters (metres)) and a length L2 is 2 feet (circa 0.6 meters (metres)).

Figure 30A:
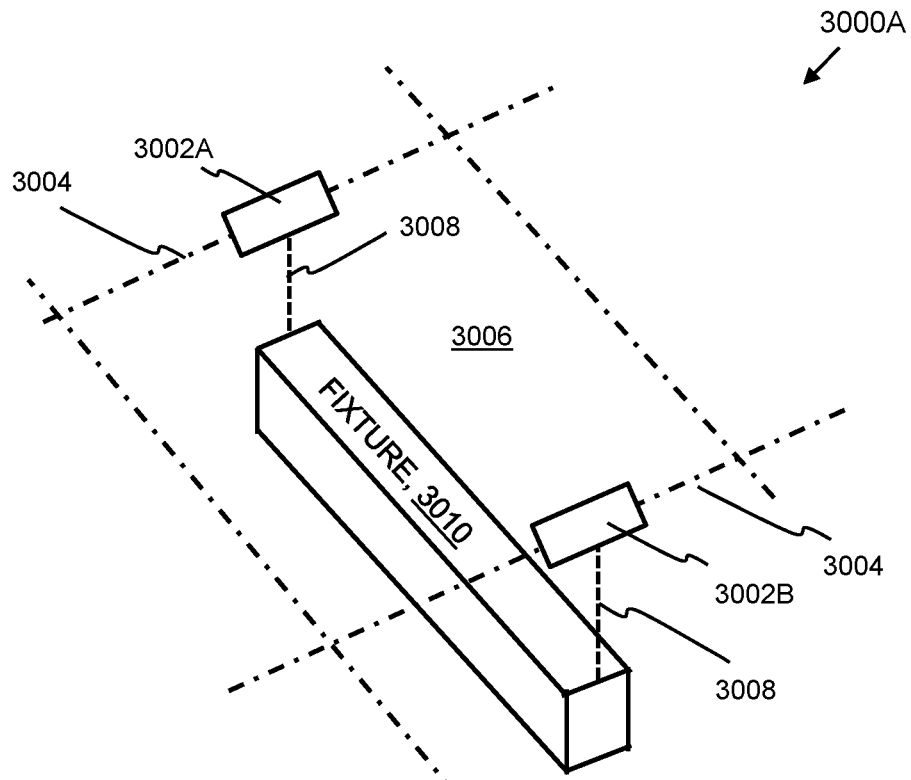
FIGS. 30A and 30B are illustration of a hanging fixture implemented using a passive supporting element and an active supporting element of the present disclosure, wherein the active supporting element includes a driver unit for providing electrical power to the hanging fixture when in operation.
Figure 30B:
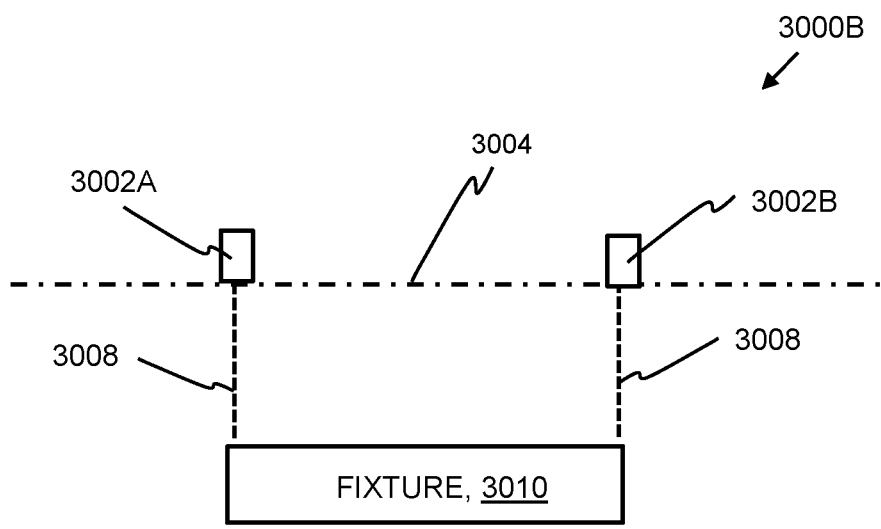

Referring next to FIGS. 30A to 30B, there is shown an implementation of the modular ceiling system 3000A and 3000B respectively, pursuant to various embodiments of the present disclosure. The two supporting elements 3002A, 3002B are mounted at mutually opposite "T"-bars 3004 of a given cell 3006 of a suspended ceiling arrangement. The supporting elements 3002A, 3002B, for example fabricated as described in the foregoing, for example from extruded Aluminum, from sintered compressed metal powder, from moulded (molded) plastic materials and so forth, are implemented to have upper "U"-shaped portions that fit over the "T"-bars 3004 and lower portions that are designed to receive cords, mechanical support wires or chains 3008. At least one, or both, of the supporting elements 3002A, 3002B is beneficially equipped with a driver module, for example for providing electrical power, for performing sensing functions (for performing fire safety functions) and so forth. A functional module 3010 is suspended from the supporting element 3002A and 3002B at a height that is lower than a general ceiling plane of the suspended ceiling arrangement of FIG. 30, for example in a range of 20 cm to 80 cm lower. The functional module 3010 is optionally implemented as a lighting unit, a ventilation unit, a resonant inductive power pickoff assembly (for example using technology as described in a published PCT application WO2013/091875A2; "Inductive Power Coupling Systems") for providing specialist power in a given room to which the suspended ceiling arrangement pertains. Other functionalities can be implemented by using the functional module 3010, for example suspended infrared radiant heaters, power connections for specialist tools, and so forth. Optionally, the supporting elements 3002A and 3002B include a motor-winch arrangement that allows the functional module 3010 to be raised and lowered as required relative to the suspended ceiling arrangement.

Figure 31:
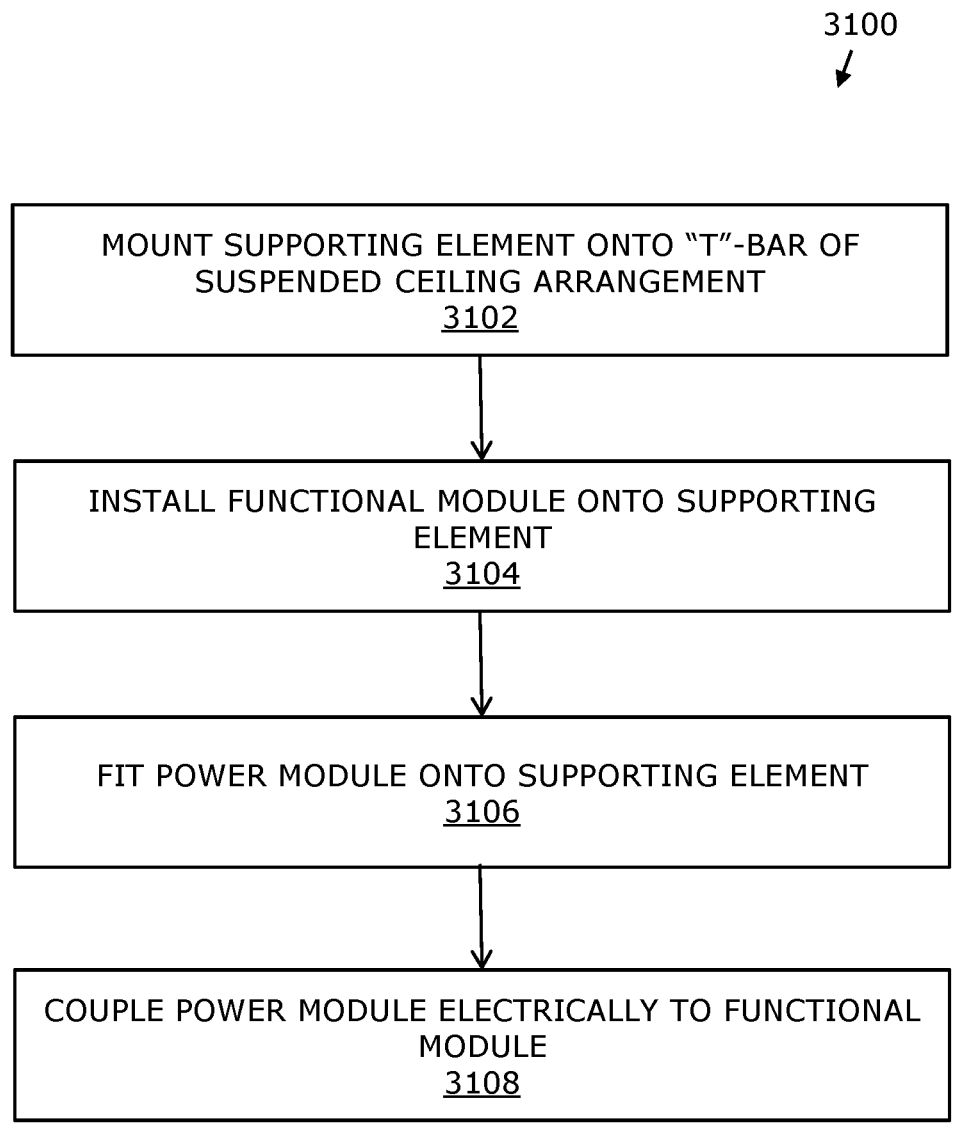
FIG. 31 is a flow diagram illustrating steps of a method of installing elements of a modular ceiling system pursuant to the present disclosure.

FIG. 31 is an illustration of a flow chart illustrating steps of a method 3100 for installing a suspended ceiling arrangement, using a modular ceiling system in accordance with an embodiment of the present disclosure. The flow chart includes steps of a method 3100 for installing a suspended ceiling arrangement having hanging wires coupled to a structural ceiling, having "T"-bars supported by the hanging wires, and having a plurality of ceiling panels arranged in an array of cells defined by the "T"-bars, wherein flat end-portions of the "T"-bars define a general ceiling plane for the plurality of ceiling panels. At a step 3102, supporting elements are mounted onto the "T"-bars, for supporting the plurality of ceiling panels thereon and/or one or more fixtures in cooperation with the T"-bars, wherein the supporting elements, when in operation, support at least one of a given ceiling panel of the plurality of ceiling panels and a given fixture in at least one of:

(i) at a height of the general ceiling plane;
(ii) at a height that is higher than the general ceiling plane;
(iii) at a height that is lower than the general ceiling plane, and
(iii) at a tilted angle relative to an angle of the general ceiling plane.

In a step 3104, various functional modules, for example associated ceiling devices that are at least one of electrically operated and electronically operated, are then mounted on the supporting elements. In a step 3106, the at least one power module is fitted onto the at least one supporting element. In a step 3108, the at least one power module is electrically coupled to the at least one functional module.

Optionally, the method 3100 includes installing the ceiling devices, that are at least one of electrically operate and electronically operated, into a pre-existing suspended ceiling arrangement and re-using one or more ceiling panels of the pre-existing suspended ceiling arrangement whereat the ceiling devices, that are at least one of electrically operated and electronically operated, are installed into the one or more ceiling panels. The method beneficially includes a step of installing arrangements as illustrated in one or more of FIGS. 27A to 27H, using the supporting elements as illustrated in FIGS. 25A to 25C, and FIG. 23.

Figure 32:
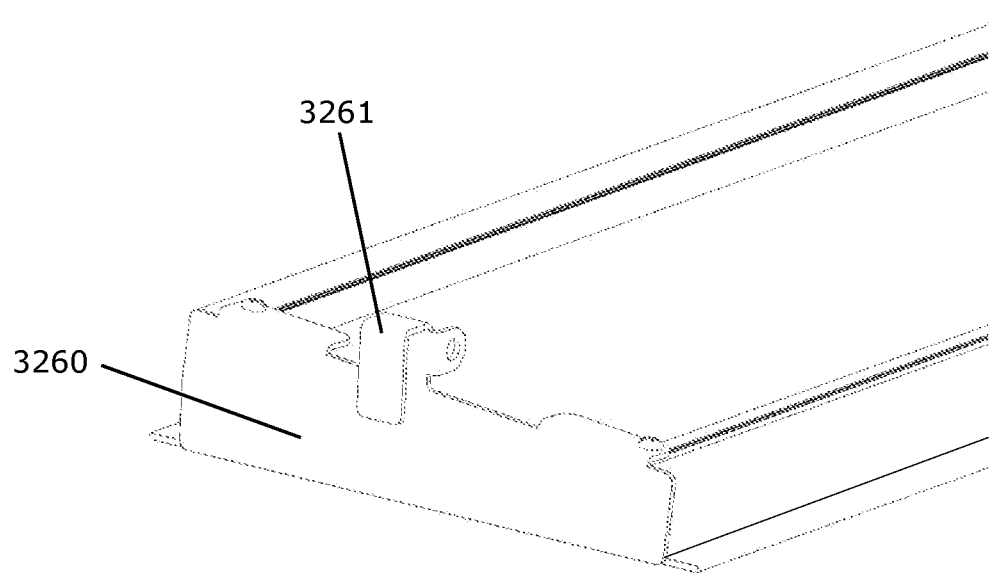
FIG. 32 is an isometric view of an example light fixture for use within an embodiment modular ceiling system wherein a supporting element is configured as both an end cap for the light fixture and has a latching portion for attachment to a T-bar.
Figure 33:
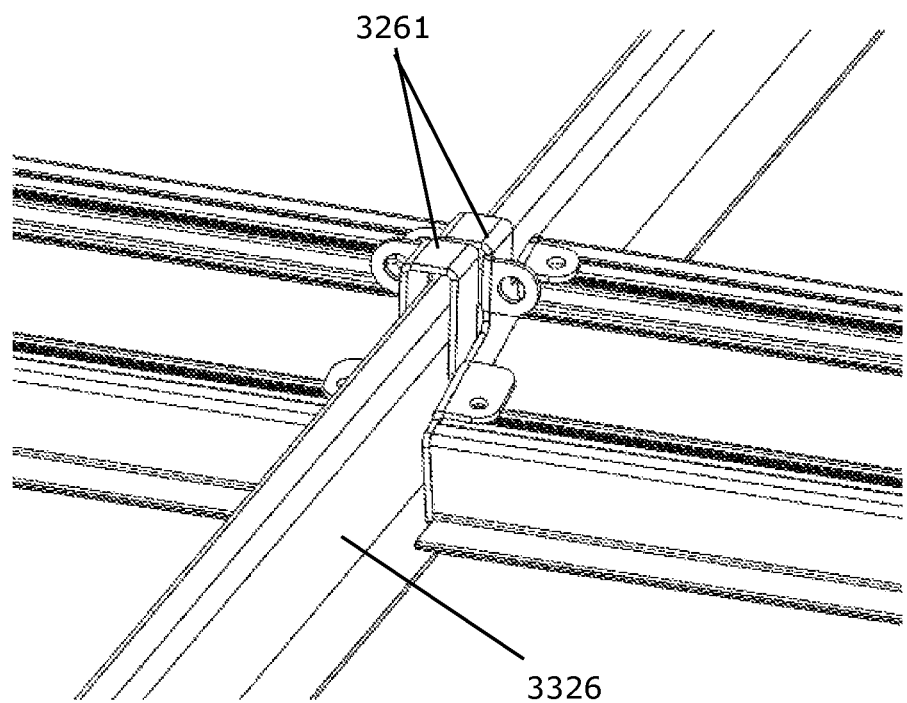
FIG. 33 is an above ceiling plane isometric view that shows the light fixture of FIG. 32 mounted in series within a modular ceiling system.

FIG. 32 shows a lighting fixture wherein the end plate supporting element 3260 has a "U" shaped-mounting bracket 3261 configured to serve as a supporting portion of the end plate in the lighting fixture wherein the supporting portion of the end plate connects to the T-bar with the longitudinal axis of the functional module aligned in perpendicular with the longitudinal orientation of the connected T-bar. FIG. 33 shows two lighting fixtures described in FIG. 32 mounted into place onto a T-bar 3326 in an orientation perpendicular to the longitudinal orientation of a T-bar.

Figure 34A:
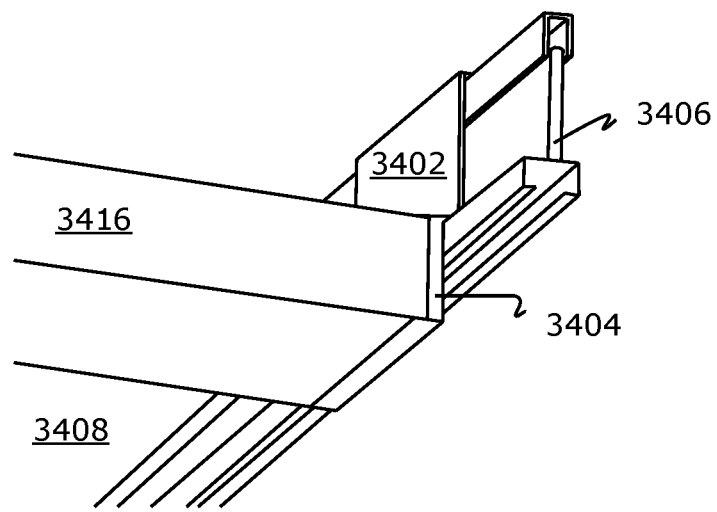
FIG. 34A (isometric view) and FIG. 34B (planar view) show a supporting element that enables a ceiling level functional module configuration.
Figure 34B:
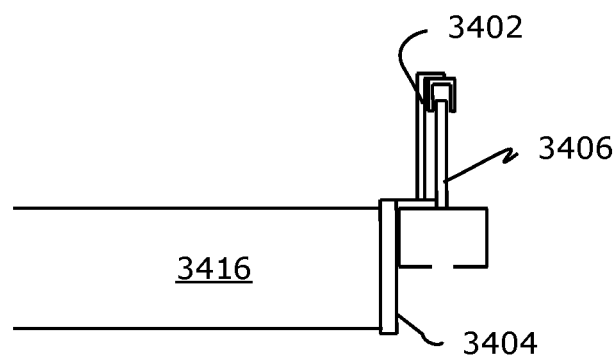
FIG. 34C (isometric view) and FIG. 34D (planar view) show a supporting element that enables a lowered functional module configuration.
FIG. 34E (perspective view) and FIG. 34F (side view) show a modular functional fixture embodiment wherein a ceiling tile is supported at a height equal to the top of the T-bar.
FIG. 34G (perspective view) and FIG. 34H (side view) show a modular functional fixture embodiment wherein a ceiling tile is supported at a height above the top of the T-bar.

In FIGS. 34A and 34B, there are shown, respectively, a perspective view and a side view of a section of the modular functional fixture 3416 arranged on the T-bars 3406, in accordance with one embodiment of the present disclosure. As shown, a base of the ceiling tile 3408 is supported at a height greater than the modular functional fixture 3416. As shown, the ceiling tile 3408 is arranged on the modular functional fixture 3416 and on the base portion of the T-bars 3406. Furthermore, a supporting element 3402 includes one or more fixture interlocking features 3404 that reconfigurably support the modular functional fixture 3416 at a height below the general plane of the suspended ceiling panel 3408.

Figure 34C:
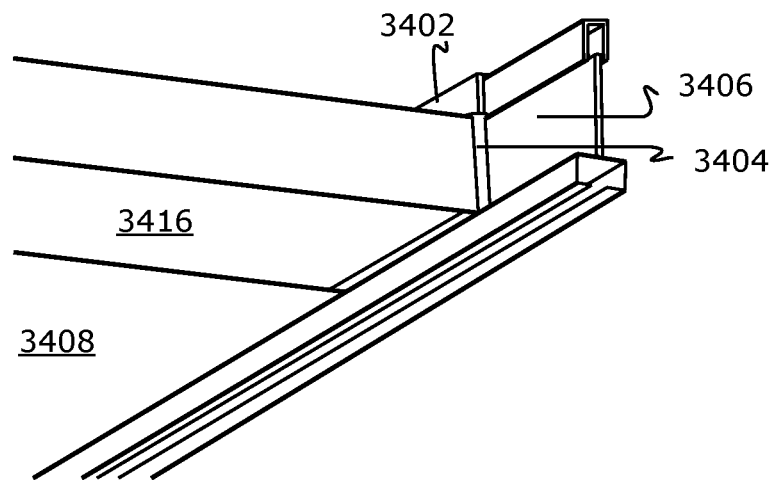
Figure 34D:
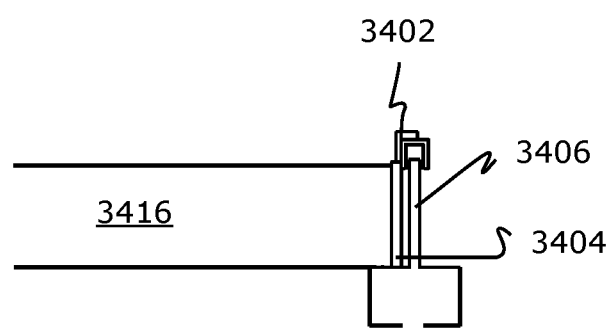

In FIGS. 34C and 35D, there are shown, respectively, a perspective view and a side view of the modular functional fixture 3416 arranged on the T-bars 3406, in accordance with another embodiment of the present disclosure. As shown, the base of the ceiling tile 3408 is supported at a height of the modular functional fixture 3416. Furthermore, the base of the ceiling tile 3408 is generally co-planar (when viewed from underneath) to that of the base of the modular functional fixture 3416. Moreover, the supporting element 3402 includes one or more fixture interlocking features 3404 that reconfigurably support the modular functional fixture 3416 at a height of the general plane of the suspended ceiling panel 3408. Moreover, cut edges of the ceiling tile 3408 are also beneficial concealed by the modular functional fixture 3416 and the supporting element 3402.

Figure 34E:
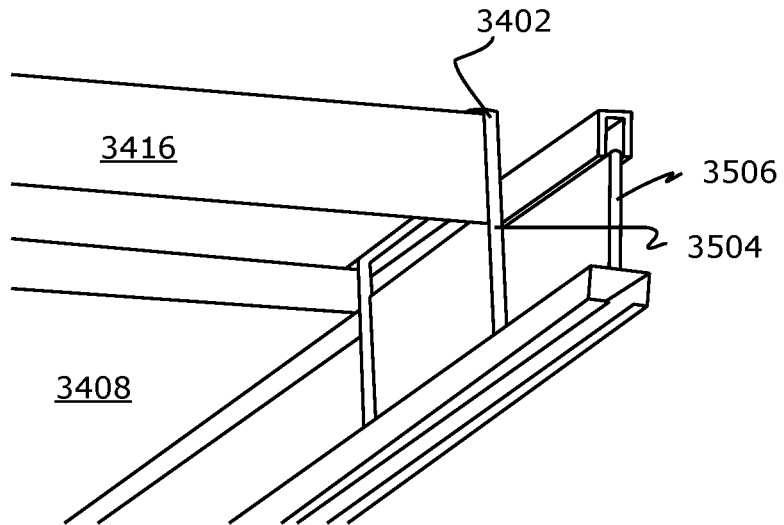
Figure 34F:
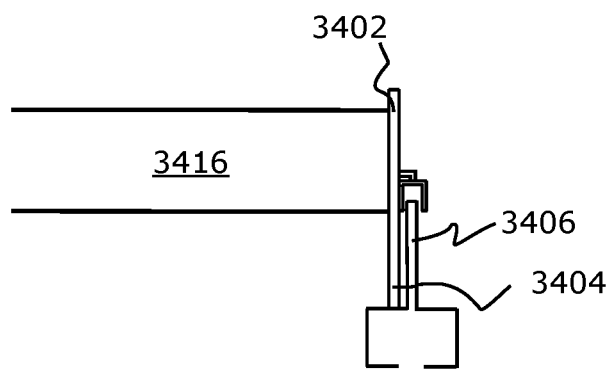

In FIGS. 34E and 34F, there are shown a perspective view and a side view, respectively, of the modular functional fixture 3416 arranged on the T-bars 3406. As shown, the base of the ceiling tile 3408 is supported at a height greater than the T-bars 3406, in accordance with yet another embodiment of the present disclosure. As shown, the ceiling tile 3408 is arranged with the modular functional fixture 3416 raised at a height equal to the top of the T-bars 3406. Moreover, the supporting element 3402 includes one or more fixture interlocking features 3404 that reconfigurably support the modular functional fixture 3416 at a height that is greater than the general plane of the suspended ceiling arrangement 3400. Moreover, cut edges of the ceiling tile 3408 are also beneficially concealed by the modular functional fixture 3416 and the supporting element 3402.

Figure 34G:
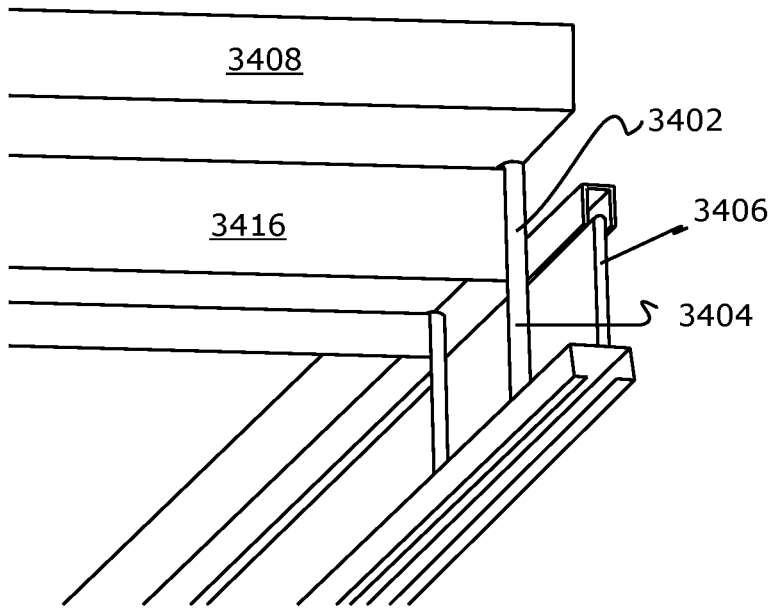
Figure 34H:
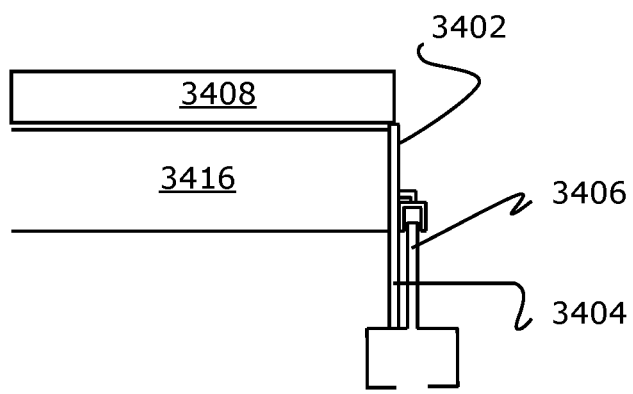

In FIGS. 34G and 34H, there are shown a perspective view and a side view, respectively, of the modular functional fixture 3416 arranged on the T-bars 3406, in accordance with still another embodiment of the present disclosure. As shown, the base of the ceiling tile 3408 is supported at a height greater than the T-bars 3406. As shown, the ceiling tile 3408 is arranged on the modular functional fixture 3416 that is raised at a height above the modular functional fixture 3416. Moreover, the supporting element 3402 includes one or more fixture interlocking features 3404 that reconfigurably support the modular functional fixture 3516 at a height that is greater than the general plane of the suspended ceiling panel 3408.

Optionally, one or more modular lighting fixtures are joined end-on-end to form a linear array of lighting fixtures. Furthermore, optionally, the linear array has a shape defined as one of: a line, a square, a rectangle, a circle, an arc. Furthermore, optionally, the shape defined is aligned on-centre with other grid lines of the suspended ceiling grid arrangement.

Figure 35:
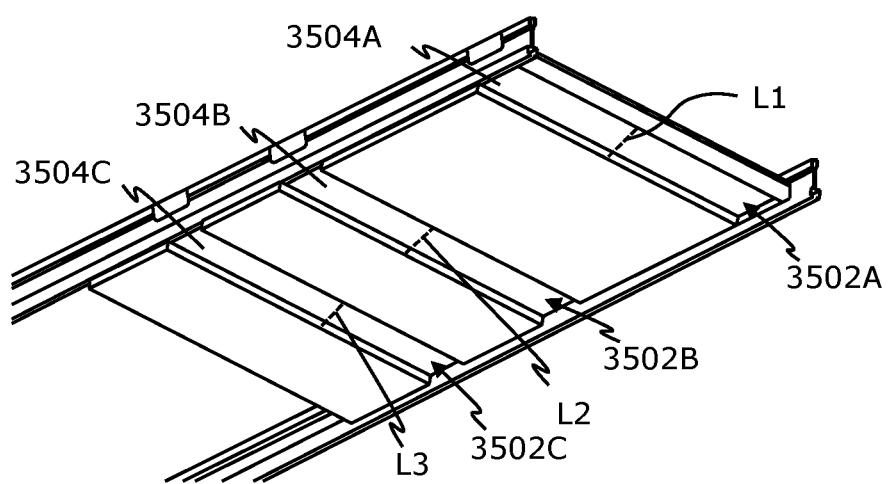
FIG. 35 shows an arrangement of multiple modular functional fixtures having elongate portions of various lateral widths.

Referring to FIG. 35, there is shown an arrangement of multiple modular functional fixtures 3502A, 3502B, and 3502C, in accordance with various exemplary embodiments of the present disclosure. Optionally, when a plurality of the elongate portion 3504A, 3504B, and 3504C is deployed together, they have mutually different lateral widths L1, L2, and L3. Furthermore, the lateral widths L1, L2, and L3 are based on shape and size of the modular functional fixtures 3502A, 3502B, and 3502C. Optionally, the elongate portion 3504A has an elongate axis, wherein a lateral width L1 of the elongate portion orthogonal to the elongate axis is less than half a width of a given cell of the suspended ceiling arrangement, so that a plurality of the elongate portion 3504A, 3504B, and 3504C can be accommodated within the given cell.

Figure 36A:
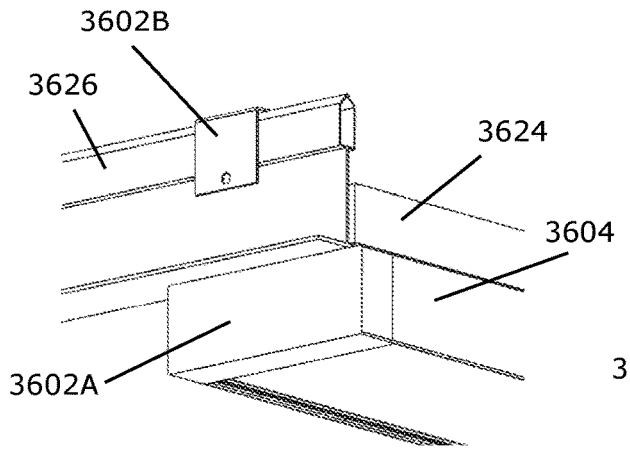
FIGS. 36A, 36B, and 36C show different views of a modular ceiling system having a supporting element that attaches to a light fixture and functions as both an end cap and latches over a T-bar and positions the light fixture at a level below the ceiling panel plane.
Figure 36B:
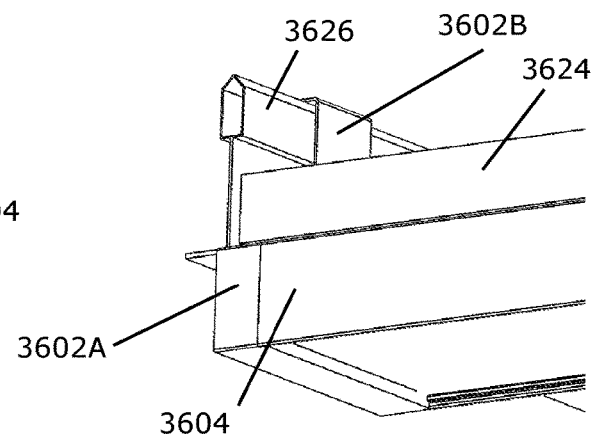
Figure 36C:
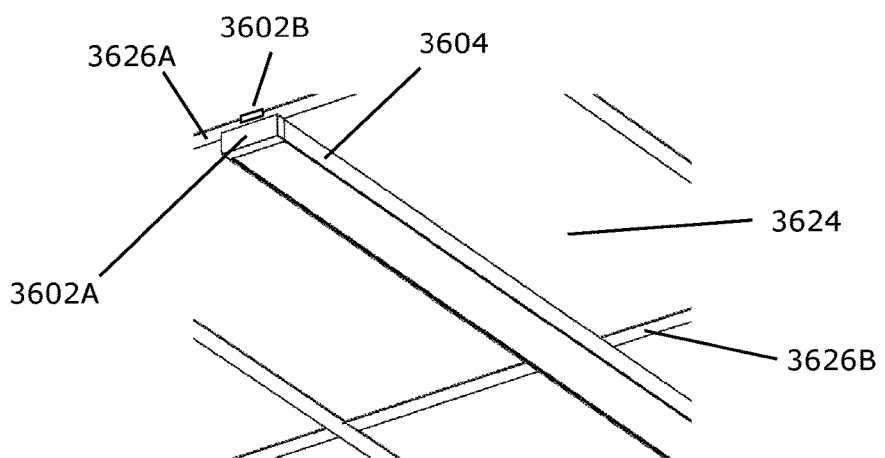

Referring to FIGS. 36A, 36B, and 36C, there is shown an illustration of a modular ceiling system having a supporting element similar to that of FIGS. 34A and 34 that attaches to a light fixture and functions as both an end cap 3602A and also contains an extension 3602B that latches over the T-bar 3626 and positions the light fixture at a level below the ceiling panel plane, thereby allowing the light fixture to have a continuous span across a T-bar grid. This is illustrated in FIG. 36C where the light fixture 3604 is mounted to T-bar 3626A by means of the supporting element 3602A and the light fixture extends under T-bar 3626B. This provide a continuous strip light source extending over a distance of more than a lateral width of two ceiling panels. For example, strips of lighting can thereby be provided over an entire length of a given room.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

We claim:

1. A lighting assembly for use with a suspended ceiling arrangement comprising a grid arrangement of T-bars suspended from a structural ceiling and the top surfaces of the T-bar horizontal portions collectively define a general ceiling plane of the suspended ceiling arrangement, wherein said lighting assembly comprises;
   A. two or more linear lighting modules, each comprising;
      1. A linear light source;
      2. A light guide having the three-dimensional form of a profile cross-sectional area extended linearly in a longitudinal direction wherein an input face of the light guide is positioned proximate to and in longitudinal alignment with the linear light source;
      3. A linear elongate housing having the three-dimensional form of a profile cross-sectional area extended linearly in a longitudinal direction and;
   B. a common end plate mounted to a longitudinal end of at least two linear lighting modules such as to enclose a longitudinal end of each linear elongate housing and position the linear lighting module in a configured alignment;
   C. an interior cavity within each linear lighting module bounded by the interior of the linear elongate housing and the common end plate.

2. The lighting assembly of claim 1 wherein the end plate maintains the linear lighting modules in a parallel configured alignment offset by a configured gap spacing.

3. The lighting assembly of claim 1 further comprising a configured gap between linear lighting modules.

4. The lighting assembly of claim 1 further comprising an electronic device positioned within the configured gap.

5. The lighting assembly of claim 1 wherein the end plate provides a reflective surface that functions as a reflective face of the interior cavity.

6. The lighting assembly of claim 1 wherein the linear light source comprises a LED board comprising at least one LED light source mounted onto a PCB.

7. The lighting assembly of claim 1 wherein the linear elongate housing provides positioning, retention, and optical alignment of the light source and light guide input face.

8. The lighting assembly of claim 1 further comprising an electronic device from the group consisting of; power supply, driver, sensor, power module, fan, loudspeaker, audio power amplifier, computing device.

9. The lighting assembly of claim 1 further comprising a power module mounted onto one of the linear lighting modules that powers multiple linear lighting modules within the lighting assembly.

10. The lighting assembly of claim 1 further comprising a power module mounted onto one of the linear lighting modules that powers linear lighting modules within multiple lighting assemblies.

11. The lighting assembly of claim 1 further comprising at least one electrically coupled power module and functional module.

12. The lighting assembly of claim 11 wherein at least one functional module includes at least one of; wiring looms, lighting modules, electronic assemblies, drivers, sensors, sensor amplifiers, wireless multiplexers, computing devices.

13. The lighting assembly of claim 11 in which at least one functional module provides control or data communication input or output options are selected from the following; DC output, AC output, overload protection, sensor inputs, control outputs, resonant inductive power coupling connections, optical fiber data coupling connections for supporting later retrofitted new types of functional modules.

14. The lighting assembly of claim 11 further comprising controls installed at various locations in a room and configured to communicate wirelessly to at least one functional module.

15. The lighting assembly of claim 11 wherein a spatially distributed and networked data processing arrangement functions as one or more nodes of a peer-to-peer data communication network or local computing center.

16. The lighting assembly of claim 15 wherein the data communication network is wire-based, or near-field wireless, or a combination of both.

17. The lighting assembly of claim 15 with user-adjustable items selected from the group; light switch controls, temperature controls, light intensity controls, light color controls, anti-sound dampening degree controls, ventilation controls.

18. A lighting assembly for use with a suspended ceiling arrangement comprising a grid arrangement of T-bars suspended from a structural ceiling and the top surfaces of the T-bar horizontal portions collectively define a general ceiling plane of the suspended ceiling arrangement, wherein said lighting assembly comprises;
   A. two or more linear lighting modules, each comprising;
      1) A linear light source;
      2) A light guide having the three-dimensional form of a profile cross-sectional area extended linearly in a longitudinal direction wherein an input face of the light guide is positioned proximate to and in longitudinal alignment with the linear light source;
      3) A linear elongate housing being rigid and having the three-dimensional form of a profile cross-sectional area extended linearly in a longitudinal direction;
      4) End caps attached to and enclosing each longitudinal end of the linear elongate housing and bounding an internal cavity within the linear elongate housing; and
   B. a support element to retain and align longitudinal ends of the linear lighting modules with the ceiling grid.

19. The lighting assembly of claim 18 wherein the support element positions the linear lighting modules along a common longitudinal axis.

20. The lighting assembly of claim 18 wherein the support element positions the linear lighting modules in orthogonal alignment.

21. The lighting assembly of claim 18 wherein the support element mounts over the vertical portion of a T-bar within the suspended ceiling arrangement.

22. The lighting assembly of claim 18 wherein the support element mounts over the vertical portion of more than one T-bar within the suspended ceiling arrangement.

23. The lighting assembly of claim 18 wherein the support element mounts over the intersection joint of more than one T-bar within the suspended ceiling arrangement.

24. The lighting assembly of claim 18 wherein the support element mounts over T-bars in the corner of a cell within the suspended ceiling arrangement.

25. The lighting assembly of claim 18 wherein the support element comprises lateral supporting portions at multiple heights.

26. The lighting assembly of claim 18 wherein the support element positions the linear lighting modules in multiple ceiling grid T-bar cells.

27. The linear lighting assembly of claim 11 wherein the linear lighting modules are positioned at, above, or below the ceiling grid plane.

28. The lighting assembly of claim 18 which substitutes for a T-bar within the suspended ceiling arrangement.

29. The lighting assembly of claim 28 wherein the elongate housing comprises a portion that is positioned at the ceiling grid plane and has the below ceiling grid appearance of a standard flat or slotted T-bar.

30. The lighting assembly of claim 18 wherein the linear light source comprises a LED board comprising at least one LED light source mounted onto a PCB.

31. The lighting assembly of claim 18 wherein the linear elongate housing provides positioning, retention, and optical alignment of the light source and light guide input face.

32. The lighting assembly of claim 18 further comprising an electronic device from the group consisting of; power supply, driver, sensor, power module, fan, loudspeaker, audio power amplifier, computing device.

33. The lighting assembly of claim 18 further comprising a power module mounted onto one of the linear lighting modules that powers multiple linear lighting modules within the lighting assembly.

34. The lighting assembly of claim 18 further comprising a power module mounted onto one of the linear lighting modules that powers linear lighting modules within multiple lighting assemblies.

35. The lighting assembly of claim 18 further comprising a power module mounted onto the support element that powers multiple linear lighting modules within the lighting assembly.

36. The lighting assembly of claim 18 further comprising a power module mounted onto the support element that powers linear lighting modules within multiple lighting assemblies.

37. The lighting assembly of claim 18 further comprising a multifunctional mounting bracket comprising;
   A. a support element;
   B. at least one functional module;
   C. at least one power module;
   D. wherein the functional module and power module are electrically coupled to each other and mechanically supported by the support element.

38. The lighting assembly of claim 37 wherein the at least one functional module includes at least one of; wiring looms, lighting modules, electronic assemblies, drivers, sensors, sensor amplifiers, wireless multiplexers, computing devices.

39. The lighting assembly of claim 37 in which at least one functional module provides control or data communication input or output options are selected from the following; DC output, AC output, overload protection, sensor inputs, control outputs, resonant inductive power coupling connections, optical fiber data coupling connections for supporting later retrofitted new types of functional modules.

40. The lighting assembly of claim 37 further comprising controls installed at various locations in a room and configured to communicate wirelessly to the at least one functional module.

41. The lighting assembly of claim 37 wherein a spatially distributed and networked data processing arrangement functions as one or more nodes of a peer-to-peer data communication network or local computing center.

42. The lighting assembly of claim 41 wherein the data communication network is wire-based, or near-field wireless, or a combination of both.

43. The lighting assembly of claim 41 with user-adjustable items selected from the group; light switch controls, temperature controls, light intensity controls, light color controls, anti-sound dampening degree controls, ventilation controls.

* * * * *